(12) United States Patent
Sadaoka et al.

(10) Patent No.: US 8,287,214 B2
(45) Date of Patent: Oct. 16, 2012

(54) TOOL HEAD, MACHINE TOOL AND BORING METHOD OF BORE OF CYLINDER BLOCK USING THE MACHINE TOOL

(75) Inventors: Hideki Sadaoka, Tochigi (JP); Hiromi Oshima, Tochigi (JP); Shinji Nogami, Tochigi (JP); Minoru Suzuki, Tochigi (JP); Makoto Ouchi, Tochigi (JP); Masanori Kikuchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1010 days.

(21) Appl. No.: 12/282,737

(22) PCT Filed: Mar. 12, 2007

(86) PCT No.: PCT/JP2007/054860
§ 371 (c)(1),
(2), (4) Date: Nov. 10, 2008

(87) PCT Pub. No.: WO2007/119334
PCT Pub. Date: Oct. 25, 2007

(65) Prior Publication Data
US 2009/0129879 A1 May 21, 2009

(30) Foreign Application Priority Data

Mar. 13, 2006 (JP) .................................. 2006-067214
Mar. 24, 2006 (JP) .................................. 2006-082618
May 29, 2006 (JP) .................................. 2006-148214

(51) Int. Cl.
*B23B 39/16* (2006.01)

(52) U.S. Cl. ................. 408/36; 408/31; 29/50; 29/56.5; 451/71

(58) Field of Classification Search ............... 29/888.06, 29/50, 56.5, 566; 408/22, 31, 36, 1 R, 42, 408/152; 451/69, 70, 71, 461, 67
See application file for complete search history.

(56) References Cited

U.S. PATENT DOCUMENTS

| 3,654,688 | A | * | 4/1972 | Setzler | ........................... 29/240 |
| 4,463,490 | A | * | 8/1984 | Saito et al. | ................... 29/566.1 |
| 5,390,448 | A | | 2/1995 | Schimweg | |

(Continued)

FOREIGN PATENT DOCUMENTS

DE 4215988 11/1993

(Continued)

OTHER PUBLICATIONS

Human Translation of JP61030343A, Isao Arai, Feb. 12, 1986.*

*Primary Examiner* — David Bryant
*Assistant Examiner* — Ryan J Walters
(74) *Attorney, Agent, or Firm* — Rankin, Hill & Clark LLP

(57) ABSTRACT

The spindle drive unit of a combined machine tool drives the spindle. The tip end of the spindle is provided with a boring tool and a tool head having a rough grinding stone and a finishing grinding stone. The spindle drive unit has a first support unit and a second support unit capable of receiving the spindle therethrough and supporting it rotatably, a linear motor and a column slide mechanism for moving the first and second support unit in the axis direction of the spindle, and a spindle motor for rotating the spindle.

13 Claims, 39 Drawing Sheets

U.S. PATENT DOCUMENTS

| | | |
|---|---|---|
| 6,287,057 B1 | 9/2001 | Kurz |
| 6,425,808 B1 | 7/2002 | Higashikawa |
| 6,973,367 B2 | 12/2005 | Klink et al. |
| 2003/0120374 A1 | 6/2003 | Klink et al. |
| 2004/0194986 A1* | 10/2004 | Ikuta ................ 173/48 |
| 2005/0130560 A1 | 6/2005 | Klink et al. |
| 2006/0052038 A1* | 3/2006 | Klein ................ 451/11 |

FOREIGN PATENT DOCUMENTS

| | | |
|---|---|---|
| DE | 19542892 A1 | 5/1997 |
| DE | 19830903 | 1/2000 |
| DE | 10359347 | 4/2005 |
| EP | 1321229 | 6/2003 |
| JP | 51-025523 | 7/1976 |
| JP | 55-083509 | 6/1980 |
| JP | 55-138054 | 10/1980 |
| JP | 57-107712 | 7/1982 |
| JP | 60-053405 | 4/1985 |
| JP | 61-030343 | 2/1986 |
| JP | 61-109603 | 7/1986 |
| JP | 62-078201 | 5/1987 |
| JP | 04-054604 | 5/1992 |
| JP | 06-312363 | 11/1994 |
| JP | 09-309013 | 12/1997 |
| JP | 10-058305 | 3/1998 |
| JP | 2000-052228 | 2/2000 |
| JP | 2000-190114 | 7/2000 |
| JP | 2000-343404 | 12/2000 |
| JP | 2001-353655 | 12/2001 |
| JP | 2002-103200 | 4/2002 |

* cited by examiner

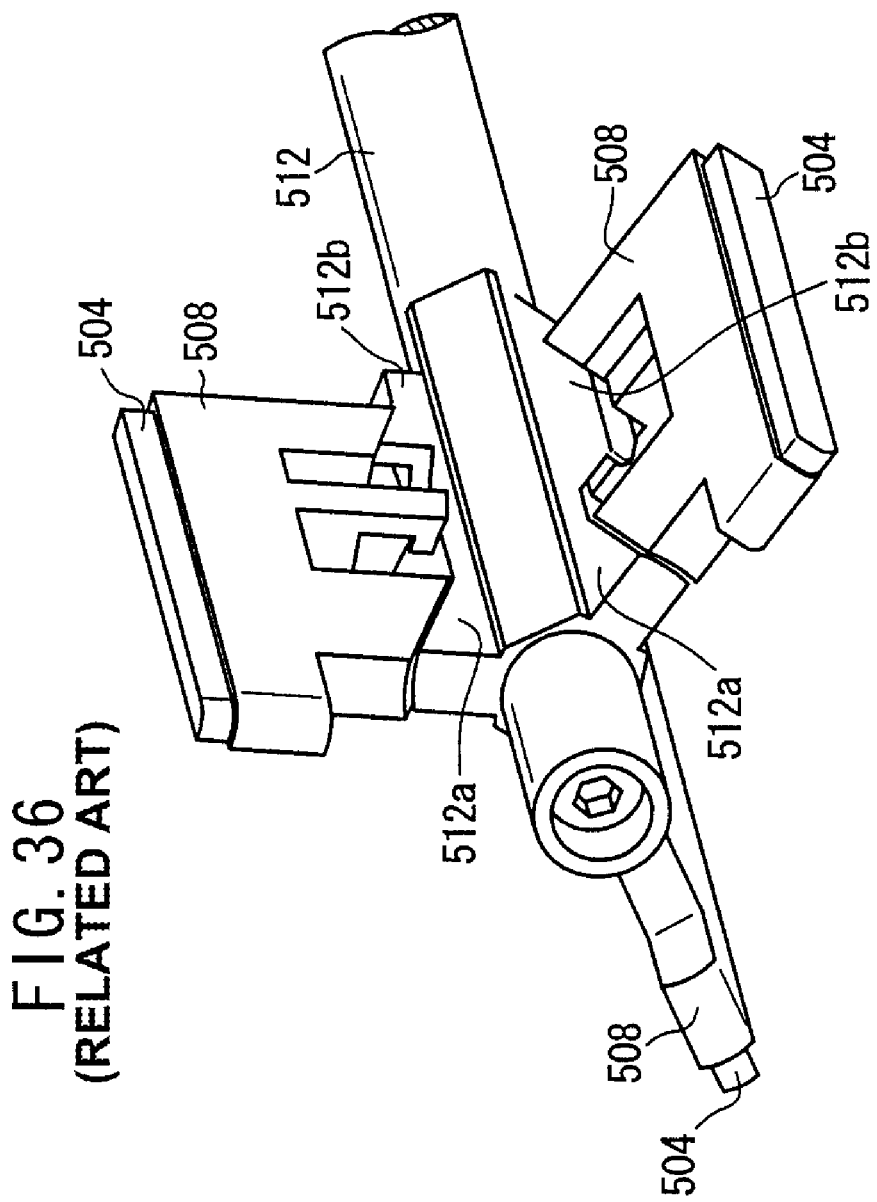

TOOL HEAD, MACHINE TOOL AND BORING METHOD OF BORE OF CYLINDER BLOCK USING THE MACHINE TOOL

TECHNICAL FIELD

The present invention relates to a tool head having a grinding tool, a machine tool having a boring tool and a grinding tool, and a method of boring a cylinder block using such a machine tool.

BACKGROUND ART

Machining processes for boring cylinder blocks that make up engine components include a boring process (a fine boring process or the like) for forming a bore to a predetermined diameter inside of a cylinder block, and a grinding process (a honing process or the like) for subsequently grinding the bore surface. If the boring and grinding processes can consecutively be performed on a single main shaft of a machine tool, then the cylinder block becomes free of misalignment with the tools, which otherwise would be caused if the cylinder block were moved between different machine tools and chucked again. Therefore, the cylinder block can be machined properly and efficiently. For consecutively performing a boring process and a grinding process, the machine tool disclosed in Japanese Patent Publication No. 60-052883 includes a mechanism incorporated within a main shaft, for enabling a boring tool and a grinding tool to project alternatively and radially outwardly from the main shaft.

Japanese Patent No. 3270683 discloses a machine tool having a first support unit and a second support unit for supporting a main shaft, in order to dispense with an oscillation mechanism for changing the main shaft actuating processes between a boring process and a grinding process. During the boring process, the first support unit and the second support unit are pressed against each other for increased rigidity. During the grinding process, the second support unit is spaced from the first support unit, thereby facilitating reciprocating movement through weight reduction.

In the machine tool disclosed in Japanese Patent Publication No. 60-052883, a balancing weight having substantially the same weight as a support unit is connected to the support unit by a wire, so as to compensate for the weight of the support unit. However, this results in the machine tool having a large size and an increased weight.

In Japanese Patent No. 3735487, the present applicant has proposed an invention directed to a honing process for rotating and moving back and forth a honing head, which comprises a tool and grinding stones mounted on an outer circumstantial surface of the tool, inside of a cylindrical hole. According to the disclosed invention, if the overrun dimensions of the tool head at one end and other end of the hole are different from each other, then a schedule for making up for the difference between the overrun dimensions of the tool head at the respective ends is inserted into a schedule for moving the tool head back and forth, depending on the difference between the overrun dimensions of the tool head at the respective ends. In accordance with such a schedule that has been compensated for by the overrun dimensions, although the grinding stones overrun in the honing process mechanism, the amount per unit time at which the grinding stones are not performing grinding is large at the portion of the hole in the workpiece between the respective ends thereof is ground, that is, the portion between the respective ends of the hole where an amount per unit time at which the grinding stones perform grinding is small, is ground. According to the honing process, it is desirable to position the tool head with high accuracy.

In the machine tool disclosed in Japanese Patent No. 3270683, during the honing process, the second support unit is reciprocally moved in spaced relation to the first support unit. This acts to reduce the inertial mass of the moving body and to accelerate the moving body quickly under a constant driving force, so that the moving body can reach a desired high speed when it is reciprocally moved.

With the disclosed mechanism, however, although the moving body is lightweight, it tends to flex because rigidity attained by only the first support unit is small. The moving body reaches a resonance point in a small number of reciprocating cycles (Hz) per unit time, and becomes difficult to reciprocate at high speed. During the honing process, although the moving body can quickly be accelerated since it is lightweight, the main shaft is reciprocally moved at a relatively low speed, resulting in a longer machining time. The moving body includes the main shaft, a mechanism by which the main shaft is supported, and a mechanism for rotating the main shaft.

Furthermore, the honing process requires a complex structure for separating the first support unit and the second support unit from each other. Further, the movable part is heavy, making it difficult to rotate the main shaft at high speed. Therefore, since the main shaft is rotated at a relatively low speed during the boring process, the machining time tends to be long.

The machine tool used for the boring process and the grinding process can be used to machine a bore inside of a cylinder block, which forms a workpiece, to a nearly perfect circular finish.

However, even if a bore in a cylinder block of an automobile engine can be machined to a perfect circular finish by itself, the bore will become deformed when a cylinder head and a crankcase are assembled onto the cylinder block, in a subsequent production process. Deformation of the bore tends to increase sliding resistance between the bore and the piston when the engine is in use, with the possible result that the engine may fail to produce a desired output power.

Japanese Patent Publication No. 51-025523 reveals that a dummy head, having a hole greater in diameter than a bore in a cylinder block and similar in rigidity to a cylinder head, is mounted on the cylinder block. Then, after the cylinder block has been placed under the same conditions as when the cylinder head is fastened to the cylinder block, the bore is formed in the cylinder block from the larger-diameter hole. Further, various proposals for machining the bore with greater accuracy have been made with respect to the dummy head, for example as shown in Japanese Laid-Open Patent Publication No. 2000-052228.

Japanese Patent Publication No. 61-057121 discloses a cylinder block, which is bored while a cylinder periphery thereof is being pressed by a presser rather than a dummy head.

According to the above conventional art, each time a cylinder body is bored in a production process, a dummy head or the like needs to be attached and detached. Therefore, productivity is lowered. In addition, it is difficult for the dummy part to reproduce the same conditions as a fully assembled product.

For boring cylinder heads, accordingly, there has been a demand for a highly productive machining process, which is capable of reproducing a state closer to that of an assembled product state. In order to realize such a machining process, there is a need for a machine tool capable of performing a more accurate boring process.

The present applicant has proposed a compound machine tool, which is capable of performing a boring process and a honing process in a composite fashion in Japanese Patent No. 3270683. The compound machine tool dispenses with the oscillation mechanism, which otherwise would be used in the honing process, thus saving space along the production line, simplifying facilities, and lowering the cost required to manufacture machined parts. The compound machine tool can machine workpieces with increased shaft rigidity, while highly accurately performing the boring process under higher machining loads.

With the above machine tool, the boring tool exerts radially expanding forces, and is radially positionally controlled under hydraulic pressure. Consequently, it is difficult to control (i.e., finely adjust) the expanding forces and the expanded position, which poses limitations on efforts to perform much more accurate boring processes.

Japanese Patent Publication No. 60-052883 discloses, in relation to such a machine tool, a honing tool head adapted to be mounted on the main shaft of a honing machine tool in facing relation to a workpiece for honing the workpiece. The honing tool head is formed having rough grinding stones and fine grinding stones.

FIG. 33 of the accompanying drawings shows a side view of such a tool head 500. The tool head 500 has rough grinding stones 502 and fine grinding stones 504, which are alternately inserted into holes 505 that are defined radially at equal intervals in the tool head.

As shown in FIG. 34 of the accompanying drawings, the tool head 500 has three rough grinding stones 502 and three fine grinding stones 504 fixed respectively onto rough grinding stone bases 506 and fine grinding stone bases 508. The rough grinding stones 502 and the fine grinding stones 504 are radially movable, i.e., radially expansible and contractible, in the directions indicated by the arrows B, while being guided by the holes 505 in the same positions axially on the tool head 500.

The tool head 500 also has a rough grinding tapered cone (cone shaft) 510 and a fine grinding tapered cone (cone shaft) 512, which are individually slidably inserted therein for expanding and contracting the rough grinding stone bases 506 and the fine grinding stone bases 508.

As shown in FIGS. 34 and 35 of the accompanying drawings, the rough grinding tapered cone 510 has tapers 510a, 510b, including tapered surfaces against which the rough grinding stone bases 506 are held in slidable abutment. Similarly, as shown in FIGS. 34 and 36 of the accompanying drawings, the fine grinding tapered cone 512 has tapers 512a, 512b, including tapered surfaces against which the fine grinding stone bases 508 are held in slidable abutment.

The rough grinding tapered cone 510 has a distal end portion divided into three arms, with gaps 514 defined therebetween. The tapers 512a, 512b of the fine grinding tapered cone 512 are inserted into the gaps 514.

Operation of the tool head 500 for radially expanding and contracting the rough grinding stones 502 and the fine grinding stones 504 when the tool head 500 performs a honing process shall be described below.

For expanding the rough grinding stones 502, the rough grinding tapered cone 510 is lifted in the direction indicated by the arrow A1 in FIG. 37A of the accompanying drawings. The tapers 510a, 510b press against inner slanted surfaces 506a, 506b of the rough grinding stone bases 506. Therefore, the rough grinding stones 502 are expanded radially in the directions indicated by the arrows B (radially outwardly). For contracting the rough grinding stones 502 from the expanded position, the rough grinding tapered cone 510 is depressed in the direction indicated by the arrow A2, and the rough grinding stones 502 are contracted in directions opposite to the directions indicated by the arrows B (radially inwardly).

Similarly, for expanding the fine grinding stones 504, the fine grinding tapered cone 512 is lifted in the direction indicated by the arrow A1 in FIG. 37A of the accompanying drawings. The tapers 512a, 512b press against inner slanted surfaces 508a, 508b of the fine grinding stone bases 508. Therefore, the fine grinding stones 504 are expanded radially outwardly in the directions indicated by the arrows B. For contracting the fine grinding stones 504 from the expanded position, the fine grinding tapered cone 512 is depressed in the direction indicated by the arrow A2, and the fine grinding stones 504 are contracted in directions opposite to the directions indicated by the arrows B (radially inwardly).

The honing process includes a process in which the rough grinding stones 502 and the fine grinding stones 504 are simply expanded or unexpanded and the rough grinding stones 502 and the fine grinding stones 504 machine an inner surface of the workpiece. Further, the honing process includes a process in which an inside diameter of the workpiece is measured by an air micrometer inside diameter measuring device (not shown), and depending on an elapsed machining time and a change in the inside diameter, forces for lifting the rough grinding tapered cone 510 and the fine grinding tapered cone 512 are adjusted, whereby the workpiece is machined by the rough grinding stones 502 and the fine grinding stones 504 while forces for expanding the rough grinding stones 502 and the fine grinding stones 504 are varied. The latter process makes it possible to machine the workpiece with extremely high accuracy.

With respect to the latter process, however, it has been confirmed that, even if the forces for lifting the rough grinding tapered cone 510 and the fine grinding tapered cone 512 are increased, forces for expanding the rough grinding stones 502 and the fine grinding stones 504 may change only slowly, or may not change much at all in reality, i.e., the rough grinding stones 502 and the fine grinding stones 504 cannot be expanded quickly.

The above problem is caused by the existence of reactive forces F1 (i.e., forces acting in directions opposite to the directions indicated by the arrows B) that act from the workpiece when the rough grinding tapered cone 510 is lifted in the direction indicated by the arrow A1 in FIG. 38 of the accompanying drawings, so as to expand the rough grinding stones 502 radially in the directions indicated by the arrows B. As shown in FIGS. 38 and 39 of the accompanying drawings, when the gaps 514 in the rough grinding tapered cone 510 are reduced radially inwardly under the reactive forces F1, the rough grinding tapered cone 510 flexes, thus tending to produce frictional forces F2 between the rough grinding tapered cone 510 and the fine grinding tapered cone 512 (see FIGS. 37A, 38B).

The frictional forces F2 produced between the fine grinding tapered cone 512 and the rough grinding tapered cone 510 due to flexing of the rough grinding tapered cone 510 result in a difference (transmission loss) between the forces that lift the rough grinding tapered cone 510 and the fine grinding tapered cone 512 and the forces that serve to expand the rough grinding stones 502 and the fine grinding stones 504. This difference is the major factor responsible for the above-mentioned problems.

DISCLOSURE OF THE INVENTION

It is an object of the present invention to provide a machine tool, which is capable of rotating a main shaft at high speeds in a boring process, and for reciprocally moving the main shaft at high speeds, in a honing process.

Another object of the present invention is to provide a machine tool, which is capable of performing a more accurate machining process when a cylinder block is bored, for example.

Still another object of the present invention is to provide a method of boring a cylinder block, while reproducing a state closer to an assembled product state, thereby increasing productivity.

Yet another object of the present invention is to provide a tool head having at least two types of honing grinding stones, including rough grinding stones and fine grinding stones, wherein the tool head is capable of adjusting the forces that act to expand the grinding stones depending on the forces applied for lifting the cone shafts. Further, the present invention provides a machine tool having such a tool head.

A machine tool according to an aspect of the present invention includes a tool head having a boring cutter and a grinding tool, a rotating means for rotating the tool head, a main shaft for connecting the rotating means to the tool head and for transmitting rotational power from the rotating means to the tool head, the main shaft extending axially through a support and being rotatably supported within the support, and a moving means for moving the support in an axial direction of the main shaft, wherein the main shaft remains unchanged in diameter and is rotated by the rotating means in both a boring process during which the tool head is rotated and moved towards a workpiece while the boring cutter bores the workpiece, and a grinding process in which the tool head is rotated and reciprocally moved while the grinding tool grinds the workpiece.

In a boring process and a grinding or honing process, the main shaft is rotated while the diameter of the main shaft remains unchanged. The second support unit does not need to be reciprocally moved separately from the first support unit, and can reciprocally move the main shaft at high speeds during the honing process. During the boring process, since the main shaft is rotated while its diameter remains unchanged, a complex mechanism is not required in order to interconnect the first support unit and the second support unit, thereby making it possible to rotate the main shaft at high speeds. Therefore, the periods of time required to machine the workpiece during both the boring process and the honing process can be shortened. Since the mechanism of the main shaft does not have to be changed during the boring process and the honing process, the machine tool is of a simple structure, while being highly durable and inexpensive to manufacture, and no time is required for changing the main shaft mechanism. Consequently, the overall time required for machining the workpiece can be reduced.

The moving means may comprise a linear motor. Additionally, the moving means may comprise a first moving means for moving the support during the grinding process, and a second moving means for moving the support during the boring process, wherein at least the first moving means comprises a linear motor. Since a linear motor does not have rotating parts and can directly move the support in a linear manner without the need for converting the direction in which power is transmitted, such a linear motor is easy to handle and can be operated efficiently. Even if the support has a relatively large mass, it can be moved quickly and reliably by the linear motor.

The main shaft may include an axially extending bar, wherein the tool head is moved axially by the bar. The tool head may further include cone shafts therein for radially moving the boring cutter and the grinding tool.

The moving means may include a plurality of linear motors that are disposed in opposite relation to each other across the main shaft.

The main shaft may be housed in a first frame and supported therein by a support mechanism, whereby the first moving means actuates the first frame. The first moving means may be supported by a second frame disposed in surrounding relation to the first moving means and the first frame, whereby the second moving means actuates the second frame.

According to another aspect of the present invention, a machine tool includes an expanding means for radially expanding boring tools and honing grinding stones, wherein the expanding means includes a power converting means including a servomotor, a pinion gear, and a ring gear and having a vibration blocking function. When the boring tools and the honing grinding stones are radially expanded, the expanding forces and expanded positions thereof can easily be controlled with high accuracy.

According to still another aspect of the present invention, a method of boring a cylinder block generates corrected NC data, which can effectively be used in producing the cylinder block. A cylinder block can be manufactured with bores of perfectly circular cross-sectional shape, without the need for a dummy head to be mounted on the cylinder block. Cylinder blocks can thus be manufactured with increased productivity.

A tool head according to yet another aspect of the present invention is effective to reduce flexing of the first cone shaft due to reactive forces that are produced when the first cone shaft is lifted by a moving member in order to radially expand a first tool base. Frictional forces generated between the first cone shaft and the second cone shaft are greatly reduced, whereby a loss of the expanding forces that are transmitted from the moving member to the first and second tool bases is greatly reduced.

The first cone shaft has an oblong hole defined therein by a lid member that is mounted on the first cone shaft. When the lid member is detached, the second cone shaft can easily be inserted into the first cone shaft. Thereafter, the lid member is mounted on the first cone shaft. The tool head can thus easily be assembled and disassembled.

BRIEF DESCRIPTION OF THE DRAWINGS

FIG. 36 is a perspective view of the conventional tool head with fine grinding stones disposed on a fine grinding tapered cone;

BEST MODE FOR CARRYING OUT THE INVENTION

Machine tools according to embodiments of the present invention shall be described below with reference to the accompanying drawings.

Figure 1:
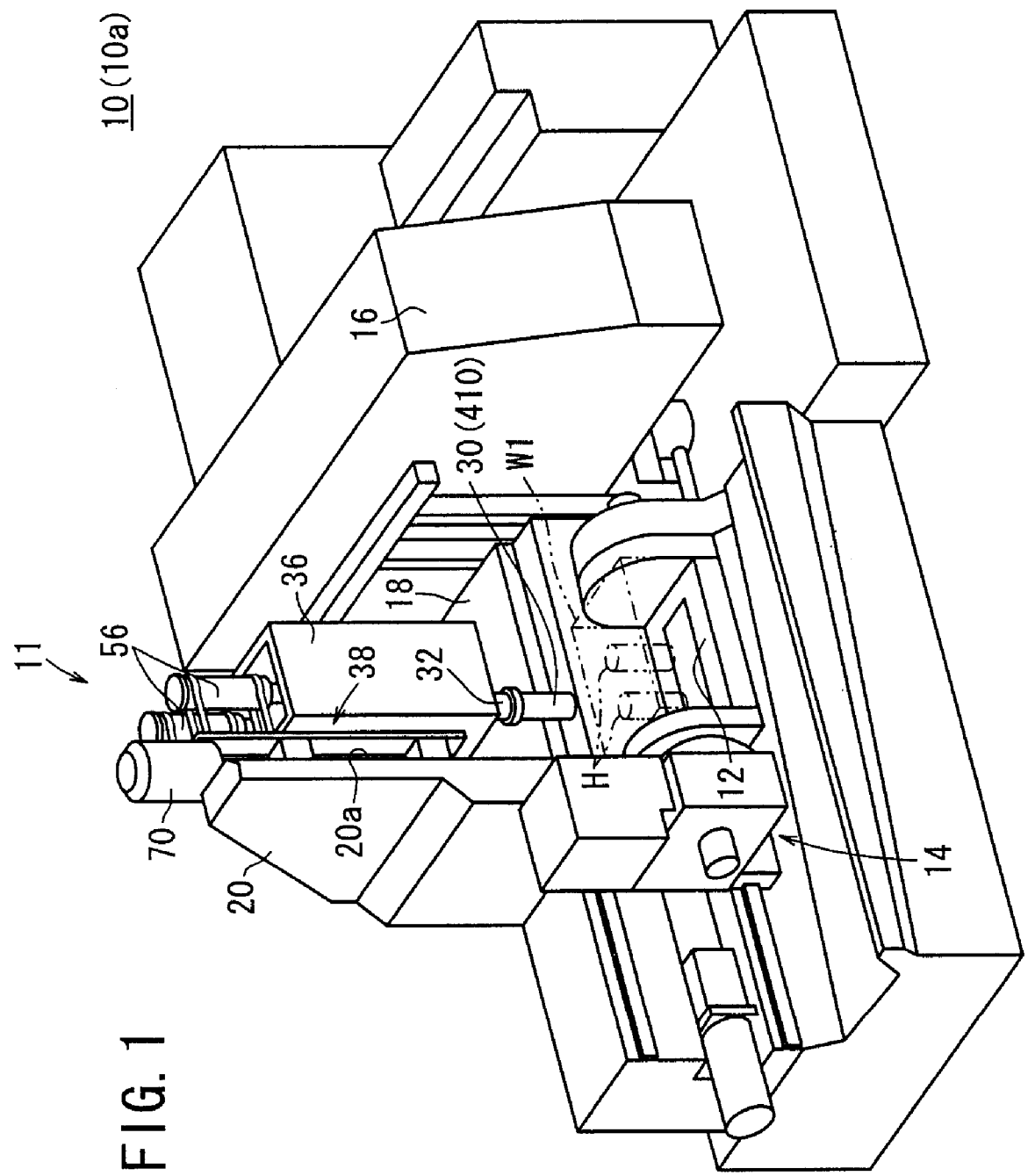
FIG. 1 is a perspective view of a compound machine tool according to a first embodiment of the present invention.

As shown in FIG. 1, a compound machine tool 10 according to a first embodiment of the present invention is disposed in a machining line for machining a cylinder, for example, of an automobile internal combustion engine forming a workpiece W1. The machine tool 10 has a main shaft actuator assembly 11 for actually boring and honing (grinding) the workpiece W1, a workpiece feed mechanism 14 reciprocally movable between a workpiece charger in front of the machine tool and a lower portion of the main shaft actuator assembly 11 for feeding a pallet 12 on which a charged workpiece is placed and fixedly mounted, and a monitoring control console 16 for electrically controlling the main shaft actuator assembly 11 and the workpiece feed mechanism 14. The machine tool 10 is placed as a system in the machining line. The main shaft actuator assembly 11 is mounted on a surface 20a of a column 20 vertically erected on the upper surface of a horizontal base 18 near the workpiece feed mechanism 14, i.e., near the front side of the machine tool 10.

Figure 2:
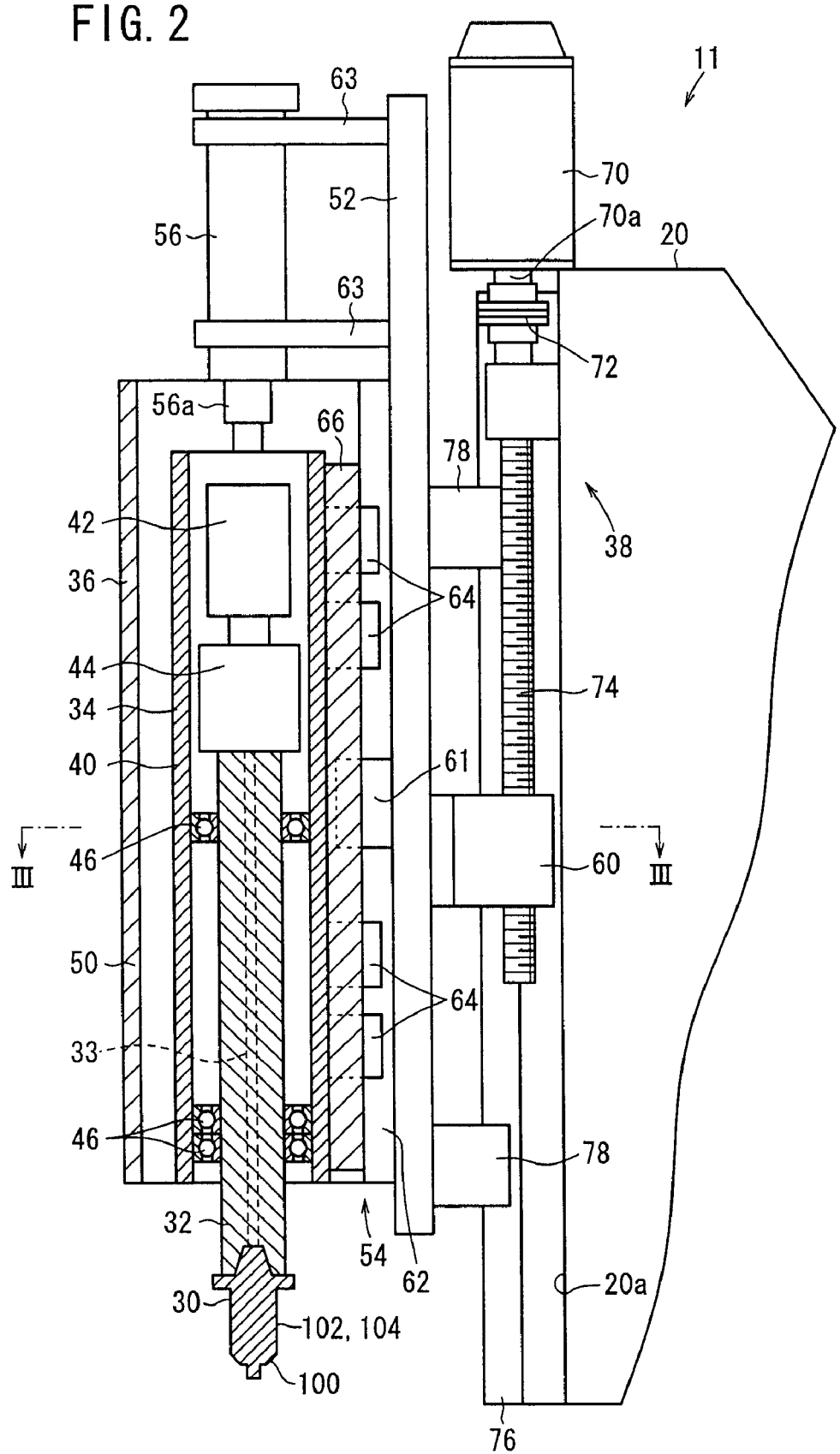
FIG. 2 is a side elevational view, partly in cross section, of a main shaft actuator assembly of the machine tool shown in FIG. 1.
Figure 3:
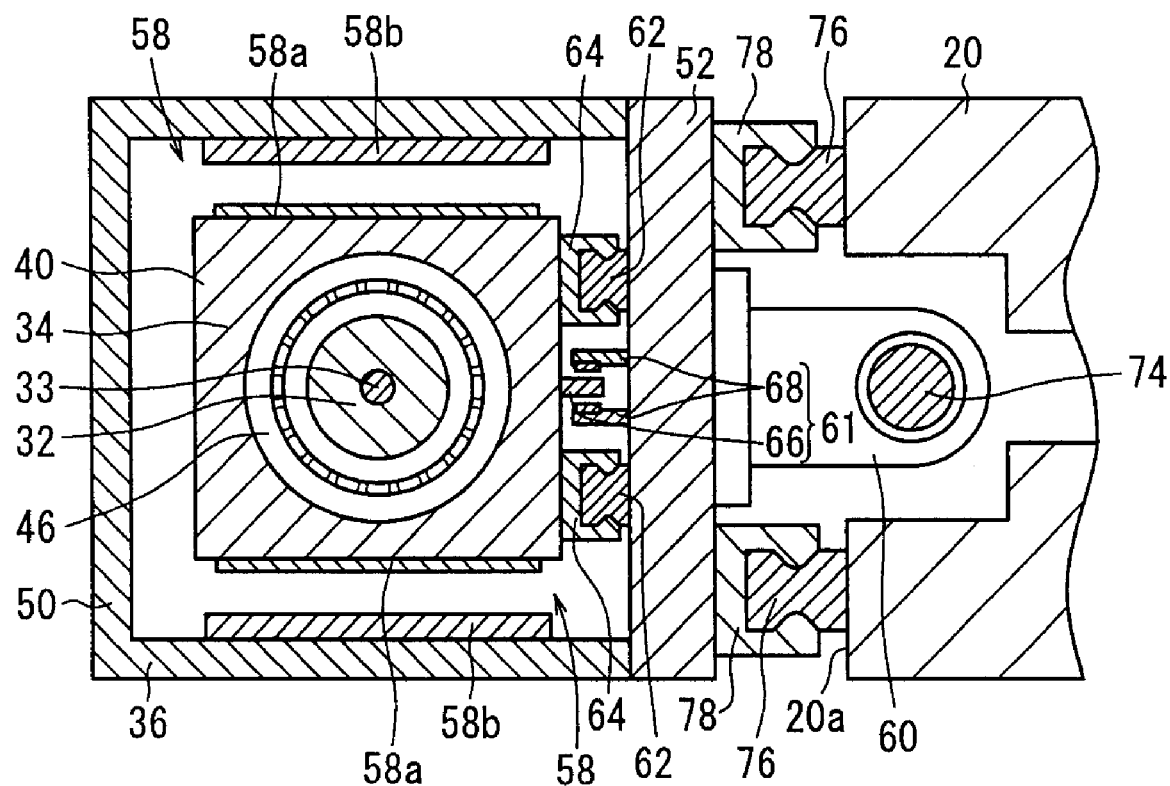
FIG. 3 is a sectional front elevational view of a first support unit of the main shaft actuator assembly shown in FIG. 2.
Figure 4:
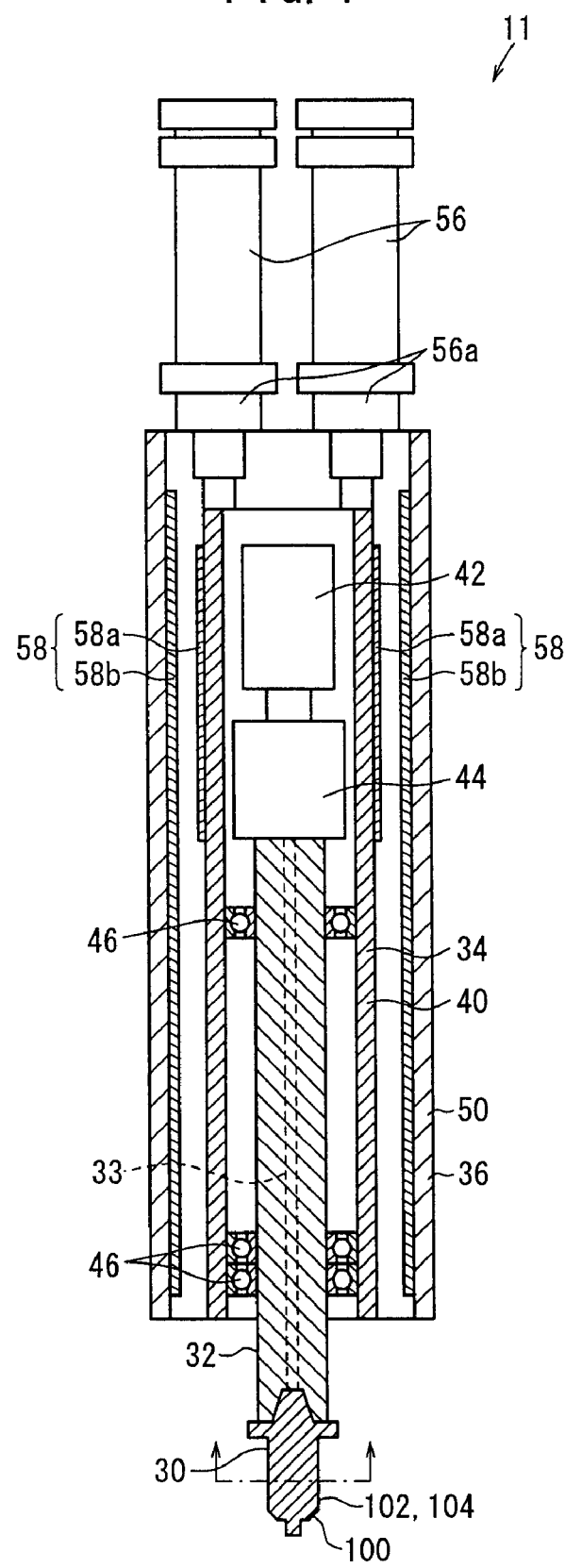
FIG. 4 is a plan view, partly in cross section, of the main shaft actuator assembly shown in FIG. 2.

As shown in FIGS. 2 through 4, the main shaft actuator assembly 11 comprises a main shaft (spindle) 32 having a tool head (machining head) 30 on a lower distal end thereof, a first support unit (support) 34 by which the main shaft 32 is rotatably supported, a second support unit (support) 36 by which the first support unit 34 is vertically slidably supported, and a column slide mechanism 38 by which the second support unit 36 is vertically slidably supported on the column 20. A vertically extending bar 33 is coaxially inserted into the main shaft 32.

The first support unit 34 comprises a first frame 40 in the form of a vertically elongate prismatic tube, an actuator 42 disposed in an upper portion of the first frame 40 for rotating the main shaft 32 about its own axis, a main shaft motor 44 disposed between the main shaft 32 and the actuator 42, and a plurality of bearings (bearing mechanism) 46 which rotatably support the main shaft 32 in the first frame 40. The tool head 30 on the main shaft 32 projects downwardly below the first frame 40. The actuator 42 is connected to the upper end of the bar 33, and operates the tool head 30 through the bar 33. Specifically, the bar 33, which is inserted inside of the main shaft 32, is moved vertically by the actuator 42.

The second support unit 36 comprises a second frame 50 in the form of a vertically elongate prismatic tube, a back plate 52 fixed to the second frame 50, an inter-frame slide mechanism 54 supporting the first support unit 34, two balancing cylinders 56 connected to the upper end of the first support unit 34, a pair of laterally spaced linear motors 58 for vertically sliding the first support unit 34, a nut 60 projecting rearwardly from the back plate 52 and engaging with the column slide mechanism 38, and a brake mechanism 61 for braking the first support unit 34.

The second frame 50 horizontally surrounds the first frame 40 and is vertically longer than the first frame 40. The back plate 52 has an upper portion projecting upwardly above the second frame 50, whereby the two balancing cylinders 56 are secured to the projecting upper portion of the back plate 52 by brackets 63. The inter-frame slide mechanism 54 has two first rails 62 extending vertically and mounted on a front surface of the back plate 52, and a plurality of sliders 64 slidably engaging the first rails 62. The sliders 64 are fixedly mounted on a rear surface of the first frame 40 for slidably supporting the first support unit 34 on the back plate 52.

The linear motors 58 comprise respective magnets 58a fixed to respective opposite outer side surfaces of the first frame 40, and respective stators 58b mounted on respective opposite inner side surfaces of the second frame 50 in facing relation to the respective magnets 58a. When magnetic fields generated by the stators 58b are moved by a controller (not shown) the magnets 58a are moved, causing the first support unit 34 to slide vertically along the first rails 62 with respect to the second support unit 36.

Since the linear motors 58 are disposed in confronting relation to each other across the main shaft 32, attractive forces and repulsive forces between the magnets 58a and the stators 58b cancel each other out during movement of the magnetic fields generated by the stators 58b. Therefore, the first support unit 34 can be moved smoothly with respect to the second support unit 36.

Because the ball screws transmit rotation, linear actuating means in the form of ball screws for actuating the workpiece require auxiliary mechanisms, including externally and internally threaded members (screws and nuts), bearings supporting the externally threaded member, and a coupling connecting a power source and the externally threaded member to each other. Since these mechanisms tend to produce torsion and backlash, linear actuating means in the form of ball screws are liable to cause errors between a target position and an actual position.

By contrast, the linear motors 58 of the machine tool 10 are free of such mechanisms, and are less subject to such errors between a target position and an actual position than the linear actuating means. The linear motors 58 include a linear encoder (not shown) comprising a scale and a head attached to a moving body. The linear motors 58 make it possible to position the moving body within an accuracy range from ±0.5 to 1.0 µm, which is about 1/10 of the accuracy range that can be achieved by the linear actuating means in the form of ball screws.

The compound machine tool 10 is suitable for use in a honing process where positioning accuracy of a tool head is important, for example, the honing process disclosed in Japanese Patent No. 3735487.

Linear motors 58 are capable of moving the moving body at higher speeds, while maintaining positioning accuracy, than a linear actuating means in the form of ball screws. Specifically, although the linear actuating means in the form of ball screws can move the moving body at high speeds, such actuating means require the ball screw to have an increased lead pitch, at the sacrifice of resolution and positioning accuracy.

Since the positioning accuracy of the linear motors 58 is governed only by the resolution of the linear encoders, the positioning accuracy is not lowered when the linear motors 58 move the moving body at higher speeds. Therefore, linear motors 58 are suitable for the honing process.

The balancing cylinders 56 have respective downwardly extending rods 56a connected to an upper end of the first support unit 34. The balancing cylinders 56 compensate for (i.e., cancel), partly or wholly, the weight of the first support unit 34 under the pressure of compressed air. Therefore, the apparent weight of the first support unit 34 is essentially nil, thus allowing the linear motors 58 to move and hold the first support unit 34 using small forces.

The balancing cylinders 56 are of a small size, yet are still capable of generating sufficient forces with compressed air. Therefore, the balancing cylinders 56 allow the main shaft actuator assembly 11 to be lighter and more compact than a conventional weight-compensating device in the form of a balancing weight.

If a conventional weight-compensating device, in the form of the balancing weight, were employed, whereby the first support unit 34 serves as the moving body, then since the inertial mass of the moving body would be equal to the mass of the first support unit 34 and the mass of the balancing weight, a larger force to accelerate the moving body is required.

However, with the compound machine tool 10 employing balancing cylinders 56, since the inertial mass of the moving body is equal to the mass of the first support unit 34 only, the balancing cylinders 56 are capable of accelerating the moving body at higher speeds than the conventional weight-compensating device in the form of a balancing weight.

Furthermore, the weight of the compound machine tool 10 may change and be compensated for in real time, depending on the acceleration of the moving body. Specifically, for increasing or reducing the weight to be compensated for, or for accelerating the moving body upwardly, the air pressure in one of the balancing cylinders 56 may be actively increased to assist in accelerating the moving body upwardly. Further, for accelerating the moving body downwardly, the air pressure in the other of the balancing cylinders 56 may be actively increased to assist in accelerating the moving body downwardly.

The brake mechanism 61 comprises a brake plate 66 that extends vertically and is fixed to the rear surface of the first support unit 34, and two brake pads 68 for gripping the brake plate 66 therebetween. The brake pads 68 are mounted on the front surface of the back plate 52, and can be displaced toward each other to grip the brake plate 66 by a controller (not shown). The brake mechanism 61 is capable of securely holding the first support unit 34 in position on the back plate 52 without the need for energization of the linear motors 58, wherein the first support unit 34 is slidably supported through the sliders 64 on the first rails 62 disposed on the back plate 52 that is fixed in the second frame 50 of the second support unit 36.

The column slide mechanism 38 comprises a slide motor 70 disposed on an upper portion of the column 20 and having a motor shaft 70a thereof directed downwardly, a ball screw 74 coupled to the motor shaft 70a by a shaft coupling 72, bearings, not shown, two second rails 76 that extend vertically and are mounted on the surface 20a of the column 20, and a plurality of sliders 78 that slidably engage with the second rails 76. The sliders 78 are fixedly mounted on a rear surface of the back plate 52 in order to slidably support the second support unit 36 on the column 20.

The nut 60 is threaded over the ball screw 74. When the slide motor 70 is energized, the nut 60 moves on and along the rotating ball screw 74, thus causing the second support unit 36 to slide vertically along the second rails 76 with respect to the column 20.

The tool head 30 includes boring tools (boring cutters) 100 disposed on a lower distal end thereof, a plurality of rough grinding stones (grinding tools or rough honing grinding stones) 102, and a plurality of fine grinding stones (grinding tools or fine honing grinding stones) 104 disposed on a shank.

Figure 5:
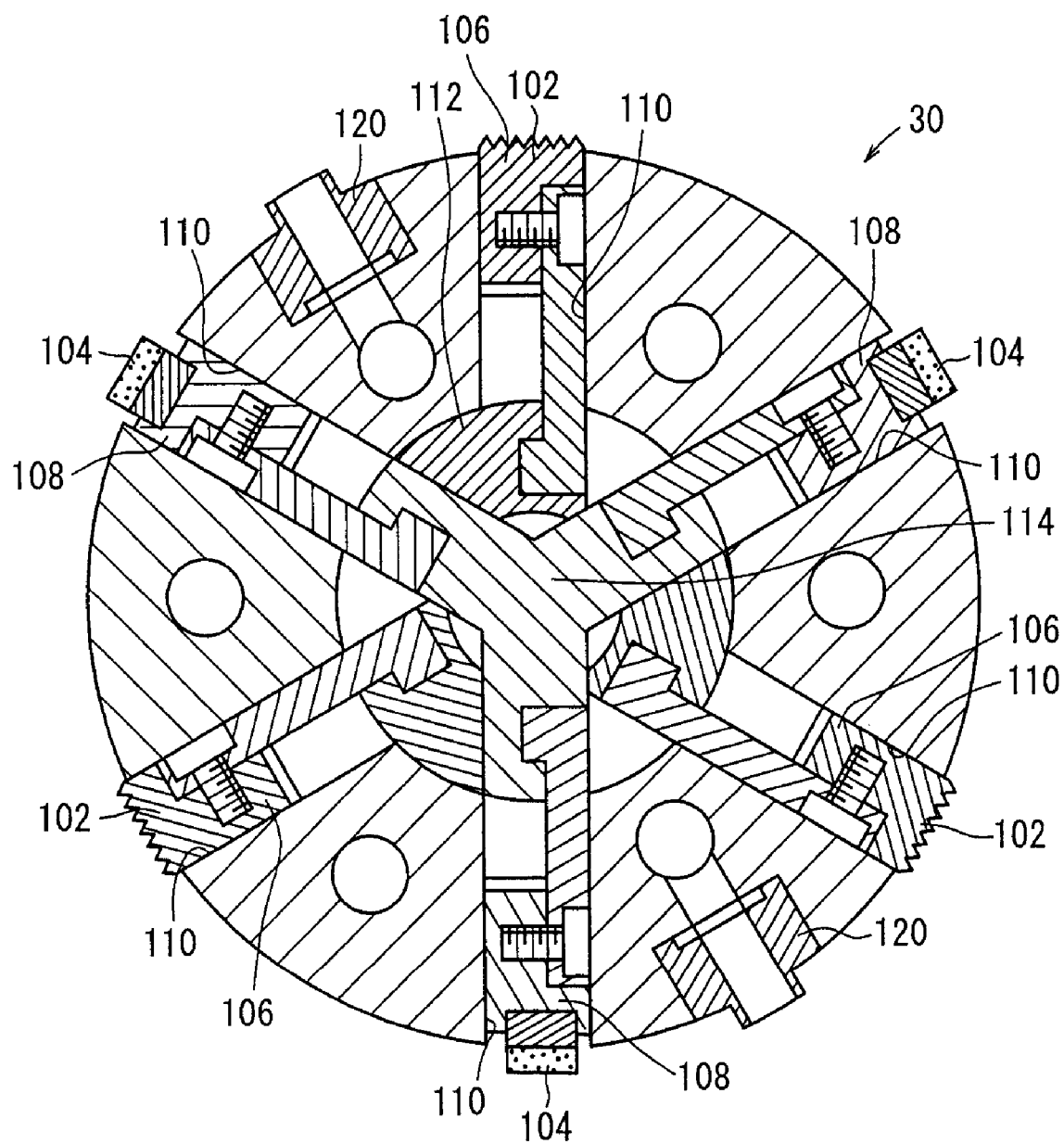
FIG. 5 is a sectional plan view of a tool head of the machine tool shown in FIG. 1.

As shown in FIG. 5, the tool head 30 has three rough grinding stones 102 and three fine grinding stones 104. The rough grinding stones 102 are angularly spaced at equal angular intervals of 120° and fixedly mounted respectively onto grinding stone bases (grinding stone shoes) 106. The fine grinding stones 104 also are angularly spaced at equal angular intervals of 120° and fixedly mounted respectively onto grinding stone bases (grinding stone shoes) 108. Each of the fine grinding stones 104 is positioned adjacently between two of the rough grinding stones 102. Each of the rough grinding stones 102 and an adjacent one of the fine grinding stones 104 are angularly spaced from each other by 60°.

The grinding stone bases 106 and 108 are radially slidably guided within respective guide holes 110. The tool head 30 has a central hollow space housing therein cone shafts (expanding cone shafts) 112, 114 for radially moving the grinding stone bases 106 and 108 back and forth. Although not shown, the cone shaft 112 has slanted surfaces thereon for moving the grinding stone bases 106 by means of a cam action. When the cone shaft 112 is axially moved, the slanted surfaces thereof radially move the grinding stone bases 106 back and forth. Similarly, the cone shaft 114 has slanted surfaces thereof for moving the grinding stone bases 108 by means of a cam action. When the cone shaft 114 is axially moved, the slanted surfaces thereof radially move the grinding stone bases 108 back and forth. The cone shafts 112, 114 are moved axially by the actuator 42 through the bar 33.

The boring tools 100 are secured to respective tool bases, not shown. The boring tools 100 are guided within respective guide holes (not shown) so as to be expanded and contracted in radial directions. The boring tools 100 can be moved radially back and forth by the cone shaft 112 or the cone shaft 114, through means of a cam action.

The tool head 30 has a pair of air nozzles 120 that eject compressed air in order to measure the diameter of a hole H (see FIG. 1) in the workpiece W1, based on the pressure or rate of the ejected compressed air.

Operation of the machine tool 10 for machining a hole H in the workpiece W1 shall now be described below (see FIG. 1).

First, the workpiece feed mechanism 14 is operated to feed and secure the workpiece W1 such that a hole H1 (a cylinder bore or the like) in the workpiece W1 is positioned directly below the tool head 30. The brake plate 66 is gripped by the brake pads 68 of the brake mechanism 61 in order to fix the first support unit 34 with respect to the second support unit 36. At this time, the rough grinding stones 102 and the fine grinding stones 104 are retracted inside the guide holes 110.

Then, the main shaft motor 44 rotates the main shaft 32 and the tool head 30, and the slide motor 70 rotates the ball screw 74 so as to move the second support unit 36 and the first support unit 34 downwardly at a predetermined speed, thereby enabling the boring tools 100 to bore a hole H of a predetermined diameter in the workpiece W1. At this time, the hole H can quickly be bored, because the main shaft 32 has a diameter that makes the main shaft 32 sufficiently rigid, and further, the main shaft 32 can be rotated at a high speed due to its hollow structure, with no separating mechanism or connecting mechanism being present therein (see FIG. 2).

While the boring tools 100 are boring the hole H in the workpiece W1, the linear motors 58 do not need to be energized, since the first support unit 34 is fixed by the brake mechanism 61 (see FIG. 3).

After the hole H has been bored in the workpiece W1 to a predetermined depth, the slide motor 70 is reversed to lift the first support unit 34 and the second support unit 36, whereupon the main shaft motor 44 is de-energized.

Then, the cone shaft 112 is moved axially to cause the rough grinding stones 102 to project radially a suitable distance, and the brake pads 68 of the brake mechanism 61 are opened to release the brake plate 66, so that the first support unit 34 can be lifted or lowered.

Then, the hole H in the workpiece W1 is roughly honed. The main shaft motor 44 is energized again, and the linear motors 58 are energized to reciprocally move the first support unit 34 (see FIG. 4). At this time, since the slide motor 70 is de-energized, the second support unit 36 remains fixed with respect to the column 20, and the first support unit 34 is moved reciprocally with respect to the column 20 and the second support unit 36. The rough grinding stones 102 are rotated in contact with the workpiece W1 while being lifted and lowered with respect to the inner surface of the hole H in the workpiece W1, thereby roughly honing the inner surface of the hole H.

Inasmuch as the weight of the first support unit 34 is compensated for by the balancing cylinders 56, no excessive loads are imposed on the linear motors 58. Thus, the linear motors 58 can lift and lower the first support unit 34 with only a small amount of electric power consumption. When the first support unit 34 is lifted and lowered, it acts as a linear system under balanced loads, and hence the first support unit 34 can be operated with increased controllability.

Since the first support unit 34 and the main shaft 32 are sufficiently rigid, they do not tend to flex and can be lifted and lowered at high speeds, so that the workpiece W1 can be machined in a reduced period of time. Since they are free of rotating parts and do not need to convert directions of motion, the linear motors 58 can directly move the first support unit 34 linearly. The linear motors 58 are thus simple in structure and efficient in operation, and can reliably operate the first support unit 34 even if the first support unit 34 has a relatively large mass.

After the rough honing process is finished, the main shaft motor 44 and the linear motors 58 are de-energized. The rough grinding stones 102 are retracted so as to be reduced in diameter, and the fine grinding stones 104 are expanded radially outwardly so as to be increased in diameter. Specifically, the cone shaft 112 is axially moved to retract the rough grinding stones 102 into the guide holes 110, while the cone shaft 114 is axially moved to cause the fine grinding stones 104 to project radially outward by a suitable distance.

Then, the hole H in the workpiece W1 is finely honed. The main shaft motor 44 is reenergized, and the linear motors 58 are energized to reciprocally move the first support unit 34. While in contact with the workpiece W1, the fine grinding stones 104 are rotated and lifted and lowered with respect to the inner surface of the hole H in the workpiece W1, thereby finely honing the inner surface of the hole H. As with the rough honing process, the fine honing process can be performed simply and efficiently in a short period of time.

Thereafter, the main shaft motor 44 and the linear motors 58 are de-energized. Then, a subsequent process is performed in order to measure and confirm the diameter of the hole H in the workpiece W1 with the air nozzles 120. The brake mechanism 61 locks the first support unit 34, and the slide motor 70 is energized to lift the first support unit 34 and the second support unit 36. Thus, the main shaft 32 is removed out of the hole H in the workpiece W1, thereby bringing the machining process on the hole H in the workpiece W1 to an end. Further, measuring and confirming the diameter of the hole H of the workpiece W1 by means of the air nozzles 120 can be performed either after completion of the rough honing process or during the rough honing process, or even during the fine honing process.

In the machine tool disclosed in Japanese Patent No. 3270683, during the honing process, the honing main shaft and the tool head, which are inserted in the main shaft for the boring process, are reciprocally moved as a moving body. That is, the honing main shaft and the tool head have to be smaller in diameter than the main shaft for the boring process, since they are inserted into the main shaft in order to conduct the boring process. Therefore, the honing main shaft and the tool head are not sufficiently rigid and tend to resonate at a given count (frequency) of reciprocating movements per unit time.

With the compound machine tool 10 according to the first embodiment, however, the main shaft 32 of one diameter is rotated during both the boring process and the honing process. Since the main shaft 32 can be handled mechanically as one mechanism in both the boring process and the honing process, no mechanism is required for changing the diameter of the main shaft 32. The main shaft 32 can be rotated at high speeds during the boring process, and can be reciprocally moved at high speeds during the honing process.

Specifically, since the first frame 40 supporting the main shaft 32 is disposed around the main shaft when conducting the boring process (the main shaft 32), only the first frame 40 and the main shaft 32 act as moving bodies during the honing process. The cross-sectional area of the moving body is greater than the cross-sectional area of the boring main shaft 32, and thus provides sufficient rigidity so as to prevent the moving body from resonating, even when reciprocally moved at high speeds.

Even though the weight of the moving body is large, it is compensated for by the balancing cylinders 56. Since the inertial mass of the moving body is smaller than the conventional weight compensating device in the form of a balancing weight, the moving body can be moved reciprocally at sufficiently high speeds, so that the machining time can be reduced.

The linear motors 58 are capable of moving the moving body at high speeds while maintaining desired positioning accuracy, and hence the linear motors 58 are suitable for the honing process. By contrast, in the machine tool disclosed in Japanese Patent No. 3270683, the main shaft for the boring process and the main shaft for the honing process are combined so as to operate properly during the boring process. These respective main shafts must be combined to operate during the boring process in order to make the rotating body sufficiently rigid, because cutting resistance is greater in the boring process than in the honing process.

With the compound machine tool 10 according to the first embodiment, the main shaft for the boring process has the same diameter as heretofore for required rigidity in the boring process, and does not require any separating mechanism for use during the honing process. Therefore, the inertial mass of the rotating body is reduced, thereby allowing the body to be rotated at high speeds, so that the machining time can be reduced.

Since the main shaft of the compound machine tool 10 does not require any change in mechanism during the boring and honing processes, the machine tool 10 is of a simple structure, is highly durable, and is inexpensive to manufacture. Further, no time is required for changing mechanisms of the main shaft, resulting in a shorter period of time to machine the workpiece W1.

Figure 6:
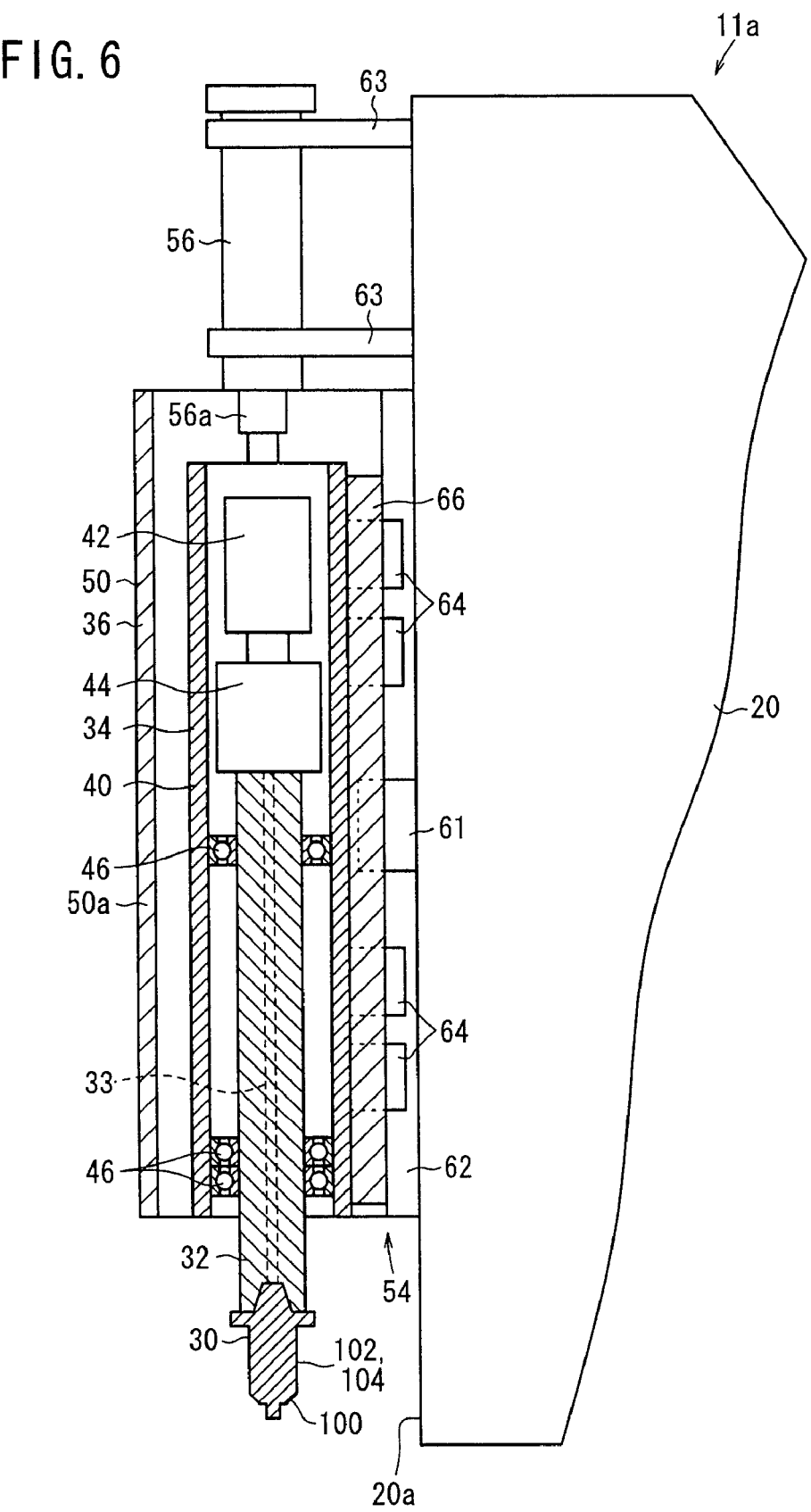
FIG. 6 is a plan view, partly in cross section, of a modification of the main shaft actuator assembly shown in FIG. 2.
Figure 7:
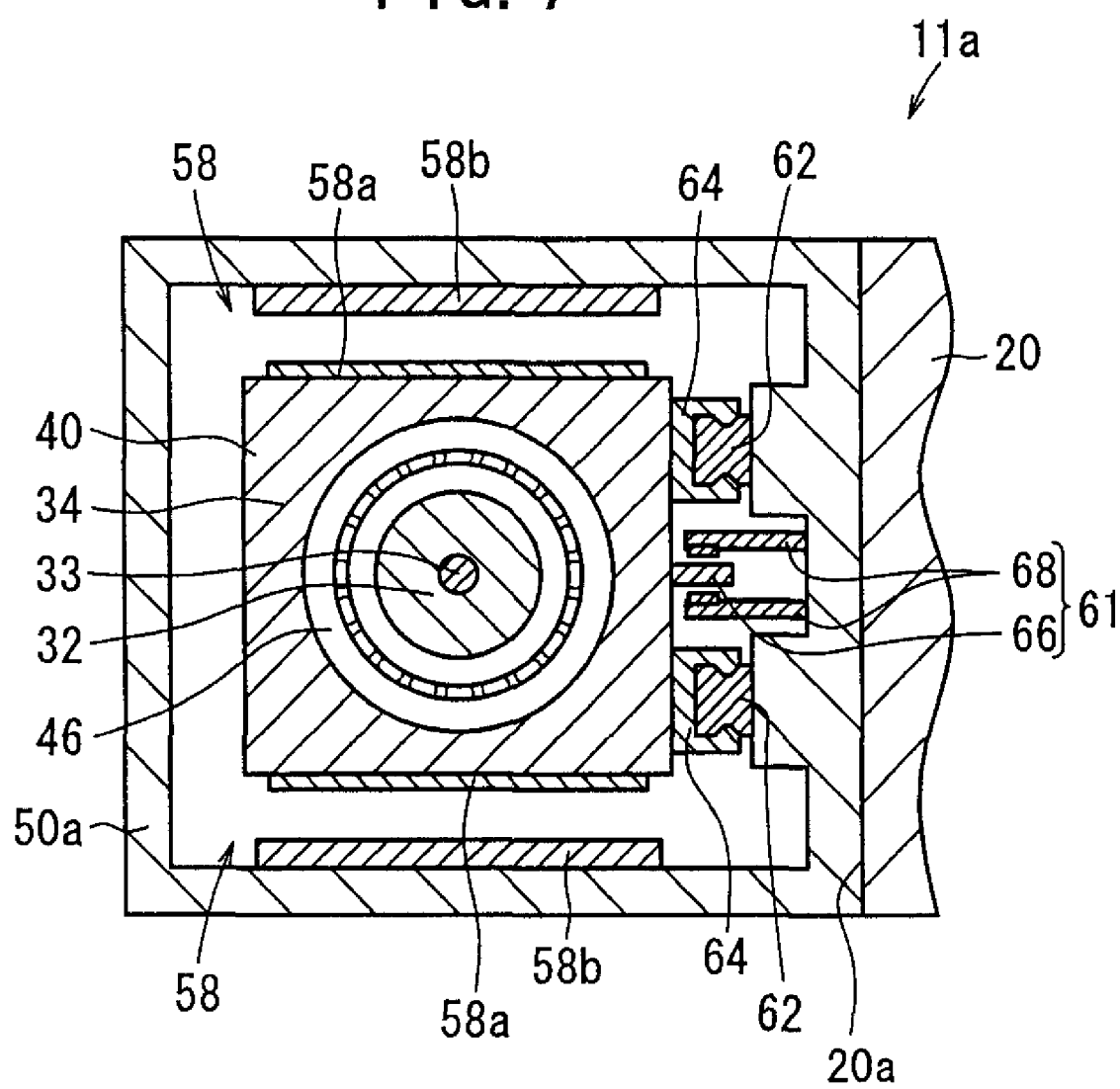
FIG. 7 is a plan view, partly in cross section, of the modified main shaft actuator assembly shown in FIG. 6.

In the above main shaft actuator assembly 11, the main shaft 32 is mounted on the column 20 by the first support unit 34, the second support unit 36, and the column slide mechanism 38. FIGS. 6 and 7 show a modified main shaft actuator assembly 11a having a simpler structure. The modified main shaft actuator assembly 11a shall be described below with reference to FIGS. 6 and 7. Parts of the modified main shaft actuator assembly 11a that are identical to those of the main shaft actuator assembly 11 of the machine tool 10 are denoted by identical reference characters, and shall not be described in detail below.

As shown in FIGS. 6 and 7, the main shaft 32 of the modified main shaft actuator assembly 11a is supported on the column 20 by the first support unit 34. The modified main shaft actuator assembly 11a does not have the second support unit 36 and the column slide mechanism 38 of the compound machine tool 10.

The first rails 62 are mounted on the surface 20a of the column 20, and the first support unit 34 is vertically movably supported on the first rails 62. The column 20 supports thereon a second frame 50a, which is essentially of the same shape as the second frame 50. The second frame 50a is disposed in surrounding relation to the first support unit 34. The linear motors 58 are disposed on the inner side surfaces of the second frame 50a and the outer side surfaces of the first frame 40, for lifting and lowering the first support unit 34 with respect to the column 20. The brake pads 68 of the brake mechanism 61 are mounted on the column 20 for locking the first support unit 34 in position on the column 20.

When the main shaft actuator assembly 11a lowers the main shaft 32 downwardly during the boring process, and lifts and lowers the main shaft 32 during the rough honing process and the fine honing process, the linear motors 58 move the first support unit 34 to move the main shaft 32. Since the main shaft 32 is lifted and lowered when boring and honing the hole H in the workpiece W1 entirely by the linear motors 58, the second support unit 36 and the column slide mechanism 38 are dispensed with, and hence the main shaft actuator assembly 11a can be of a simpler structure.

As with the compound machine tool 10, the main shaft actuator assembly 11a is simple in structure and efficient in operation, and further allows the workpiece W1 to be machined in a reduced period of time. Since the linear motors 58 of the main shaft actuator assembly 11a are operated during the boring process as well as during the honing process, so that the linear motors 58 of the main shaft actuator assembly 11a can generate sufficient pressing forces required during the boring process, the linear motors 58 should be of a type having a greater output rating than the linear motors 58 of the compound machine tool 10, which are energized only during the honing process.

A compound machine tool 210 according to a second embodiment of the present invention shall now be described below.

Figure 8:
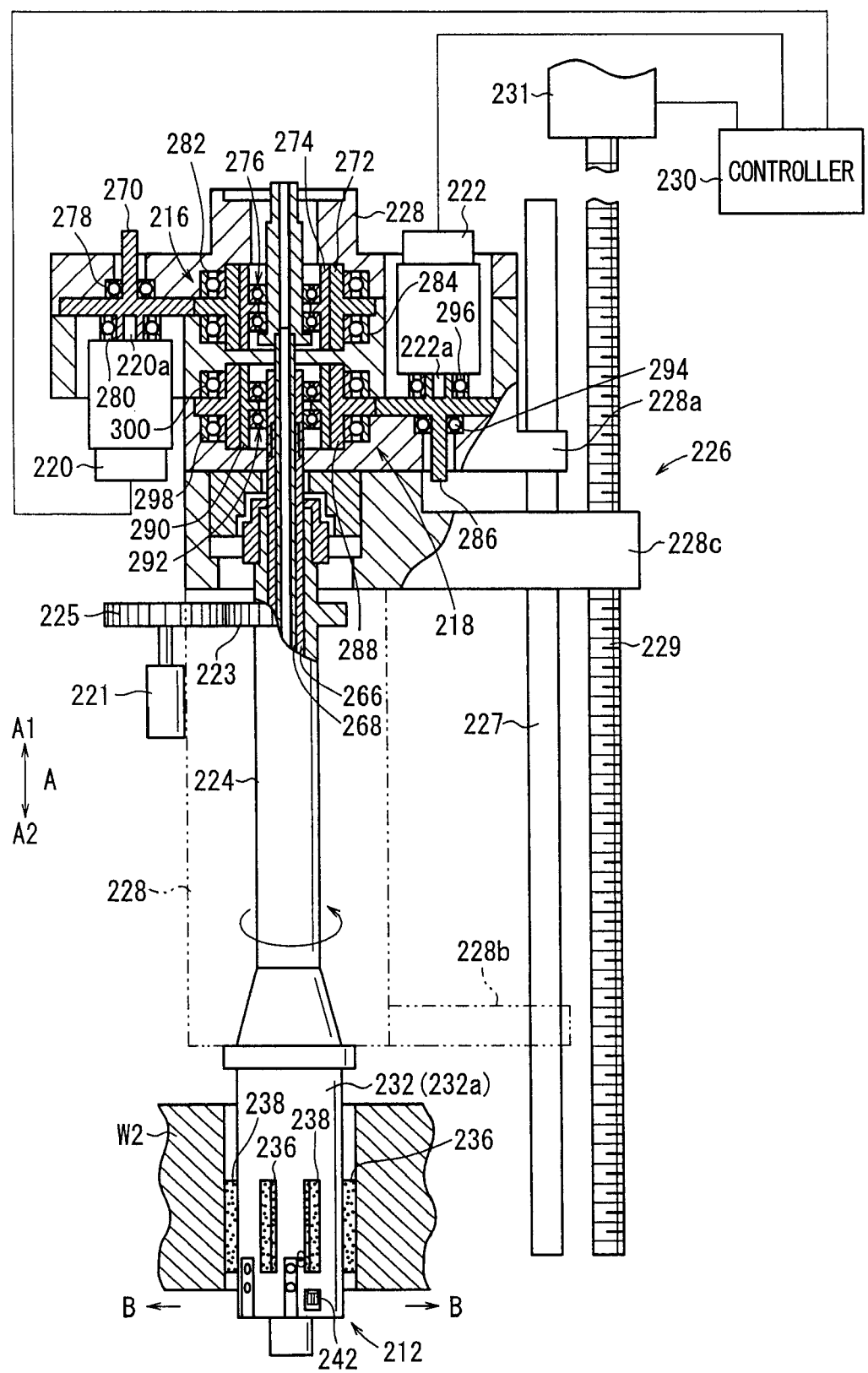
FIG. 8 is a side elevational view, partly in cross section, of a compound machine tool according to a second embodiment of the present invention.

As shown in FIG. 8, a compound machine tool 210 according to the second embodiment inserts a tool head 212 into a workpiece W2, e.g., a bore in a cylinder block of an automobile engine, and bores and hones the workpiece W2.

The compound machine tool 210 comprises a tool head (machining head) 212, which is inserted into the workpiece W2, wherein the tool head 212 has a substantially cylindrical shape that can be expanded or contracted in diameter. The compound machine tool 210 further comprises a first gear set 216 and a second gear set 218, a first servomotor 220 and a second servomotor 222 for rotating the first gear set 216 and the second gear set 218, respectively, a main shaft (spindle) 224 to which the tool head 212 is connected, and a moving mechanism (moving means) 226 for axially moving the main shaft 224 back and forth in the directions indicated by the arrow A. The first gear set 216 and the second gear set 218 function to transmit drive forces from the first servomotor 220 and the second servomotor 222 to the tool head 212, wherein the drive forces operate as expanding forces for the tool head 212. The first gear set 216, the second gear set 218, the first servomotor 220, the second servomotor 222, and the main shaft 224 are housed within a housing (support) 228.

The main shaft 224 is rotatably supported on the housing 228 by bearings (not shown). The main shaft 224 is rotated about its own axis by a main shaft motor (rotating means) 221, through a gear 223 on an outer surface of the main shaft 224, and another gear 225 meshed with the gear 223 and coupled to the drive shaft of the main shaft motor 221. Alternatively, the main shaft 224 may be rotated by the main shaft motor 221 through a belt and pulley mechanism.

The moving mechanism 226 comprises a rail 227 for guiding guides 228a, 228b on the housing 228, and a ball screw 229 extending in parallel to the rail 227 and threaded through a threaded portion (nut) 228c of the housing 228. When the ball screw 229 is rotated about its own axis by a servomotor 231 that is coupled to the ball screw 229, the main shaft 224 moves back and forth in the directions indicated by the arrow A.

The compound machine tool 210 includes a controller (monitoring control console) 230 for controlling the forces that operate to expand the tool head 212, i.e., for controlling energization of the first servomotor 220 and the second servomotor 222, as well as energization of the servomotor 231. The controller 230 has various NC (numerical control) data recorded therein for machining the workpiece W2.

Figure 9:
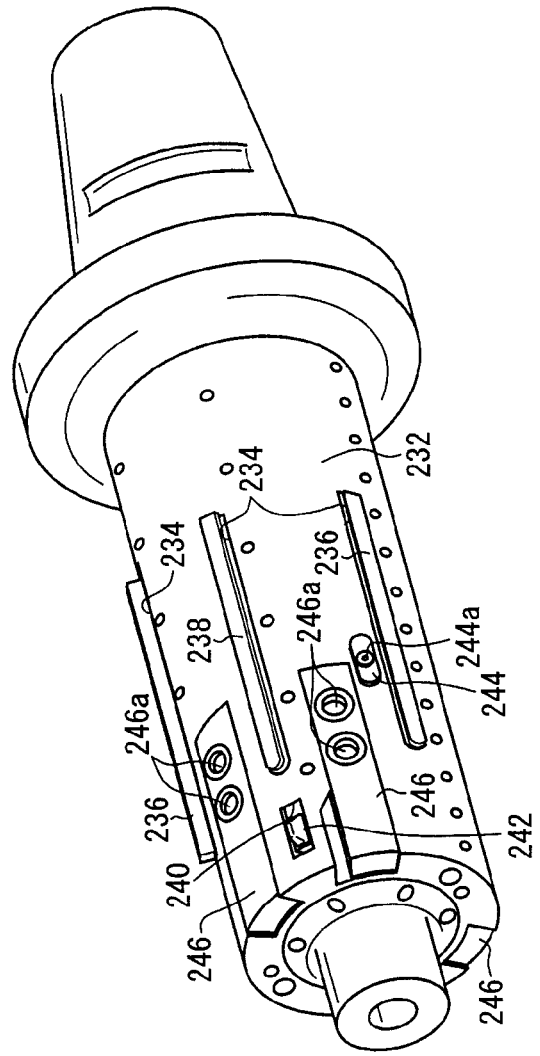
FIG. 9 is a perspective view of a tool head of the machine tool shown in FIG. 8.

As shown in FIG. 9, the tool head 212 comprises a main body 232 substantially in the form of a hollow cylinder, a plurality of rough grinding stones (grinding tools or rough honing grinding stones) 236, and a plurality of fine grinding stones (grinding tools or fine honing grinding stones) 238, which are alternately inserted into holes (guide grooves) 234 defined radially in the circumferential wall of the main body 232 at spaced angular intervals. A tool (boring tool, an FB tool, or a fine boring tool) 242 is inserted into a hole 240 defined in the circumferential wall of the main body 232. A plurality of (e.g., four) air micrometer detecting means 244 are radially disposed on the circumferential wall of the main body 232 between the rough grinding stones 236 and the fine grinding stones 238. The air micrometer detecting means 244 ejects air supplied through an air passage (not shown) into the tool head 212 from respective nozzles 244a thereof in order to measure the diameter of a bore in the workpiece W2.

The tool head 212 has tool holders 246 with throw-away tips (not shown) mounted on an outer circumferential surface thereof near a distal end thereof. The tool holders 246 can be replaced with other tool holders when the bolts 246a are loosened. The tool holders 246 are coupled to expanding members (not shown), which are similar to expanding members (cone shafts, tapered cones) to be described later, so that the tool holders 246 can be moved (expanded) radially.

Figure 10:
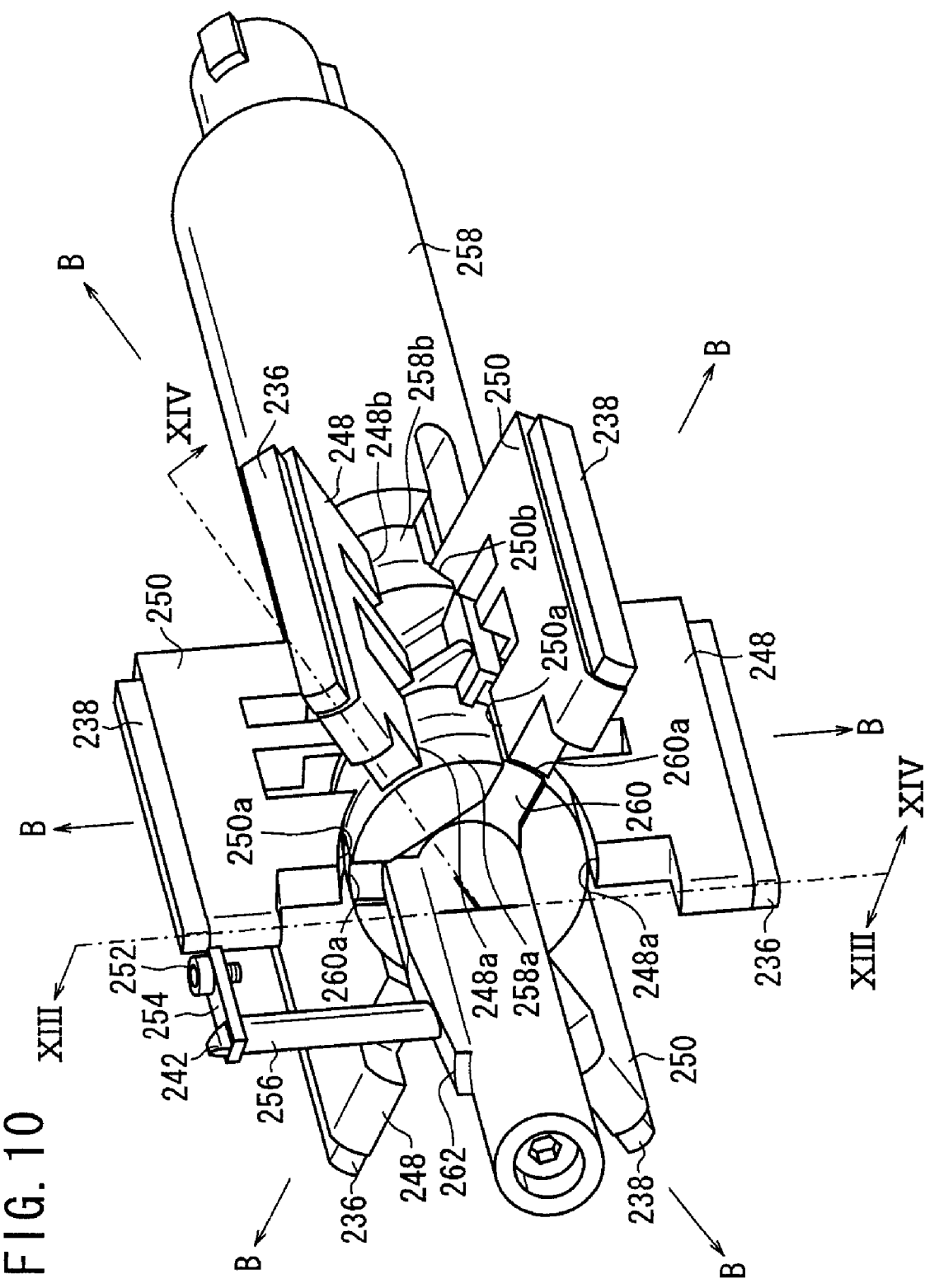
FIG. 10 is a perspective view showing an internal structure of the tool head shown in FIG. 9.

As shown in FIG. 10, the tool head 212 has three rough grinding stones 236 and three fine grinding stones 238. The rough grinding stones 236 and the fine grinding stones 238 are fixedly mounted respectively on rough grinding stone bases (grinding stone bases or rough grinding stone shoes) 548 and fine grinding stone bases (grinding stone bases or fine grinding stone shoes) 250. The tool 242 is connected to a distal end of one of the fine grinding stone bases 250. The tool 242 is secured to a cartridge 254 in the form of a resilient member, such as a leaf spring or the like. A bolt 252 fastened to the cartridge 254 is threaded into an internally threaded hole (not shown), which is defined in the main body 232. The tool 242 is fixed to a pin 256 by the cartridge 254.

The rough grinding stones 236 and the fine grinding stones 238 are radially movable, i.e., radially expansible and contractible, in directions indicated by the arrows B, while being guided by the holes 234 in the same axial positions on the tool head 211.

Figure 11:
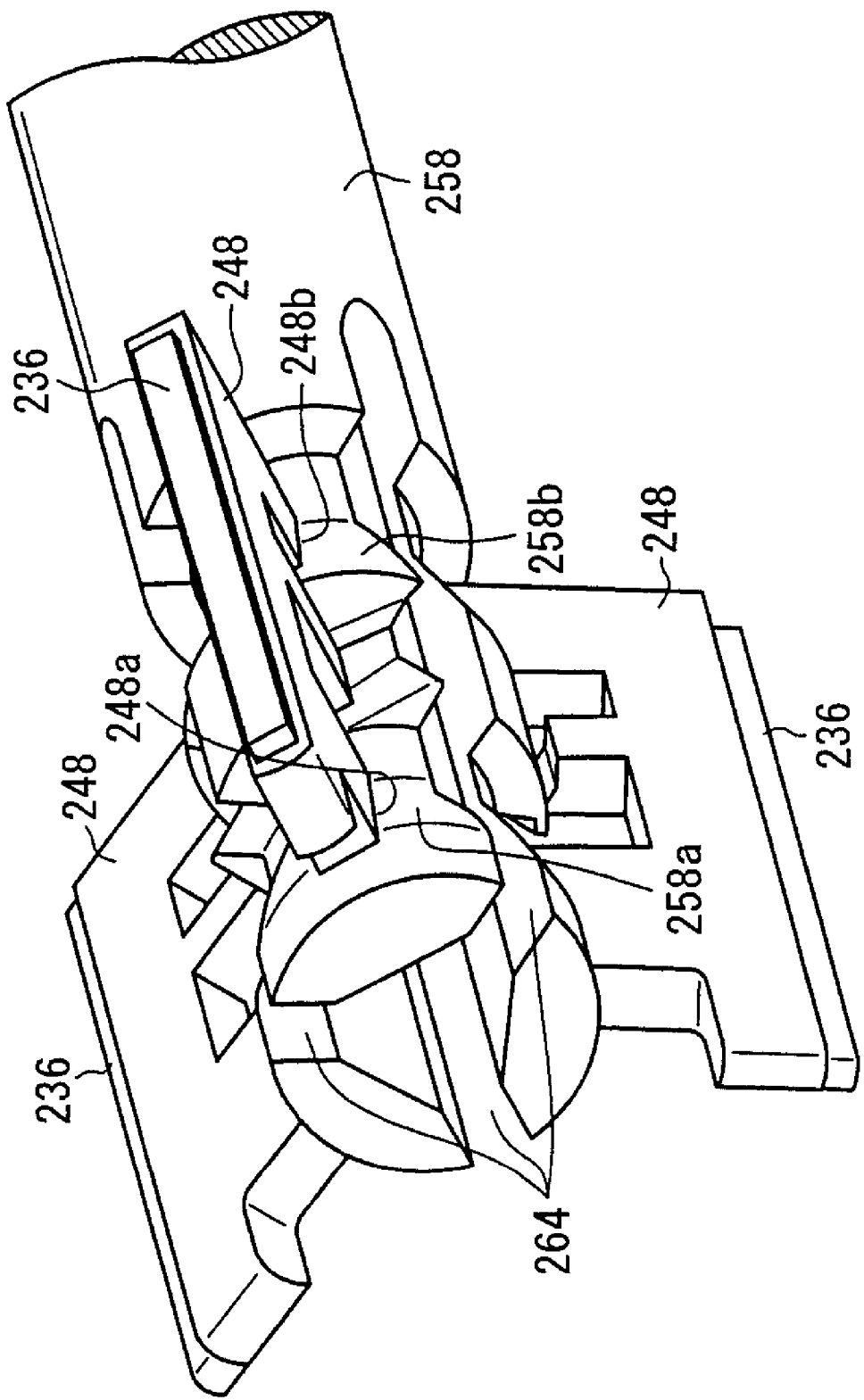
FIG. 11 is a perspective view, partly omitted from illustration, of a rough grinding tapered cone of the tool head shown in FIG. 10.
Figure 12:
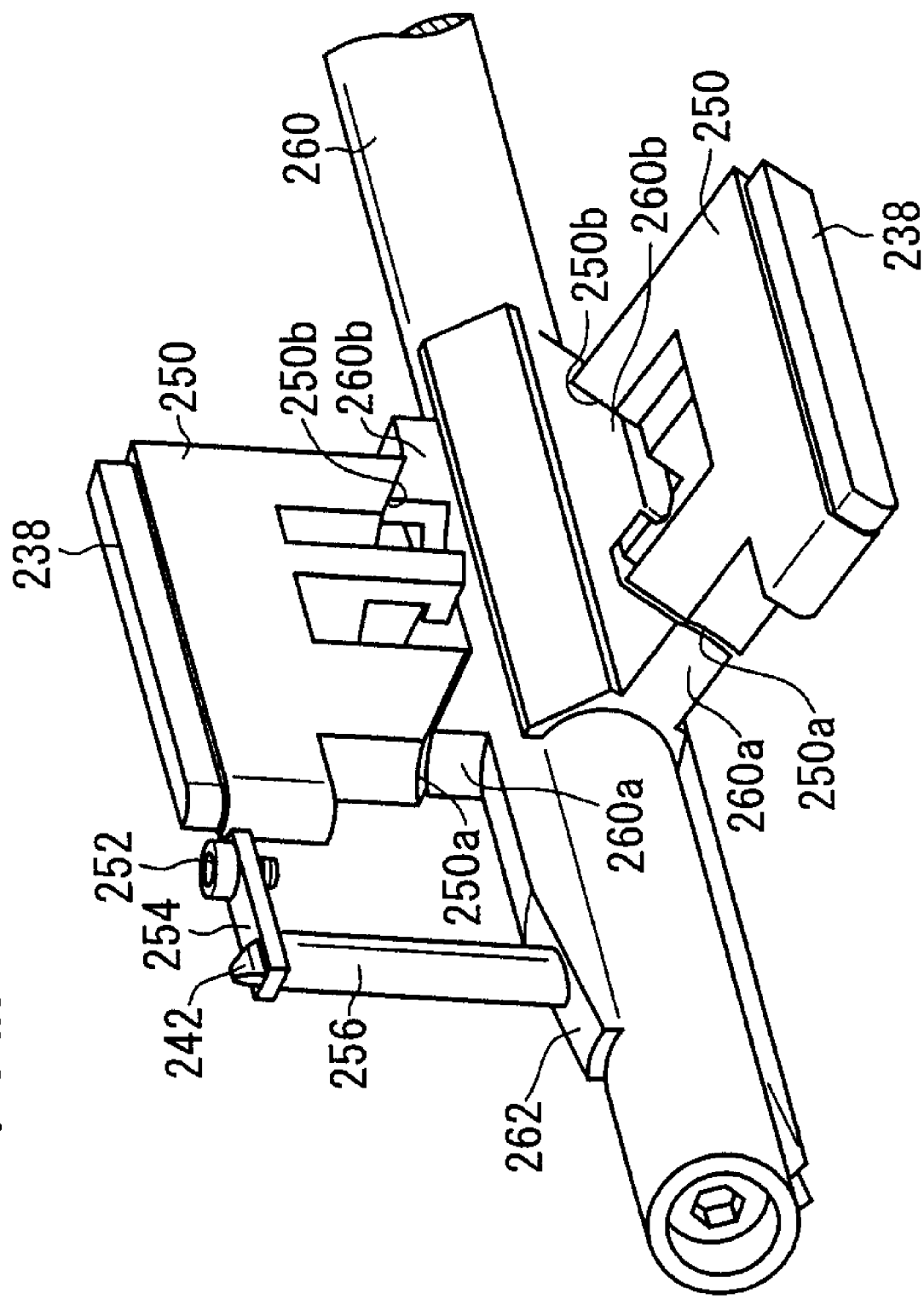
FIG. 12 is a perspective view, partly omitted from illustration, of a fine grinding tapered cone of the tool head shown in FIG. 10.

A rough grinding tapered cone (expanding cone shaft or cone shaft) 258 is slidably disposed in the tool head 212 for radially expanding the rough grinding stone bases 248. A fine grinding tapered cone (expanding cone shaft or cone shaft) 260 is inserted in the rough grinding tapered cone 258 for radially expanding the fine grinding stone bases 250. The fine grinding tapered cone 260 is slidable separately from the rough grinding tapered cone 258. As shown in FIGS. 10 and 11, the rough grinding tapered cone 258 has tapers 258a, 258b including tapered surfaces. Inner slanted surfaces 248a, 248b of the rough grinding stone bases 248 are held in slidable abutment against the tapered surfaces of the tapers 258a, 258b. Similarly, as shown in FIGS. 10 and 12, the fine grinding tapered cone 260 has tapers 260a, 260b including tapered surfaces. Inner slanted surfaces 250a, 250b of the fine grinding stone bases 250 are held in slidable abutment against the tapered surfaces of the tapers 260a, 260b. As shown in FIGS. 10 and 12, the fine grinding tapered cone 260 has a tool taper 262 on a distal end portion thereof near one of the tapers 260a, for radially expanding the pin 256, i.e., the tool 242.

As shown in FIG. 11, the rough grinding tapered cone 258 has a distal end portion divided into three arms with gaps 264 defined therebetween, wherein the tapers 260a, 260b of the fine grinding tapered cone 260 are inserted into the gaps 264 (see FIG. 10). The distal end portion of the fine grinding tapered cone 260, which includes the tool taper 262, projects from the distal end of the rough grinding tapered cone 258.

Figure 13:
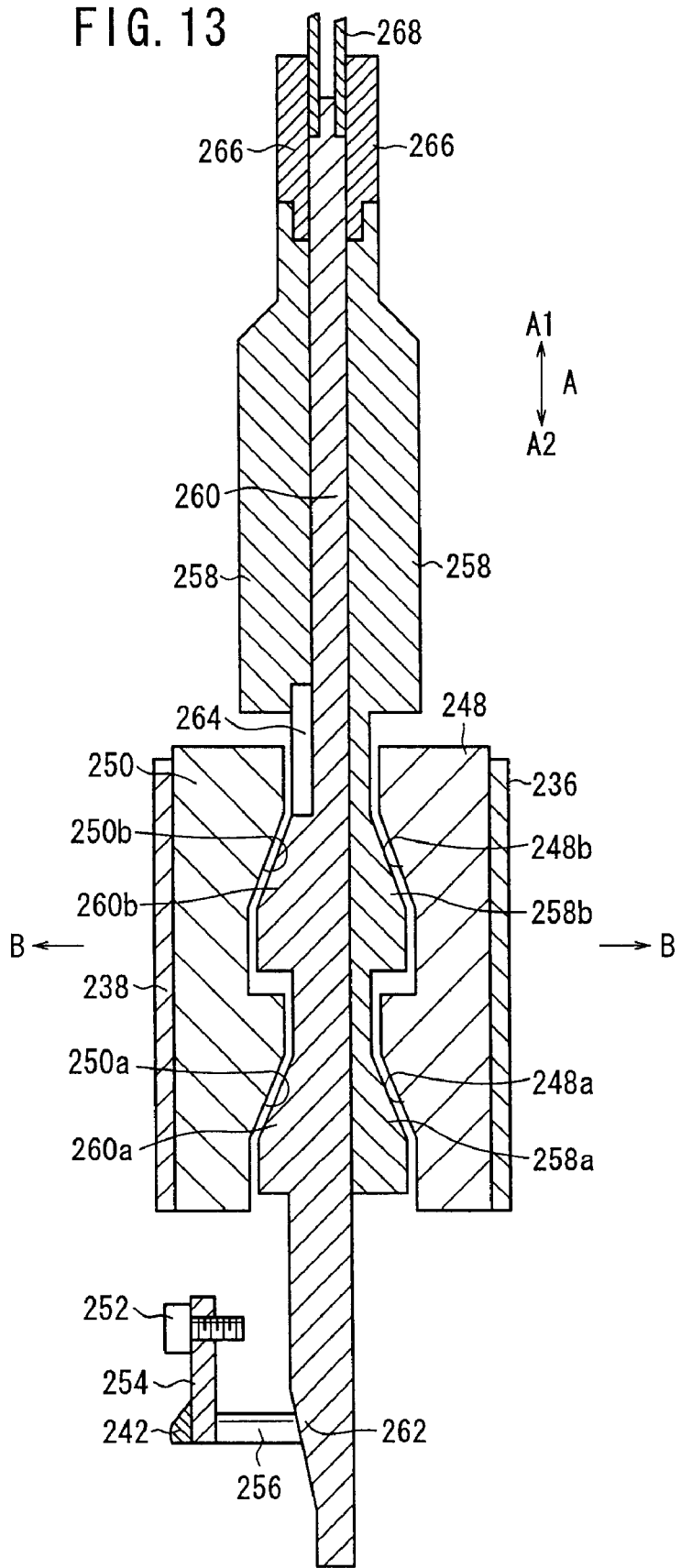
FIG. 13 is a cross-sectional view taken along line XIII-XIII of FIG. 10.
Figure 14:
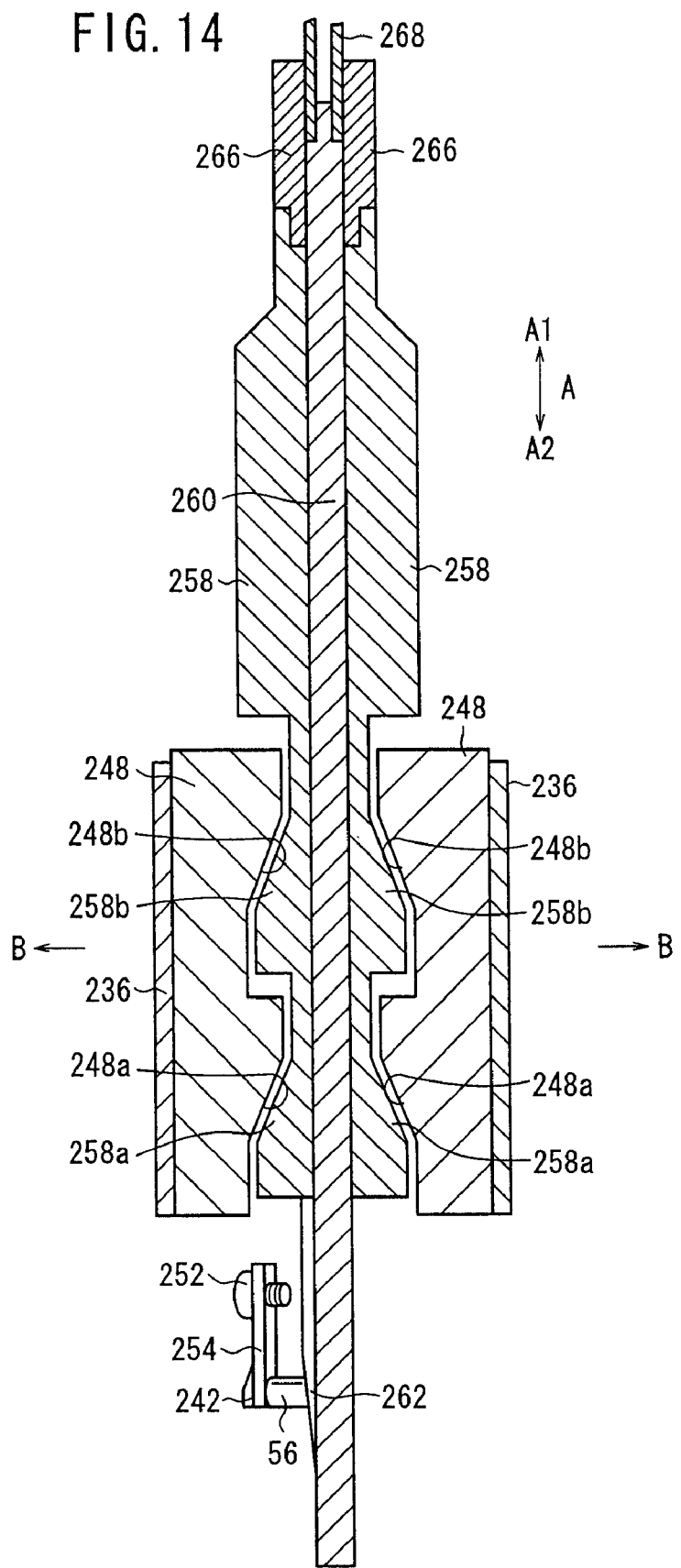
FIG. 14 is a cross-sectional view taken along line XIV-XIV of FIG. 10.

As shown in FIGS. 13 and 14, with the tool head 212 being connected to the main shaft 224, the rough grinding tapered cone 258 and the fine grinding tapered cone 260 are connected to respective shafts 266, 268. The shafts 266, 268 are of a hollow cylindrical shape, with the shaft 268 being disposed coaxially inside the shaft 266.

Figure 15:
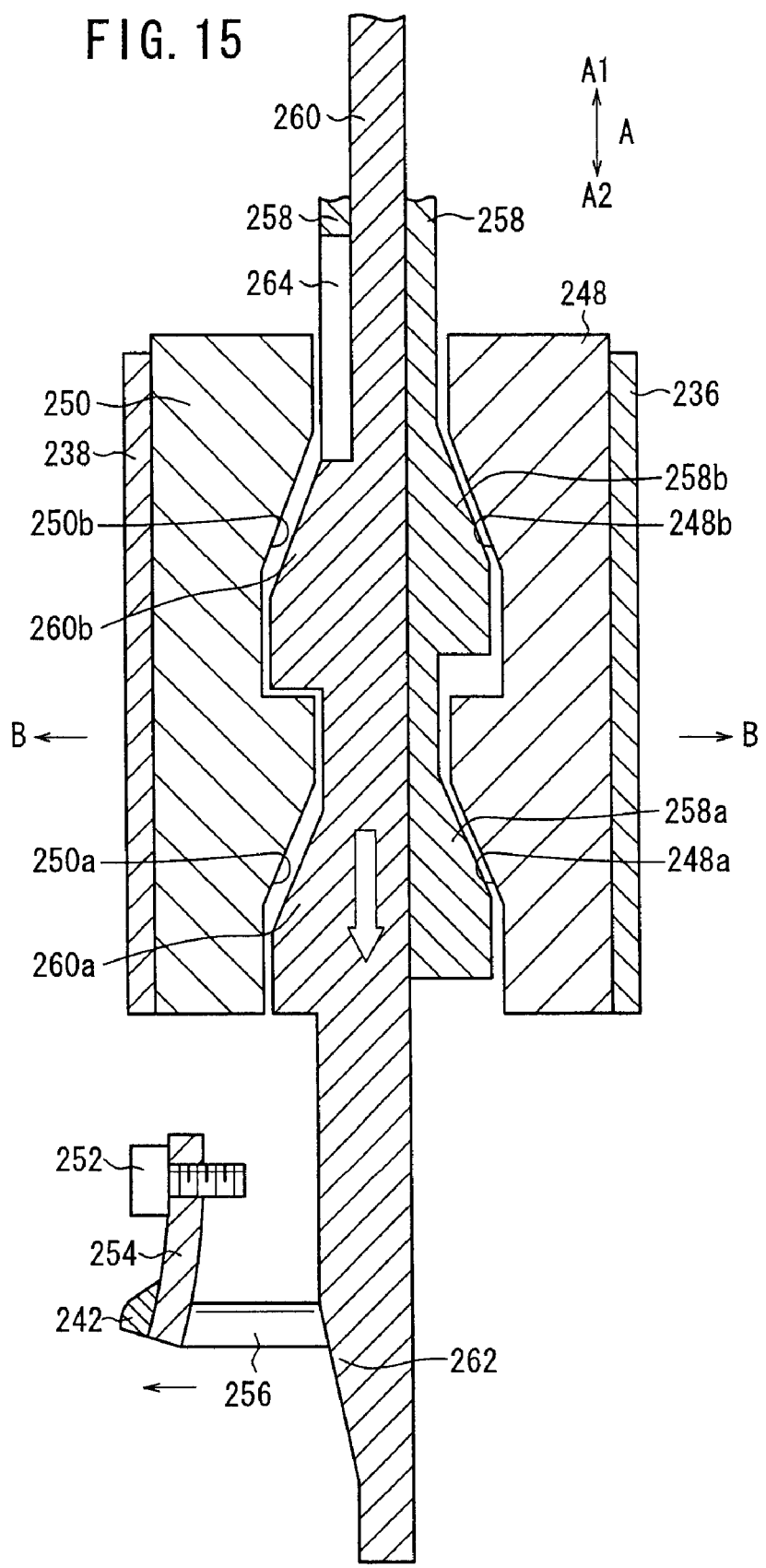
FIG. 15 is a cross-sectional view showing a boring tool, as it is expanded, of the tool head shown in FIG. 10.

For radially expanding the tool 242, the shaft 268 is axially moved forward to push the fine grinding tapered cone 260 in the direction indicated by the arrow A2, thereby causing the tool taper 262 to press the pin 256 radially outwardly (see FIG. 15). The cartridge 254 is elastically deformed (i.e., warped) about the bolt 252 fixed to the main body 232, thus displacing the tool 242 radially outwardly in the direction indicated by the arrow B, while the tool 242 is guided by the hole 240 in the main body 232.

Figure 16:
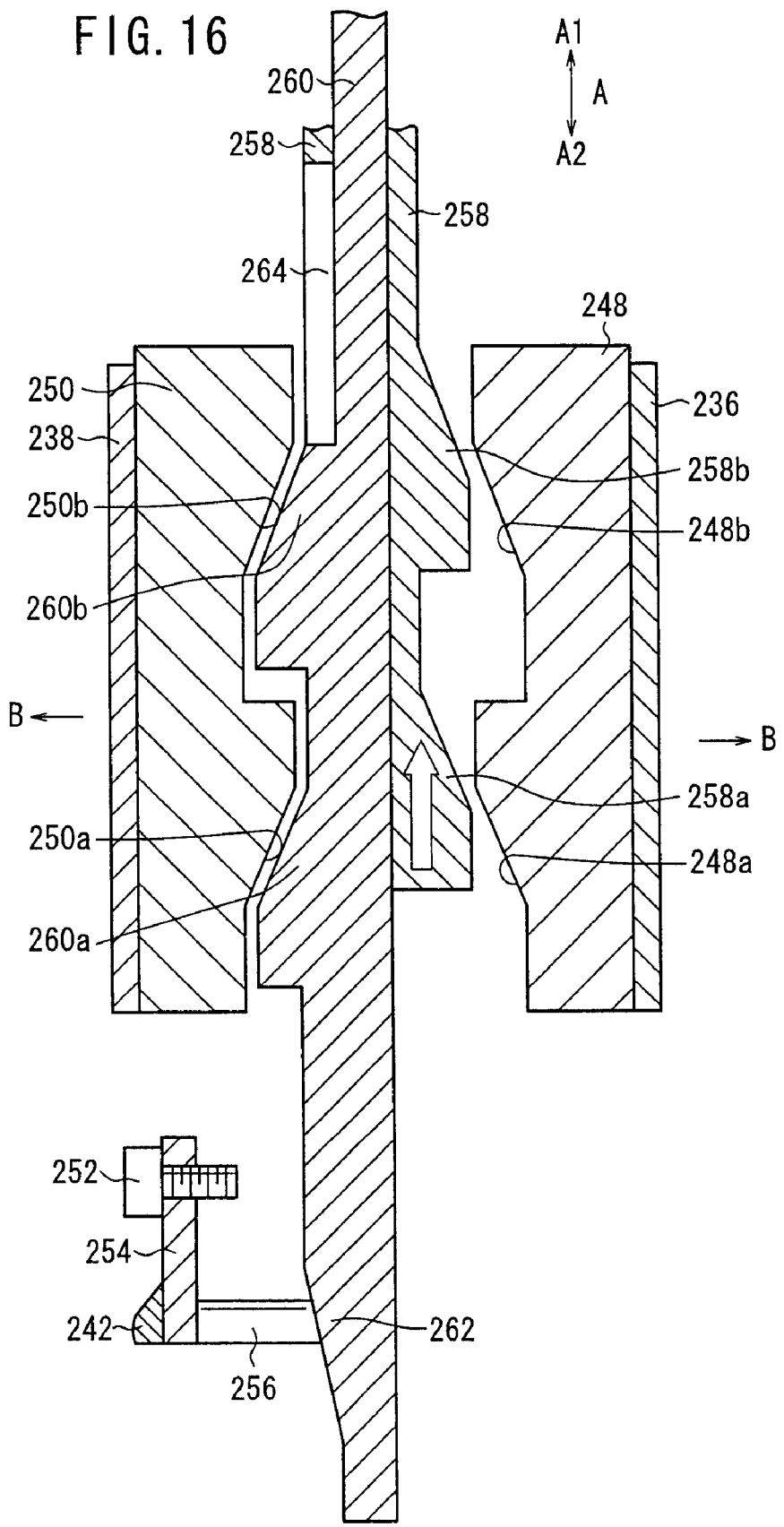
FIG. 16 is a cross-sectional view showing a rough grinding stone, as it is expanded, of the tool head shown in FIG. 10.

For expanding the rough grinding stones 236, the shaft 266 is axially moved backward to pull the rough grinding tapered cone 258 in the direction indicated by the arrow A1, thereby causing the tapers 258a, 258b to press against the inner slanted surfaces 248a, 248b of the rough grinding stone bases 248 (see FIG. 16). The rough grinding stones 236 are thus expanded radially outwardly in the directions indicated by the arrows B, while the rough grinding stones 236 are guided by the holes 234 in the main body 232. For contracting the rough grinding stones 236 from the expanded position, the shaft 266 is axially moved forward to push the rough grinding tapered cone 258 in the direction indicated by the arrow A2. The rough grinding stones 236 are thus contracted radially inwardly in directions opposite to the directions indicated by the arrows B, while the rough grinding stones 236 are guided by the holes 234 in the main body 232.

Figure 17:
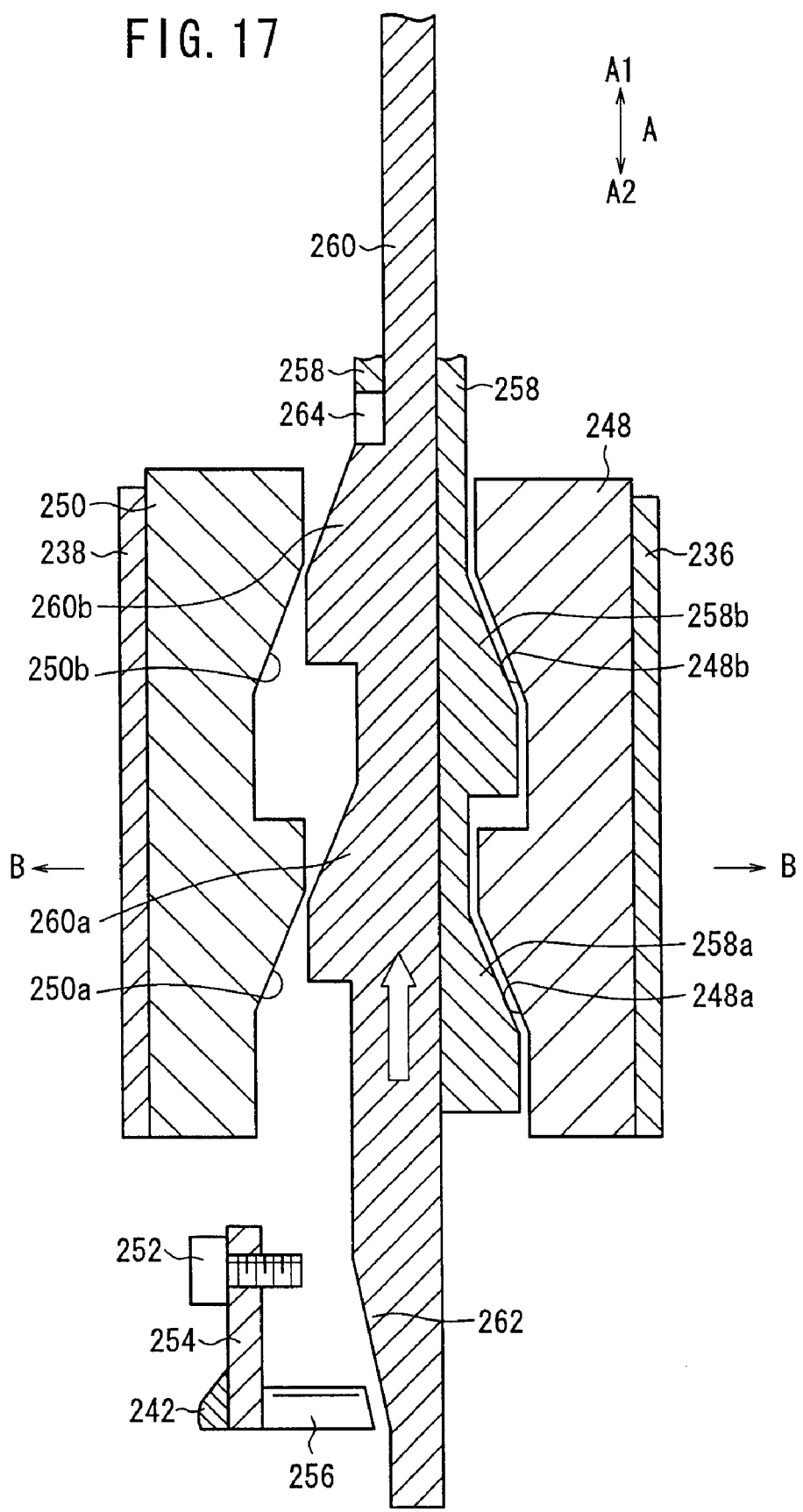
FIG. 17 is a cross-sectional view showing a fine grinding stone, as it is expanded, of the tool head shown in FIG. 10.

For expanding the fine grinding stones 238, the shaft 268 is axially moved backward to pull the fine grinding tapered cone 260 in the direction indicated by the arrow A1, thereby causing the tapers 260a, 260b to press against the inner slanted surfaces 250a, 250b of the fine grinding stone bases 250 (see FIG. 17). The fine grinding stones 238 are thus expanded radially outwardly in the directions indicated by the arrows B, while the fine grinding stones 238 are guided by the holes 234 in the main body 232. For contracting the fine grinding stones 238 from the expanded position, the shaft 266 is axially moved forward to push the fine grinding tapered cone 260 in the direction indicated by the arrow A2. The fine grinding stones 238 are thus contracted radially inwardly in directions opposite to the directions indicated by the arrows B, while the fine grinding stones 238 are guided by the holes 234 in the main body 232.

In the tool head 212 of the compound machine tool 210 according to the second embodiment, therefore, the rough grinding stone bases 248, the fine grinding stone bases 250, the rough grinding tapered cone 258, and the fine grinding tapered cone 260 function collectively as expanding (contracting) members for expanding (contracting) the rough grinding stones 236 and the fine grinding stones 238.

As shown in FIG. 8, the tool head 212 is coupled to the main shaft 224. Consequently, when the main shaft 224 is rotated about its axis, the tool head 212 also rotates about its axis.

Figure 18:
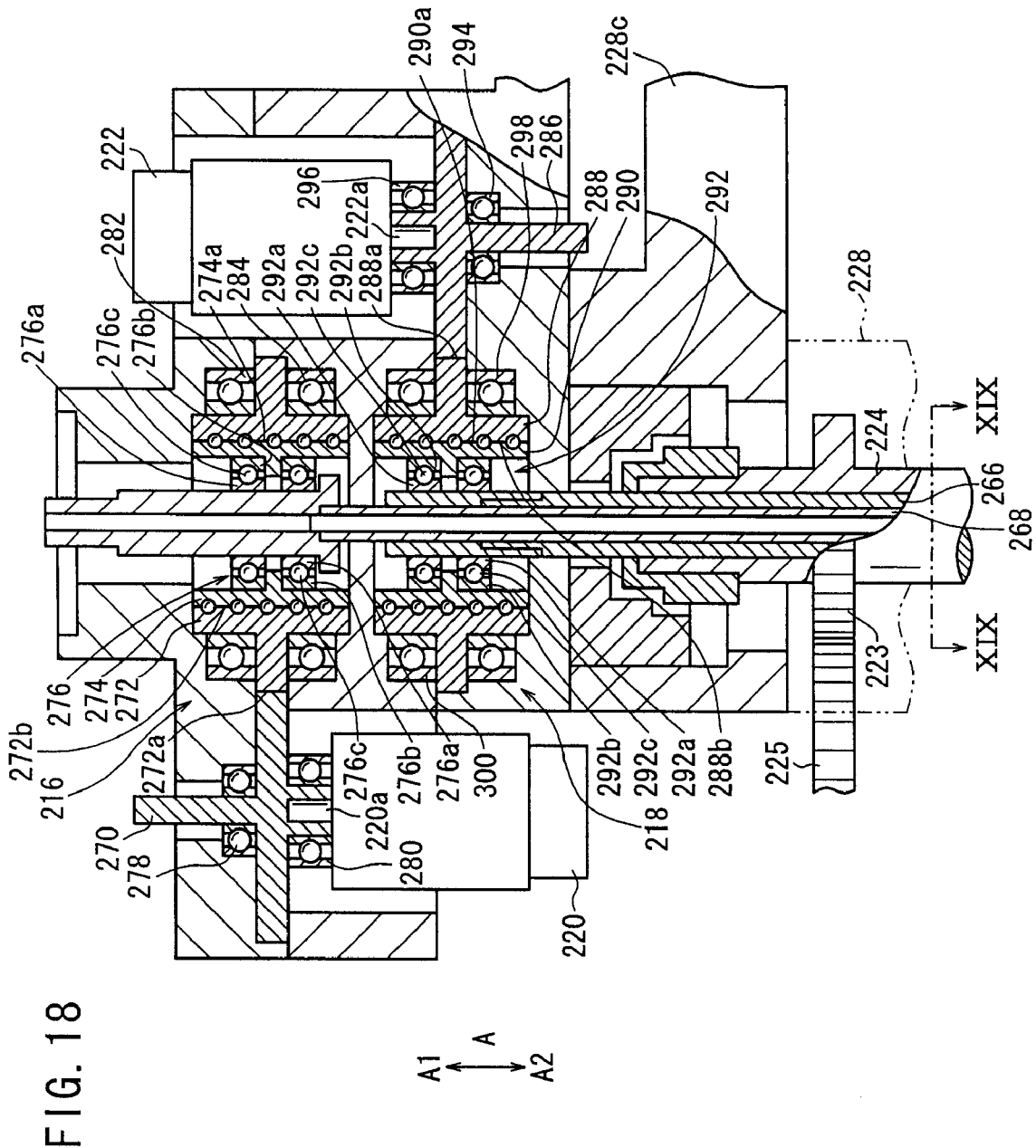
FIG. 18 is a cross-sectional view of a first gear set and a second gear set of the machine tool shown in FIG. 8.
Figure 19:
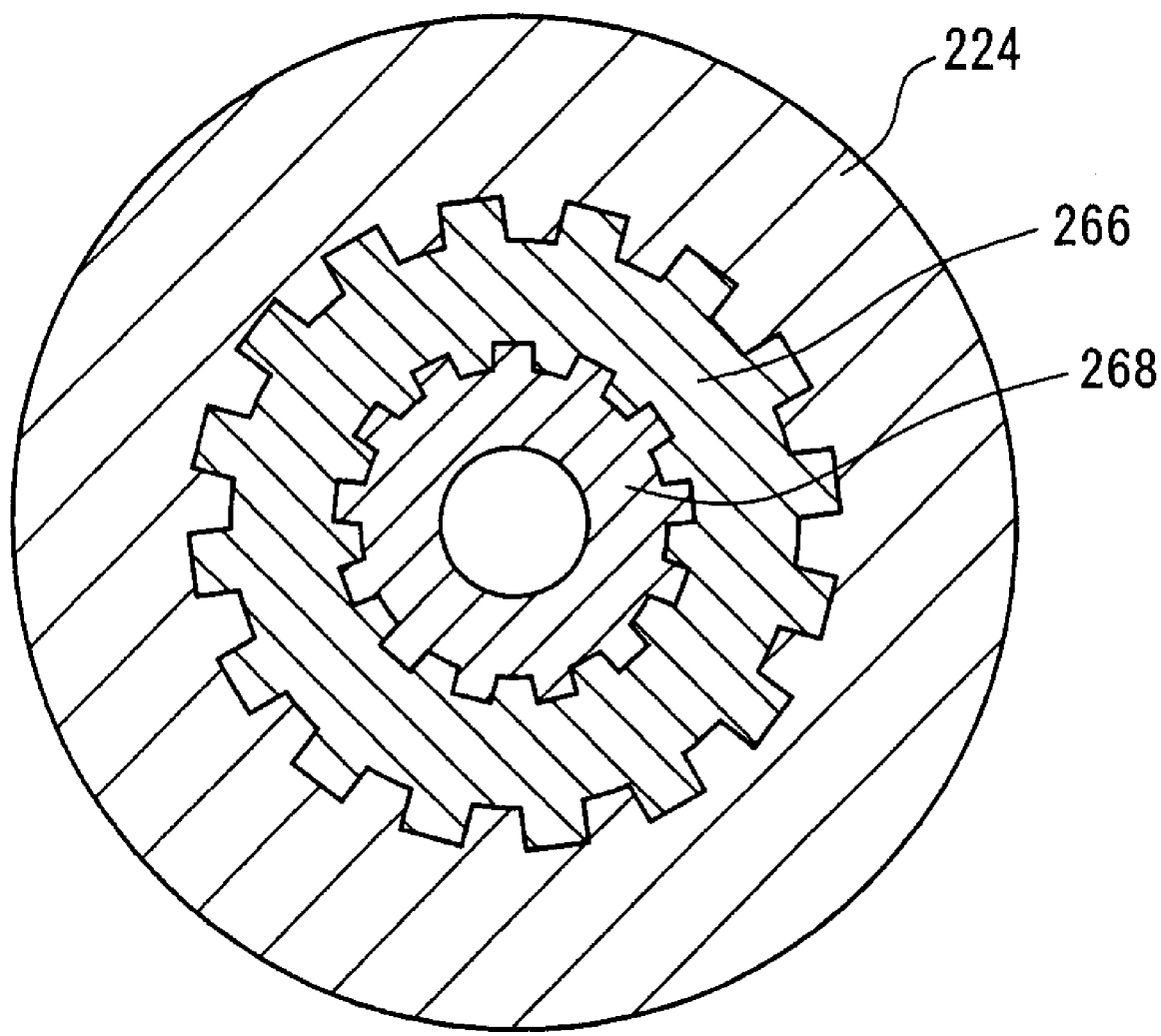
FIG. 19 is a cross-sectional view taken along line XIX-XIX of FIG. 18.

As shown in FIGS. 8 and 18, the shafts 266, 268 are coaxially disposed in the main shaft 224, which is of a hollow cylindrical shape, wherein the shafts 266, 268 are movable therein in the directions indicated by the arrow A. An inner circumferential surface of the main shaft 224 and an outer circumferential surface of the shaft 266 are held in engagement with each other by splines. Further, an inner circumferential surface of the shaft 266 and an outer circumferential surface of the shaft 268 are held in engagement with each other by splines (see FIG. 19). Therefore, the shafts 266, 268 are movable (i.e., slidable) within the main shaft 224 individually or simultaneously in the directions indicated by the arrow A, and also are rotatable about their axes in unison with the main shaft 224.

The shafts 266, 268 have respective rear ends, which are opposite to the front ends, connected to the rough grinding tapered cone 258 and to the fine grinding tapered cone 260, and coupled to the second gear set 218 and the first gear set 216, respectively. When the first gear set 216 is actuated by the first servomotor 220, the shaft 268 is moved axially back and forth. When the second gear set 218 is actuated by the second servomotor 222, the shaft 266 is moved axially back and forth.

Figure 20:
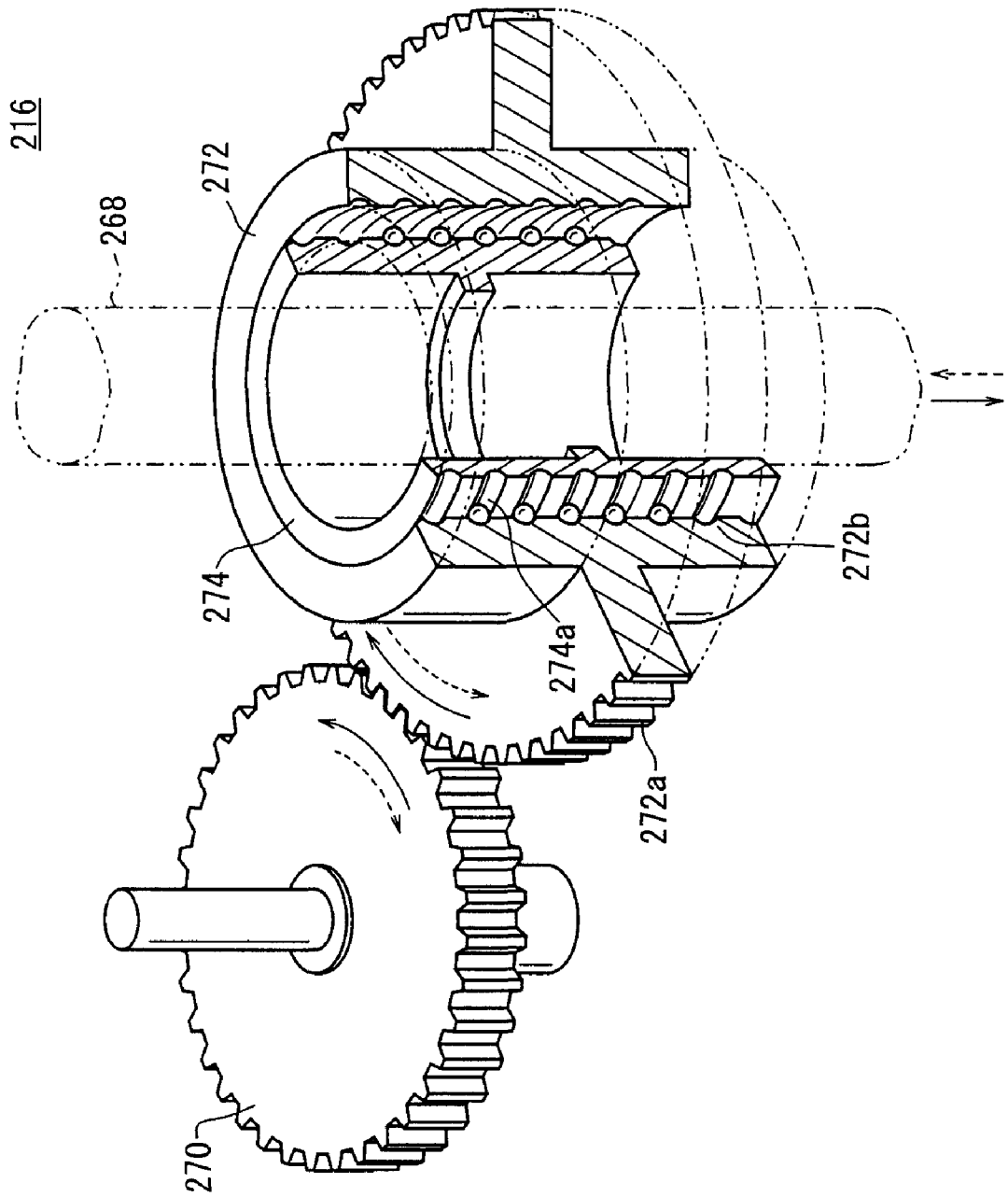
FIG. 20 is a fragmentary perspective view showing the manner in which the gears of the first gear set shown in FIG. 18 are held in mesh with each other.

Structural details of the first gear set 216 and the second gear set 218 will be described below with reference to FIGS. 18 and 20. FIG. 20 shows, in fragmentary perspective, the manner in which the gears of the first gear set 216 are held in mesh with each other. The gears of the second gear set 218 mesh with each other in substantially the same manner as the gears of the first gear set 216 shown in FIG. 20.

The first gear set 216 comprises a pinion gear 270 coupled to the drive shaft 220a of the first servomotor 220, a tubular ring gear 272 having an external spur gear 272a held in mesh with the pinion gear 270 and also having an internally threaded inner circumferential surface 272b, and a tubular ball screw 274 having an externally threaded outer circumferential surface 274a threaded over the internally threaded inner circumferential surface 272b of the ring gear 272. The first gear set 216 also includes two juxtaposed bearings 276, each comprising an inner race 276a fitted over the shaft 268, an outer race 276b fitted inside the ball screw 274, and rolling bodies 276c rollingly disposed between the inner race 276a and the outer race 276b. The pinion gear 270 is rotatably supported in the housing 228 by bearings 278, 280. The ring gear 272 is rotatably supported in the housing 228 by thrust bearings 282, 284. The inner races 276a may be integral with the outer circumferential surface of the shaft 268, and the outer races 276b may be integral with the inner circumferential surface of the ball screw 274.

The second gear set 218 comprises a pinion gear 286 coupled to the drive shaft 222a of the second servomotor 222, a tubular ring gear 288 having an external spur gear 288a held in mesh with the pinion gear 286 and also having an internally threaded inner circumferential surface 288b, and a tubular ball screw 290 having an externally threaded outer circumferential surface 290a threaded over the internally threaded inner circumferential surface 288b of the ring gear 288. The second gear set 218 also includes two juxtaposed bearings 292, each comprising an inner race 292a fitted over the shaft 266, an outer race 292b fitted inside the ball screw 290, and rolling bodies 292c rollingly disposed between the inner race 292a and the outer race 292b. The pinion gear 286 is rotatably supported in the housing 228 by bearings 294, 296. The ring gear 288 is rotatably supported in the housing 228 by bearings 298, 300. The inner races 292a may be integral with the outer circumferential surface of the shaft 266, and the outer races 292b may be integral with the inner circumferential surface of the ball screw 290.

In the first gear set 216, when the first servomotor 220 is rotated under control of the controller 230, the pinion gear 270 is rotated. Depending on the direction of rotation of the pinion gear 270, the ball screw 274 is moved axially forward or backward in the direction indicated by the arrow A. Since the ball screw 274 and the shaft 268 are coupled to each other by the bearings 276, the shaft 268 also moves axially in unison with the ball screw 274.

The pinion gear 270 is rotatable, and can be fixed in a desired angular position (i.e., at a desired phase) by the first servomotor 220. Therefore, the shaft 268 is axially movable back and forth and can be fixed at a desired position along the direction indicated by the arrow A. Similarly, the fine grinding tapered cone 260 that is coupled to the shaft 268 is axially movable back and forth and can be fixed at a desired position. Consequently, the tool 242 and the fine grinding stones 238 are expandable and contractible, and can also be fixed at a desired position along the directions indicated by the arrows B.

In the second gear set 218, the pinion gear 270 is rotatable and can be fixed in a desired angular position, (i.e., at a desired phase) by the second servomotor 222 under the control of the controller 230. Therefore, the shaft 266 is axially movable back and forth and can be fixed at a desired position along the direction indicated by the arrow A. Similarly, the rough grinding tapered cone 258 that is coupled to the shaft 266 is axially movable back and forth and can be fixed at a desired position. Consequently, the rough grinding stones 236 are expandable and contractible, and can also be fixed at a desired position along the directions indicated by the arrows B.

In the compound machine tool 210, the first servomotor 220, the second servomotor 222, the pinion gears 270, 286, the ring gears 272, 288, the ball screws 274, 290, and the bearings 276, 292 function collectively as an expanding (contracting) means for expanding (contracting) the tool 242, the rough grinding stones 236, and the fine grinding stones 238.

As shown in FIGS. 8 and 18, the first servomotor 220 and the second servomotor 222 are oriented in opposite directions and are disposed parallel to each other, one on each side of the shafts 266, 268. The ring gears 272, 288, the ball screws 274, 290, and the bearings 276, 292 are disposed coaxially with each other. Therefore, the compound machine tool 210 is small in size and compact overall.

A boring process and a grinding (honing) process, which are performed on a bore in a cylinder block of an automobile engine by the compound machine tool 210, shall be described below with reference to the flowchart shown in FIG. 21.

Figure 21:
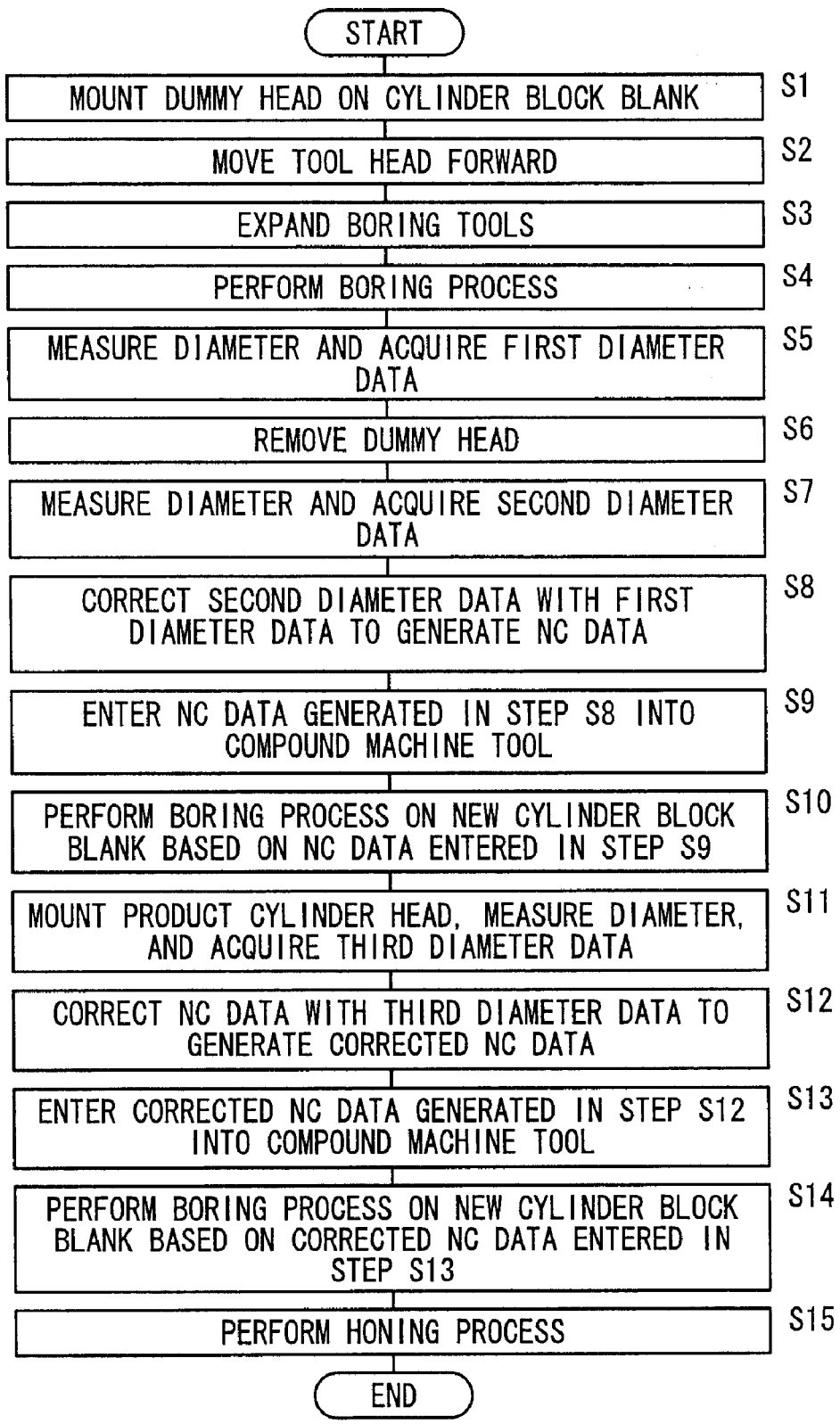
FIG. 21 is a flowchart of a sequence of a boring process and a honing process performed by the machine tool shown in FIG. 8.
Figure 22A:
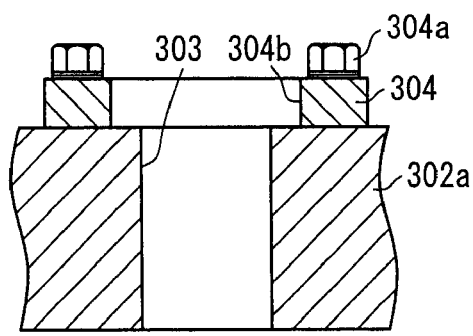
FIG. 22A is a fragmentary cross-sectional view showing a dummy head mounted on a cylinder block.

In step S1 of FIG. 21, a dummy head 304 (see FIG. 22A) is fastened by bolts 304a to a cylinder block 302a as a cylinder block blank. The dummy head 304 is of a shape and is formed of a material that is similar to that of a product cylinder head. The dummy head 304 has a hole 304b defined therein, which is larger in diameter than a bore 303 formed in the cylinder block 302a.

In step S2, once the cylinder block 302a has been placed in a given position, the tool head 212 (the main shaft 224) is moved by the moving mechanism 226 axially toward the bore 303 in the direction indicated by the arrow A1 under control of the controller 230.

In step S3, the first servomotor 220 is energized under control of the controller 230 so as to enable the first gear set 216 to move the shaft 268 in the direction indicated by the arrow A2. At this time, since the fine grinding tapered cone 260 is moved forward by the shaft 268, the tool taper 262 presses the pin 256 radially outwardly, in the direction indicated by the arrow B, to displace the tool 242 radially outwardly.

In step S4, the tool 242 bores the bore 303 in the cylinder block 302a. At this time, the servomotor 231 and the first servomotor 220 are controlled by the controller 230. Specifically, the axial position of the tool head 212, the radial position of the tool 242, and the force for radially expanding the tool 242 are controlled by the controller 230. As a result, the bore 303 is machined to a desired perfect circular finish (shape) by the tool 242.

In step S5, the diameter of the bore 303 at each axial position (along the direction indicated by the arrow A) in the bored cylinder block 302a is measured by an optical or a mechanical measuring device (not shown) under the control of the controller 230. The measured data are stored as first diameter data D1 in the controller 230, for example. In particular, the diameter of the bore 303 may be measured by an air micrometer detecting means 244.

The first diameter data D1 are obtained in order to measure a thermal effect produced by the boring process on the bore 303. Since the bore 303 is thermally affected (i.e., expanded) by cutting resistance during the boring process, the bore 303 usually shrinks when exposed to normal temperatures after it has been bored. Such shrinkage of the bore 303 differs depending on the axial position, and is greater at axial positions where the bore 303 is thermally affected (i.e., expanded) to a larger extent.

Figure 22B:
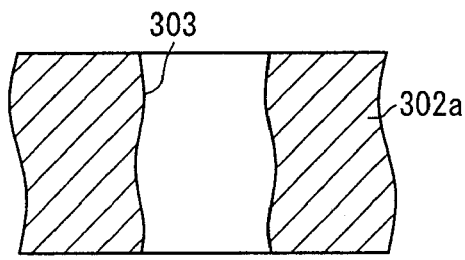
FIG. 22B is a fragmentary cross-sectional view showing the cylinder block after it is machined with the dummy head mounted thereon.

In step S6, the dummy head 304 is removed from the bored cylinder block 302a after the diameter of the bore 303 has been measured. When the dummy head 304 is removed, as shown in FIG. 22B, the inner surface of the bore 303 in the cylinder block 302a is slightly deformed from the state of the bore 303 in steps S4 and S5. In other words, the inner surface of the bore 303 becomes deformed under stresses applied when the product cylinder head 306 (see FIG. 22C) is assembled onto the cylinder block 302a. Stresses applied when the dummy head 304 is assembled onto the cylinder block 302a are regarded as equivalent to the stresses applied when the product cylinder head 306 is assembled onto the cylinder block 302a. When the dummy head 304 is removed, since such stresses are also removed, the inner surface of the bore 303 in the cylinder block 302a is slightly deformed from the state of the bore 303 in steps S4 and S5. The bore 303 in the state of steps S4 and S5 is of a substantially perfect circular shape, because it has been bored by the compound machine tool 210 having the tool head 212 and the expanding means.

In step S7, after the dummy head 304 has been removed, the diameter of the bore 303 at each axial position in the cylinder block 302a is measured again, in the same manner as with step S5. The measured data are stored as second diameter data D2 in the controller 230, for example. In step S7, the bore 303 is slightly deformed from the substantially perfect circular shape it had in steps S4 and S5, since the stresses have been removed from the cylinder block 302a. Hence, the bore 303 does not have a perfectly circular shape.

In step S8, the first diameter data D1 acquired in step S5 are used as corrective data in order to correct the second diameter data D2 acquired in step S7, thereby producing NC data (numerical control data) DN. The produced NC data DN are data generated so as to cause the bore 303 in the cylinder block 302a to have a perfectly circular cross-sectional shape assuming a case in which the cylinder block blank is bored with no dummy head mounted thereon, and thereafter, the dummy head 304 is mounted on the cylinder block.

In step S9, the NC data DN generated in step S8 are entered into the controller 230 of the compound machine tool 210.

In step S10, a cylinder block 302b, which is a new cylinder block blank different from the cylinder block 302a bored in step S4, is placed in the given position. Then, the cylinder block 302b is bored by the compound machine tool 210 under control of the controller 230, and based on the entered NC data DN.

Figure 22C:
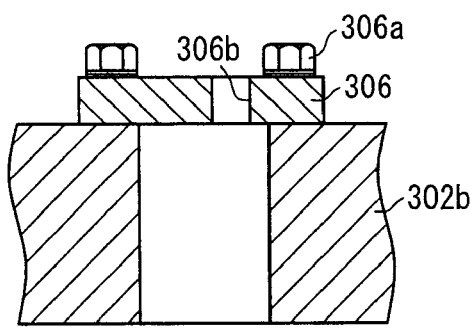
FIG. 22C is a fragmentary cross-sectional view showing a product cylinder head mounted on the cylinder block.

In step S11, the product cylinder head 306 is fastened to the bored cylinder block 302b by bolts 306a (see FIG. 22C). The product cylinder head 306 is different from the dummy head 304, and is a cylinder head that is to be used as an actual product.

With the product cylinder head 306 mounted on the cylinder block 302b, the diameter of the bore at each axial position in the cylinder block 302b is measured in the same manner as in step S5. The measured data are stored as third diameter data D3 in the controller 230, for example. A measuring device for measuring the diameter of the bore may be inserted through an ignition plug insertion hole 306b, which is already defined in the product cylinder head 306, because the product cylinder head 306 does not need to be specially machined for enabling insertion of the measuring device.

When the third diameter data D3 are acquired, the bored cylinder block 302b may be heated to a temperature that the bore 310 in a cylinder block 308 will reach when an actual automobile engine is in operation. If the bored cylinder block 302b is thus heated, then the data generated in step S12 serve as data generated to make the bore in the cylinder perfectly circular in cross-sectional shape, as desired when the temperature of the cylinder block increases at the time the automobile engine is actually mounted in a vehicle and placed in operation. The cylinder block 302b may be simply and quickly heated using an electromagnetic induction heater (not shown) from within the bore in the cylinder block 302b.

In step S12, the third diameter data D3 acquired in step S11 are used as corrective data for the NC data generated in step S8, in order to correct the NC data and thereby produce corrected NC data DN'. The produced corrected NC data DN' are data generated to make the bore in the cylinder head perfectly circular in cross-sectional shape, assuming that the cylinder block blank is bored with no dummy head mounted thereon, and thereafter that the product cylinder head 306 is mounted on the cylinder block.

In the method of boring a cylinder block according to the second embodiment, the corrected NC data DN' thus produced are used in a production process in order to bore cylinder block blanks, for thereby making bores in the cylinder blocks perfectly circular in cross-sectional shape as desired, without the need for the dummy head 304.

Specifically, in step S13, the corrected NC data DN' produced in step S12 are entered into the controller 230 of the compound machine tool 210.

In step S14, a cylinder block 308, which is a new cylinder block blank, is placed in a given position in the compound machine tool 210. Then, the cylinder block 308 is bored by the compound machine tool 210 under control of the controller 230, based on the corrected NC data DN'.

Figure 22D:
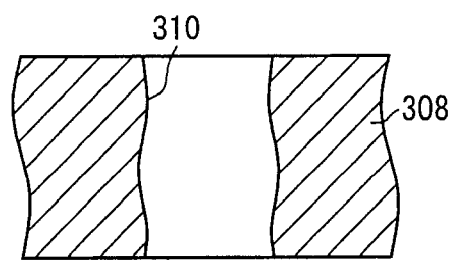
FIG. 22D is a fragmentary cross-sectional view showing a cylinder block after it is bored, with no dummy head mounted thereon.
Figure 22E:
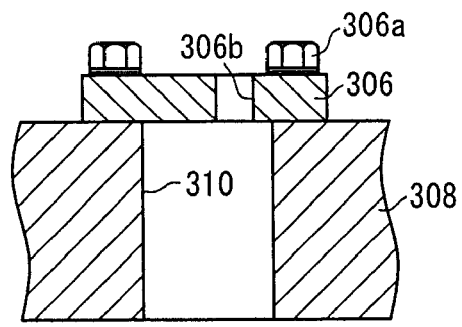
FIG. 22E is a fragmentary cross-sectional view showing a product cylinder head mounted on the cylinder block after it is bored, with no dummy head mounted thereon.

When the cylinder block 308 is bored based on the corrected NC data DN', the bore 310 in the cylinder block 308 is machined taking into account the deformation that is caused after the product cylinder head 306 is mounted (see FIG. 22D). Specifically, when a product cylinder head 306 is mounted on the cylinder block 308, which has been machined based on the corrected NC data DN', the bore 310 in the cylinder block 308 is made perfectly circular in cross-sectional shape, as required in cylinder block products.

After completion of the boring process performed on the cylinder block 308 based on the corrected NC data DN', the inner surface of the bore 310 is honed to achieve a desired surface roughness.

In step S15, the cylinder block 308 is first honed by the rough grinding stones 236, and then by the fine grinding stones 238. Specifically, under control of the controller 230, the first servomotor 220 or the second servomotor 222 actuates the first gear set 216 or the second gear set 218. The shaft 266 (the rough grinding tapered cone 258) or the shaft 268 (the fine grinding tapered cone 260) is moved axially forward or backward to a predetermined position in the direction indicated by the arrow A, so as to apply expanding forces or contracting forces to the rough grinding stones 236 and the fine grinding stones 238. At this time, the main shaft 224 is rotated by the main shaft motor 221 while the main shaft 224 is moved axially forward or backward by the moving mechanism 226. Therefore, the rough grinding stones 236 and the fine grinding stones 238 are selectively operated to hone the cylinder block 308.

According to the present embodiment, since the cylinder block 308 that forms the workpiece is machined by the tool head 212 of the compound machine tool 210, the cylinder block 308 can be honed without the need for clamping the cylinder block 308 in one chucking process, boring the cylinder block 308, and thereafter unclamping the cylinder block 308. Consequently, adverse effects on the cylinder block 308 caused by the chucking process can be reduced, and the cylinder block 308 can be honed with high accuracy. Specifically, if the cylinder block 308 is chucked more frequently, greater errors tend to occur in positioning accuracy. As a consequence, more material tends to be machined off from the cylinder block blank. If the amount of material removed per unit of machining time increases, then the cylinder block 308 is ground too heavily, and the machining process tends to become less accurate.

For increasing accuracy of the machining process, a change in the diameter of the bore 310 may be detected by the air micrometer detecting means 244, whereby the first servomotor 220 and the second servomotor 222 are controlled in operation while the controller 230 measures elapsed machining time. The compound machining tool 210 can perform a highly accurate honing process by varying, with high accuracy, the expanding forces (contracting forces) applied to the rough grinding stones 236 and to the fine grinding stones 238.

As described above, the compound machining tool 210 generates corrected NC data DN' used during the boring process performed on the bore in the cylinder block, for producing a cylinder block having a bore with a perfect circular cross-sectional shape, and without the need for a dummy head 304 to be mounted when cylinder blocks are mass-produced. Therefore, the compound machining tool 210 is effective in increasing productivity.

The tool 242, the rough grinding stones 236, and the fine grinding stones 238 are expanded or displaced radially outwardly by the first servomotor 220 and the second servomotor 222, through the first gear set 216 and the second gear set 218 respectively. Accordingly, the expanded positions and the expanded forces imposed on the tool 242, the rough grinding stones 236, and the fine grinding stones 238 can be controlled easily and highly accurately.

The rough grinding stones 236 and the fine grinding stones 238, which are disposed in coaxial relation to the tool 242, perform the honing process immediately following the boring process, and therefore, machining accuracy is high. In the boring and honing processes, the main shaft 224 remains of the same diameter and continues to rotate. In other words, the main shaft 224 is mechanically handled as one mechanism during both the boring process and the honing process, and does not require an auxiliary mechanism for changing the diameter thereof. Therefore, the main shaft 224 can be rotated at high speeds during the boring process, and can be reciprocally moved at high speeds during the honing process.

When the bore 310 in the cylinder block 308 is machined to a desired shape based on the corrected NC data DN', if the boring tools are expanded under hydraulic pressure as with the conventional art, then such expanding forces acting on the boring tools, as well as the expanded positions of the boring tools, cannot be finely controlled. If the method of boring the cylinder block according to the present embodiment were performed using a conventional machine tool, failure would be likely.

However, with the compound machine tool 210 according to the present embodiment, the shaft 268 is controlled, i.e., the tool 242 is expanded or displaced radially outwardly, by the first servomotor 220 and the first gear set 216. The compound machine tool 210 can thus perform the boring process more accurately than the conventional machine tool, and can carry out the boring method according to the present invention based on the corrected NC data DN'.

Advantages in the boring process, which are provided by the first servomotor 220 and the first gear set 216 in the compound machine tool 210, shall be described below.

As described above, the first gear set 216 has a ring gear 272 interposed between the pinion gear 270 coupled to the drive shaft 220a of the first servomotor 220 and the ball screw 274 that actually moves the shaft 268. The pinion gear 270 and the ball screw 274 are not directly meshed with each other through the gear teeth and the balls.

If the ring gear 272 were not interposed between the pinion gear 270 and the ball screw 274, but rather the pinion gear 270 and the ball screw 274 were directly meshed with each other through the gear teeth and the balls, then when the first servomotor 220 is intermittently energized or rotates the drive shaft 220a in respective directions, as when the first gear set 216 starts or stops operating, then the torque transmitted by the pinion gear 270 is transmitted with irregular variations, i.e., unstably and sluggishly, to the ball screw 274. Therefore, the shaft 268 is axially moved forward or backward irregularity and with poor response. Stated otherwise, the torque transmitted by the pinion gear 270 when the first servomotor 220 is intermittently energized or rotates the drive shaft 220a in respective directions is transmitted with irregular variations to the ball screw 274. At this time, under reactive forces from the ball screw 274, the pinion gear 270 is vibrated axially in the directions indicated by the arrow A. Accordingly, the first servomotor 220 is also vibrated.

By contrast, according to the present embodiment, the rotating pinion gear 270 is operatively coupled to the ball screw 274 through the ring gear 272. Therefore, torque variations transmitted by the pinion gear 270 when the first servomotor 220 is intermittently energized or rotates the drive shaft 220a in respective directions, are first transmitted to the ring gear 272. Since the ring gear 272 is supported by the thrust bearings 282, 284, the ring gear 272 is rotated by the first servomotor 220, while subjected to irregular torque variations applied thereto. The ring gear 272 and the ball screw 274 are held in mesh with each other through the gear teeth and the balls. When rotation of the ring gear 272 is transmitted to the ball screw 274, while the ring gear 272 is subjected to such irregular torque variations, the ring gear 272 tends to vibrate axially in the directions indicated by the arrow A under reactive forces from the ball screws 274. However, the ring gear 272 does not vibrate axially, since it is supported by the thrust bearings 282, 284 (see FIGS. 18 and 20).

Moreover, if the ring gear 272 vibrates axially, since the ring gear 272 and the pinion gear 270 are held in mesh with each other as spur gears, axial vibrations of the ring gear 272 are not transmitted to the pinion gear 270. The ring gear 272 thus functions to block vibrations in the first gear set 216. Consequently, even if vibrations of the tool 242 are transmitted to the shaft 268 due to surface irregularities of the surface being machined (ground), or due to grinding resistance posed from the surface being machined, such vibrations are blocked by the ring gear 272 and are prevented from being transmitted to the first servomotor 220.

The above irregular torque variations, which are produced when the first servomotor 220 is intermittently energized or rotates the drive shaft 220a in respective directions, can be eliminated under electric control. Therefore, such irregular torque variations do not affect the accuracy of the phase control of the first servomotor 220. The ring gear 272 is capable of blocking vibrations from the tool 242, and the first servomotor 220 per se does not vibrate. Therefore, the vibrations do not adversely affect radially outward movement of the tool 242.

The vibration blocking function of the ring gear 272 of the first gear set 216 is also performed during the honing process. Since the second gear set 218 has a structure that is essentially identical to the first gear set 216, the ring gear 288 of the second gear set 218 also blocks vibrations during the honing process (the rough honing process), which is performed using the second gear set 218. Accordingly, the ring gears 272, 288 function as a vibration blocking mechanism in the compound machine tool 210. The first gear set 216 and the second gear set 218 function as power converting means for converting rotational power from the first servomotor 220 and the second servomotor 222 into linear power applied to the shafts 266, 268.

In the tool head 212, the tool 242 may be mounted on the rough grinding tapered cone 258. The tool head 212 may have a plurality of tools 242 of different shapes.

The distal end portion of the rough grinding tapered cone 258 is not limited to being divided into three arms, but may be divided into two arms or four or more arms, so as to allow a different number of rough grinding stones 236 and a different number of fine grinding stones 238 to be employed.

The boring process and the honing process, which are performed by the compound machine tool 210, have been described above with reference to the flowchart shown in FIG. 21. However, the boring process and the honing process are not necessarily limited to the sequence shown in FIG. 21.

A tool head (honing tool head or machining head) 410 (see FIG. 23), which can be used on the compound machine tools 10, 210, shall be described below in relation to a machine tool (honing machine tool) 412 that incorporates the tool head 410, according to the third embodiment of the present invention.

Figure 23:
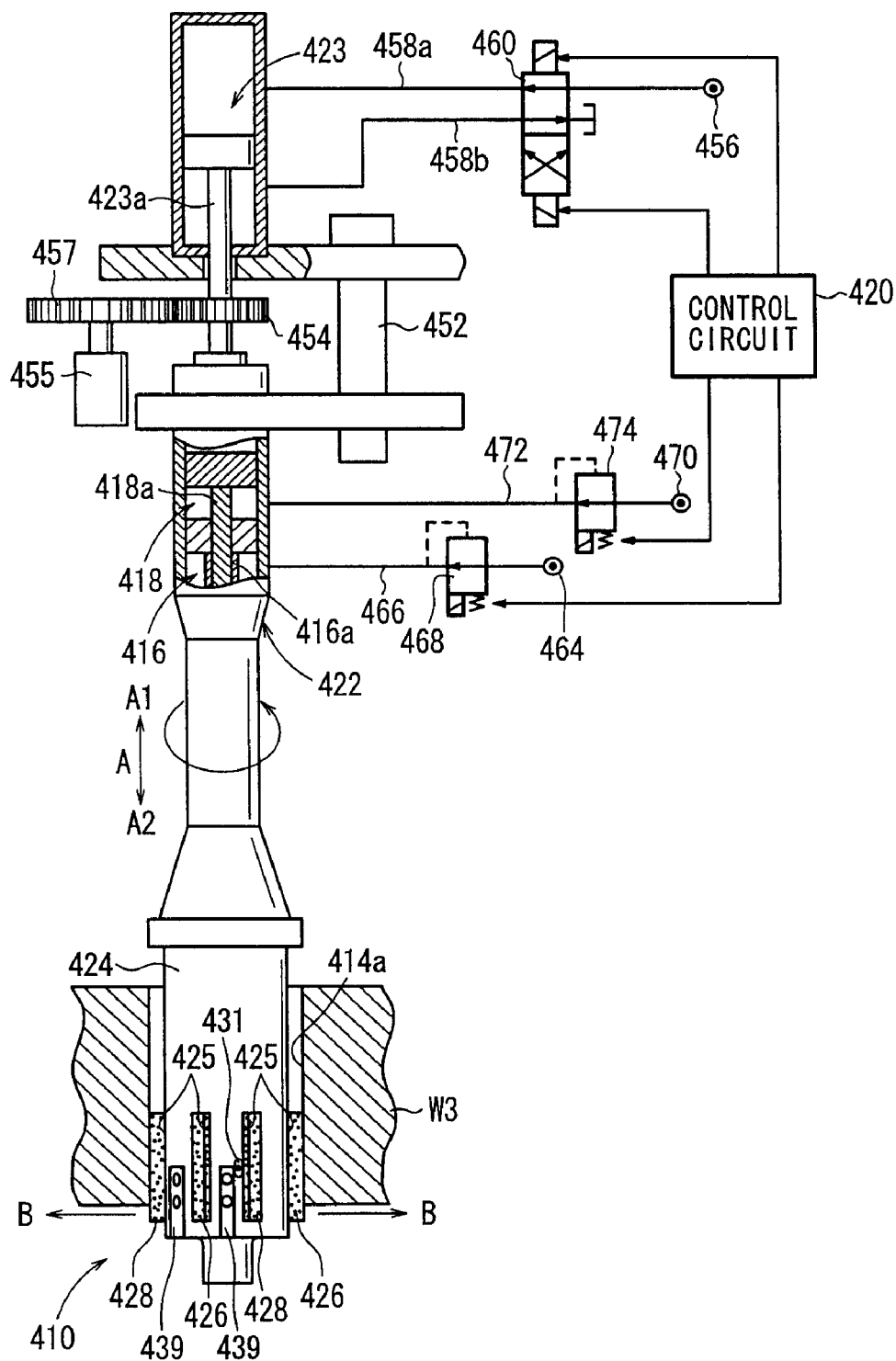
FIG. 23 is a side elevational view, partly in cross section, of a machine tool having a tool head according to a third embodiment of the present invention.

As shown in FIG. 23, the machine tool 412 inserts the tool head 410 into a workpiece W3, e.g., a bore in a cylinder block of an automobile engine, and hones an inner circumferential wall surface 414a of the workpiece W3 with the tool head 410.

The machine tool 412 comprises a tool head 410 that is inserted into the workpiece W3, the tool head 410 being of a substantially cylindrical shape, wherein the tool head 410 can be expanded or contracted in diameter. The machine tool 412 further comprises a first hydraulic cylinder 416 and a second hydraulic cylinder 418 for applying expanding forces to the tool head 410, a control circuit (control means, controller, monitoring control console) 420 for controlling the expanding forces, a main shaft (rotational shaft) 422 that houses the first hydraulic cylinder 416 and the second hydraulic cylinder 418 therein, and a lifting/lowering hydraulic cylinder (moving means) 423 for lifting and lowering the main shaft 422.

The tool head 410 comprises a main body 424 substantially in the form of a hollow cylinder, a plurality of rough grinding stones (first grinding tools or rough honing grinding stones) 426 and a plurality of fine grinding stones (second grinding tools or fine honing grinding stones) 428, which are alternately inserted into holes (guide grooves) 425 defined in the circumferential wall of the main body 424 radially at spaced angular intervals. A plurality of (e.g., four) air micrometer detecting means 431 are disposed radially on the circumferential wall of the main body 424, between the rough grinding stones 426 and the fine grinding stones 428. The air micrometer detecting means 431 ejects air supplied through an air passage (not shown) in the tool head 410 from respective nozzles 431a (see FIG. 24) so as to measure the diameter of the inner circumferential wall surface 414a of the workpiece W3.

Figure 24:
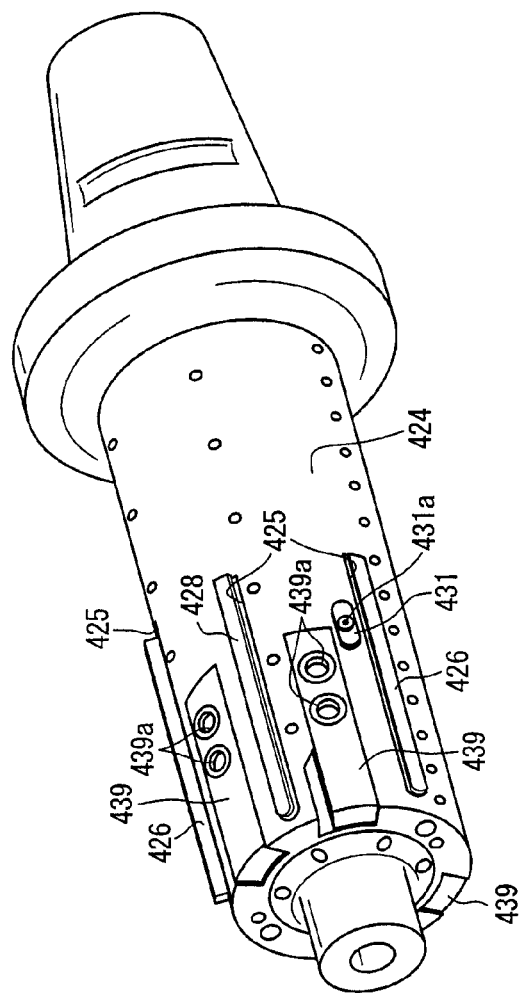
FIG. 24 is a perspective view of the tool head shown in FIG. 23.

As shown in FIG. 24, the tool head 410 has tool holders 439 with throw-away tips (not shown) mounted on an outer circumferential surface thereof near a distal end thereof. The tool holders 439 can be replaced with other tool holders when the bolts 439a are loosened. The tool holders 439 are coupled to an expanding and contracting means (not shown), which is similar to the finishing expanding and contracting means to be described later, so that the tool holders 439 can be moved (expanded) radially.

Figure 25:
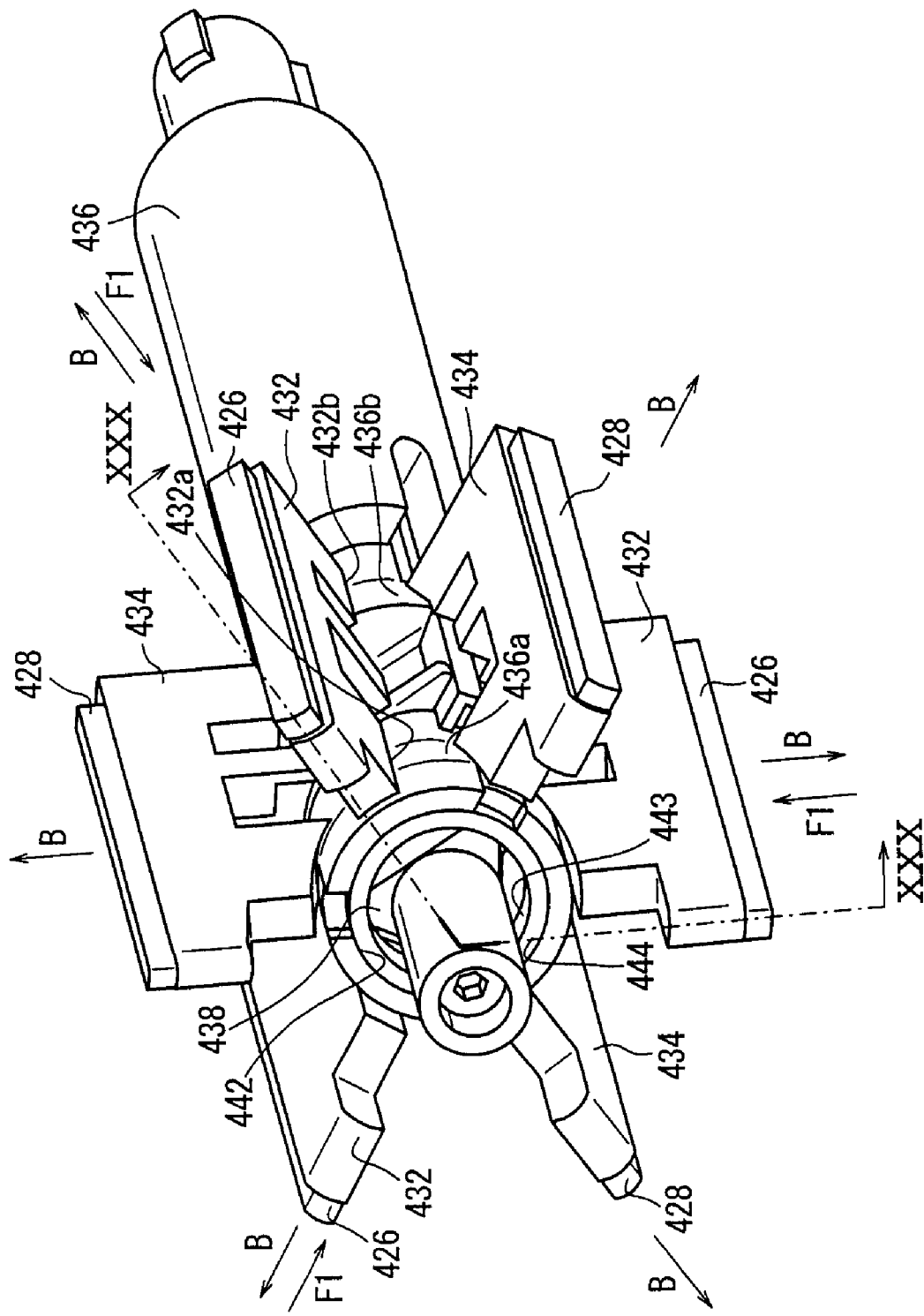
FIG. 25 is a perspective view of an expanding/contracting means incorporated in the tool head shown in FIG. 23.

As shown in FIG. 25, the tool head 410 has three rough grinding stones 426 and three fine grinding stones 428. The rough grinding stones 426 and the fine grinding stones 428 are fixedly mounted respectively on rough grinding stone bases (first tool bases or rough grinding stone shoes) 432 and fine grinding stone bases (second tool bases or fine grinding stone shoes) 434. The rough grinding stones 426 and the fine grinding stones 428 are radially movable, i.e., radially expansible and contractible, in the directions indicated by the arrows B, while being guided by holes 425 in the same axial positions on the tool head 211.

Figure 26:
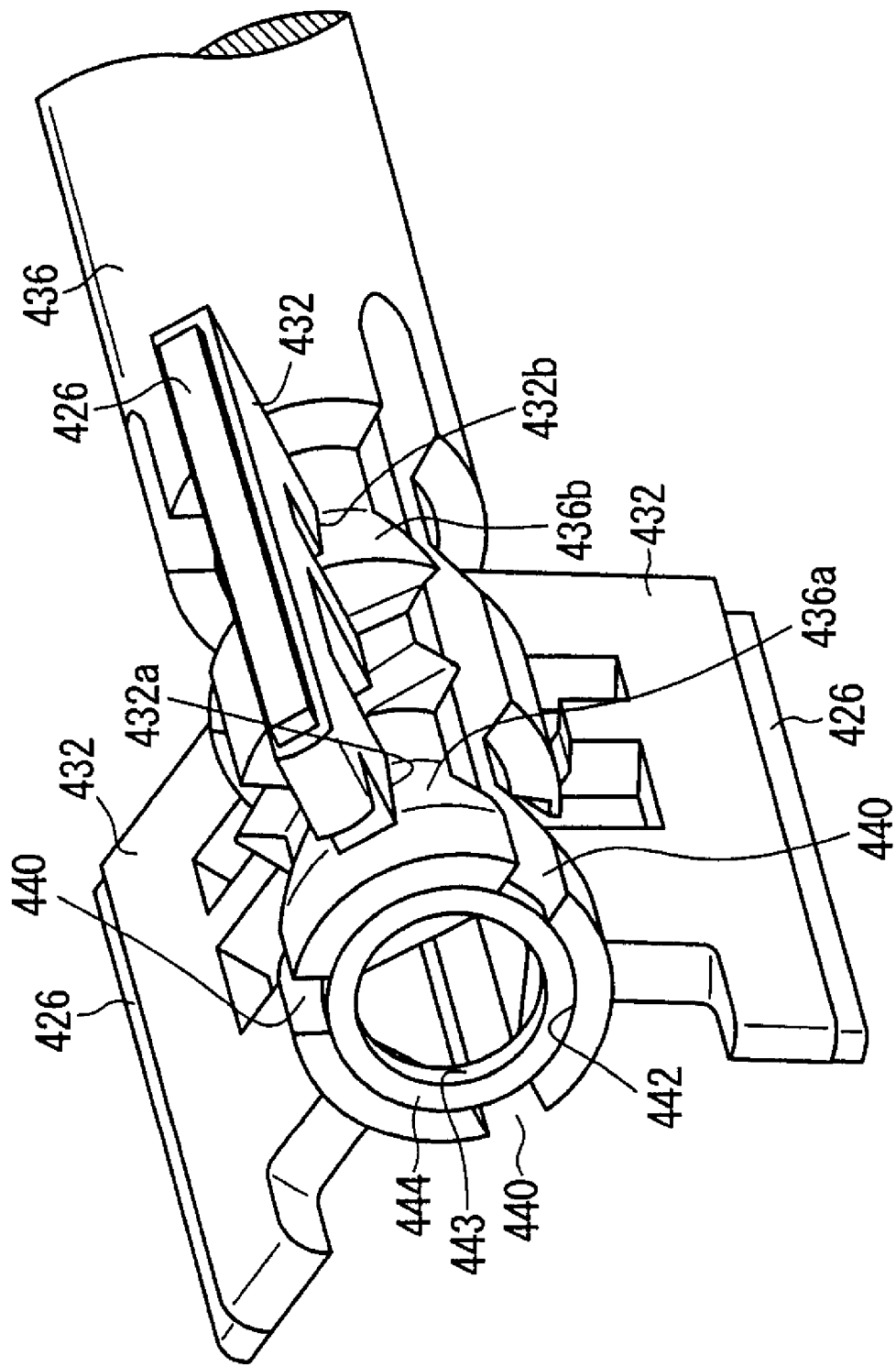
FIG. 26 is a perspective view of the tool head shown in FIG. 23, with rough grinding stones disposed on a rough grinding tapered cone.
Figure 27:
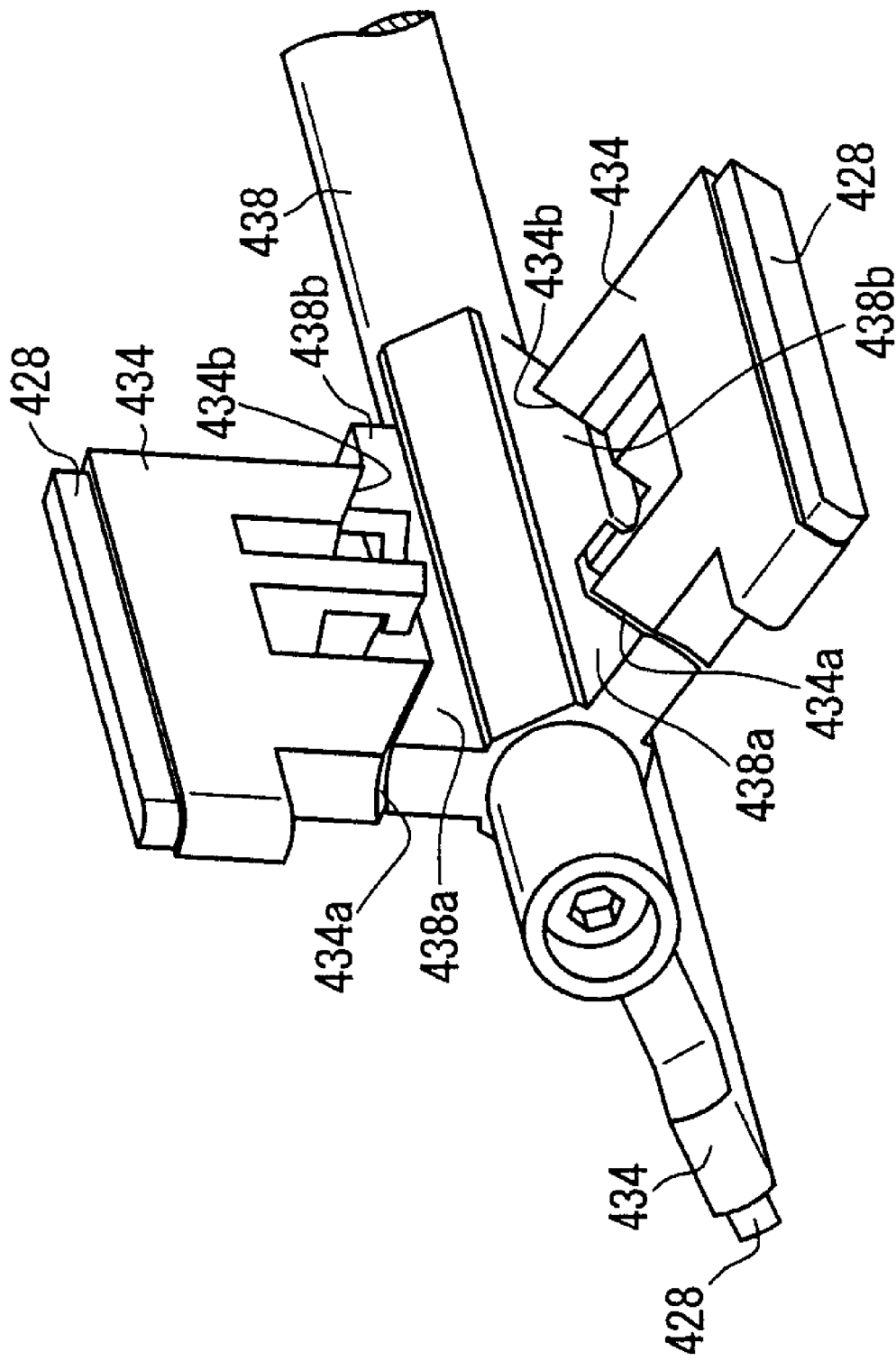
FIG. 27 is a perspective view of the tool head shown in FIG. 23, with fine grinding stones disposed on a fine grinding tapered cone.

A rough grinding tapered cone (first cone shaft) 436 is slidably disposed in the tool head 410 for radially expanding the rough grinding stone bases 432. A fine grinding tapered cone (second cone shaft) 438 is inserted into the rough grinding tapered cone 436 for radially expanding the fine grinding stone bases 434. The fine grinding tapered cone 438 is slidable separately from the rough grinding tapered cone 436. As shown in FIGS. 25 and 26, the rough grinding tapered cone 436 has tapers 436a, 436b, including tapered surfaces against which inner slanted surfaces 432a, 432b of the rough grinding stone bases 432 are held in slidable abutment. Similarly, as shown in FIGS. 25 and 27, the fine grinding tapered cone 438 has tapers 438a, 438b, including tapered surfaces against which inner slanted surfaces 434a, 434b of the fine grinding stone bases 434 are held in slidable abutment.

Figure 28:
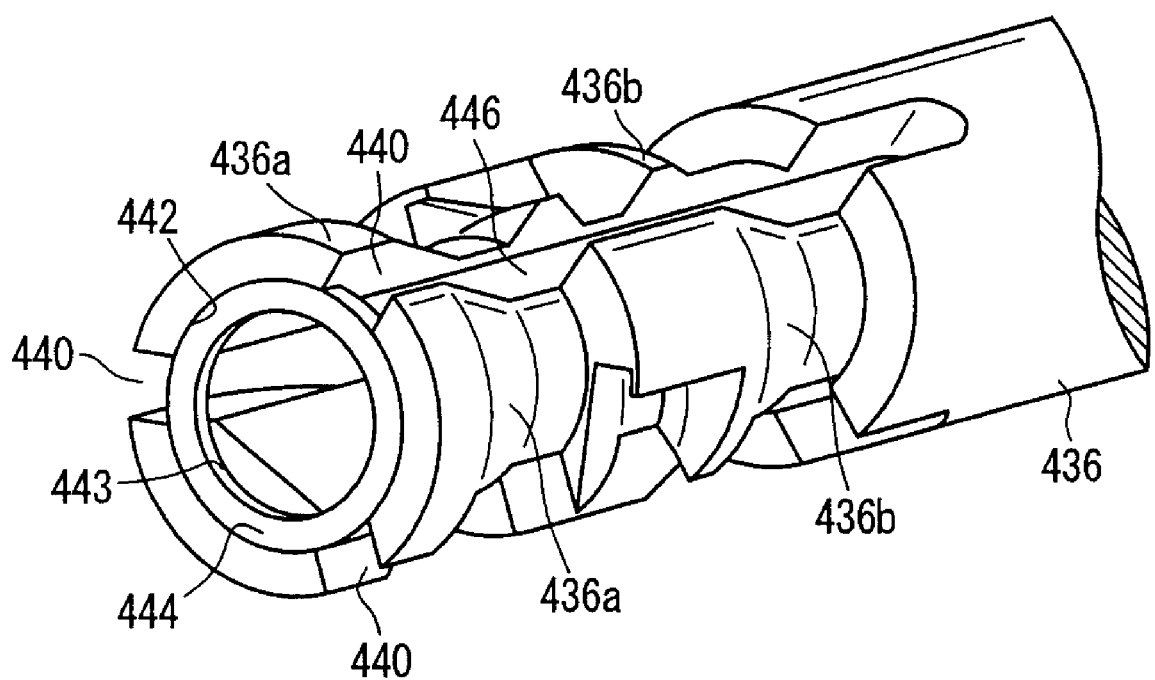
FIG. 28 is a perspective view of the rough grinding tapered cone shown in FIG. 26.

As shown in FIGS. 26 and 28, the rough grinding tapered cone 436 has a distal end portion divided into three arms, with gaps 440 defined therebetween. Tapers 438a, 438b of the fine grinding tapered cone 438 are inserted into the gaps 440 (see FIGS. 25 and 27). A ring (lid member) 444 having a hole 443 defined therein is mounted in a recess 442, which is defined in the rough grinding tapered cone 436 so as to be slightly offset rearwardly from the distal ends of the three arms of the rough grinding tapered cone 436. Therefore, the three arms are joined, i.e., the openings of the gaps 440 are closed, by the ring 444. For example, an inner side surface of the recess 442 is internally threaded, and an outer side surface of the ring 444 is externally threaded. Such internally and externally threaded surfaces are threadedly engaged with each other in order to hold the ring 444 detachably within the recess 442. However, the ring 444 may be secured in place by any of other various methods, e.g., the ring 444 may be fastened to the bottom of the recess 442 by bolts, press-fitted or crimped in the recess 442, or secured in the recess 442 by adhesive bonding or welding.

In the tool head 410, therefore, the distal end of the rough grinding tapered cone 436 is divided into three arms, with the gaps 440 defined therebetween, which are closed by the ring 444. As a result, the rough grinding tapered cone 436 has equally spaced radial oblong holes 446 defined therein (see FIGS. 28 and 29). Tapers 438a, 438b of the fine grinding tapered cone 438 project through the oblong holes 446, in facing relation to the fine grinding stone shoes 434. The distal end portion of the fine grinding tapered cone 438 is slidably inserted through the hole 443 in the ring 444 (see FIG. 25).

Figure 30:
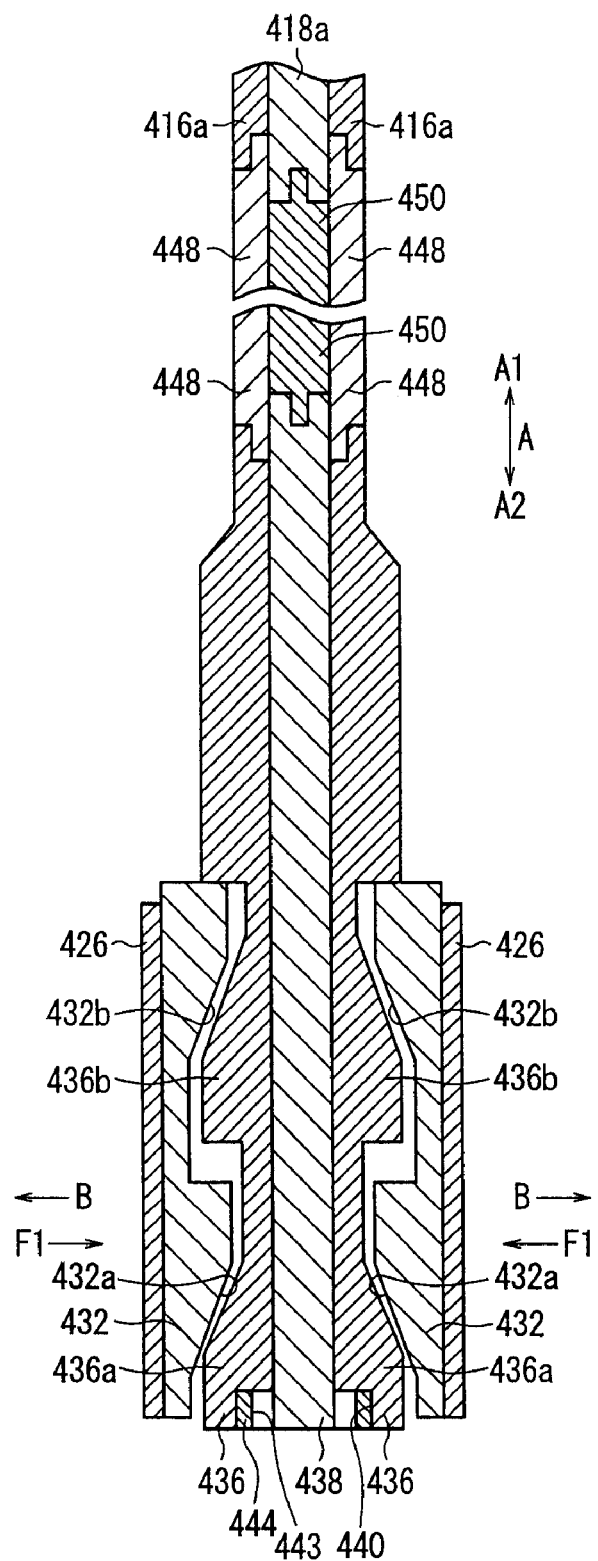
FIG. 30 is a cross-sectional view taken along line XXX-XXX of FIG. 25.

As shown in FIG. 30, the rough grinding tapered cone 436 and the fine grinding tapered cone 438 are connected respectively to drawbars (moving members, shafts) 448, 450.

For expanding the rough grinding stones 426, the drawbar 448 is pulled upwardly to pull the rough grinding tapered cone 436 in the direction indicated by the arrow A1. The tapers 436a, 436b press against the inner slanted surfaces 432a, 432b of the rough grinding stone bases 432. Therefore, the rough grinding stones 426 are expanded, i.e., are displaced radially outwardly in the directions indicated by the arrows B, while they are guided in the holes 425 provided in the main body 424. For contracting the rough grinding stones 426 from the expanded position, the drawbar 448 is pushed downwardly to lower the rough grinding tapered cone 436 in the direction indicated by the arrow A2, and the rough grinding stones 426 are contracted in directions opposite to the directions indicated by the arrows B (radially inwardly) while they are guided in the holes 425 provided in the main body 424.

Similarly, for expanding the fine grinding stones 428, the drawbar 450 is pulled upwardly to pull the fine grinding tapered cone 438 in the direction indicated by the arrow A1. The tapers 438a, 438b press against the inner slanted surfaces 434a, 434b of the fine grinding stone bases 434. Therefore, the fine grinding stones 428 are expanded, i.e., are displaced radially outwardly in the directions indicated by the arrows B, while they are guided in the holes 425 provided in the main body 424. For contracting the fine grinding stones 428 from the expanded position, the drawbar 450 is pushed downwardly to lower the fine grinding tapered cone 438 in the direction indicated by the arrow A2, and the fine grinding stones 428 are contracted in directions opposite to the directions indicated by the arrows B (radially inwardly) while they are guided in the holes 425 provided in the main body 424.

In the tool head 410 according to the present embodiment, therefore, the rough grinding stone bases 432, the fine grinding stone shoes 434, the rough grinding tapered cone 436, and the fine grinding tapered cone 438 function collectively as expanding and contracting means, for expanding and contracting the rough grinding stones 426 and the fine grinding stones 428.

As shown in FIG. 23, the tool head 410 is coupled to the main shaft 422. Consequently, when the main shaft 422 is rotated about its axis, the tool head 410 also rotates about its axis.

The lifting/lowering hydraulic cylinder 423 is supported on a support member (support) 452, and has a piston rod 423a that is coupled to the main shaft 422. A speed changing gear 454 is fitted over the piston rod 423a and held in mesh with a gear 457, which is fitted over the drive shaft of a main shaft motor 455 that serves as a rotating means.

The hydraulic pressure acting inside the lifting/lowering hydraulic cylinder 423 is increased or reduced by a hydraulic pressure regulator (pressure reducing valve) 460, serving as an expansion/contraction control means that is connected to hydraulic passages 458a, 458b interconnecting the lifting/lowering hydraulic cylinder 423 and an oil source 456. The hydraulic pressure regulator 460 is controlled by a control circuit 420 in order to increase or reduce the hydraulic pressure in the lifting/lowering hydraulic cylinder 423, for thereby lifting or lowering the piston rod 423a in one of the directions indicated by the arrow A.

The rough grinding tapered cone 436 and the fine grinding tapered cone 438 are coupled respectively to drawbars 448, 450 (see FIG. 30). The drawbars 448, 450 are coupled respectively to a piston rod 416a of the first hydraulic cylinder 416, and to a piston rod 418a of the second hydraulic cylinder 418.

When hydraulic pressure is applied to the first hydraulic cylinder 416, the piston rod 416a is displaced in order to pull the drawbar 448, and hence the rough grinding tapered cone 436, upwardly. As a result, the rough grinding stones 426 are expanded or displaced radially outwardly in the directions indicated by the arrows B. Likewise, when hydraulic pressure is applied to the second hydraulic cylinder 418, the piston rod 418a is displaced in order to pull the drawbar 450, and hence the fine grinding tapered cone 438, upwardly. As a result, the fine grinding stones 428 are expanded or displaced radially outwardly in the directions indicated by the arrows B. The rough grinding stones 426 and the fine grinding stones 428 may be expanded individually or simultaneously.

The hydraulic pressure acting inside the first hydraulic cylinder 416 is increased or reduced by a hydraulic pressure regulator (pressure reducing valve) 468, serving as an expansion/contraction control means connected to a hydraulic passage 466 interconnecting the first hydraulic cylinder 416 and an oil source 464. Similarly, the hydraulic pressure acting inside the second hydraulic cylinder 418 is increased or reduced by a hydraulic pressure regulator (pressure reducing valve) 474, serving as an expansion/contraction control means connected to a hydraulic passage 472 interconnecting the second hydraulic cylinder 418 and an oil source 470. The hydraulic pressure regulators 468, 474 are controlled by commands from the control circuit 420, so as to increase or reduce the hydraulic pressure in the first and second hydraulic cylinders 416, 418.

Consequently, the rough grinding stones 426 and/or the fine grinding stones 428 can be pressed against the inner circumferential wall surface 414a of the workpiece W3 under appropriate expanding forces by the first hydraulic cylinder 416 and the second hydraulic cylinder 418.

Operation of the machine tool 412 incorporating the tool head 410 according to the third embodiment, for performing a grinding process (honing process) on the workpiece W3, shall be described below.

First, the workpiece W3 is placed in a given position, whereupon the lifting/lowering hydraulic cylinder 423 is actuated to lower the piston rod 423a. As the piston rod 423a is lowered, the main shaft 422 is also lowered to insert the tool head 410 into the workpiece W3.

Then, the inner circumferential wall surface 414a of the workpiece W3 is machined to a desired diameter and a desired surface roughness by the rough grinding stones 426 and the fine grinding stones 428. Specifically, the control circuit 420 controls the hydraulic pressure regulators 468, 474 in order to increase or reduce the hydraulic pressure applied to the first hydraulic cylinder 416 and the second hydraulic cylinder 418. The drawbars 448, 450 lift or lower the rough grinding tapered cone 436 and the fine grinding tapered cone 438, so as to apply expanding or contracting forces to the rough grinding stones 426 and the fine grinding stones 428. Therefore, the rough grinding stones 426 and the fine grinding stones 428 are selectively operated to grind the workpiece W3.

In order to increase machining accuracy, the air micrometer detecting means 431 detects a change in the diameter of the inner circumferential wall surface 414a of the workpiece W3. At the same time, the control circuit 420 measures an elapsed machining time and controls the hydraulic pressure regulators 468, 474 in order to change the expanding or contracting forces imposed on the rough grinding stones 426 and the fine grinding stones 428. The rough grinding stones 426 and the fine grinding stones 428 thus grind the inner circumferential wall surface 414a of the workpiece W3 with high accuracy.

Figure 37A:
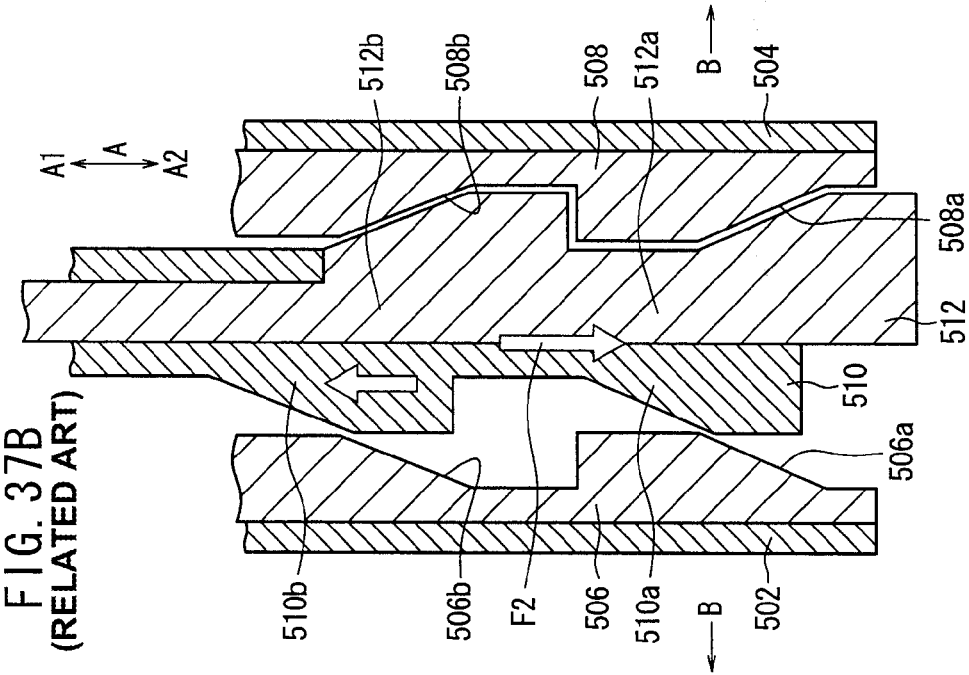
FIG. 37A is a fragmentary cross-sectional view taken along line XXXVII-XXXVII of FIG. 34, showing the manner in which both the rough grinding stones and the fine grinding stones are expanded in the conventional tool head.
Figure 37B:
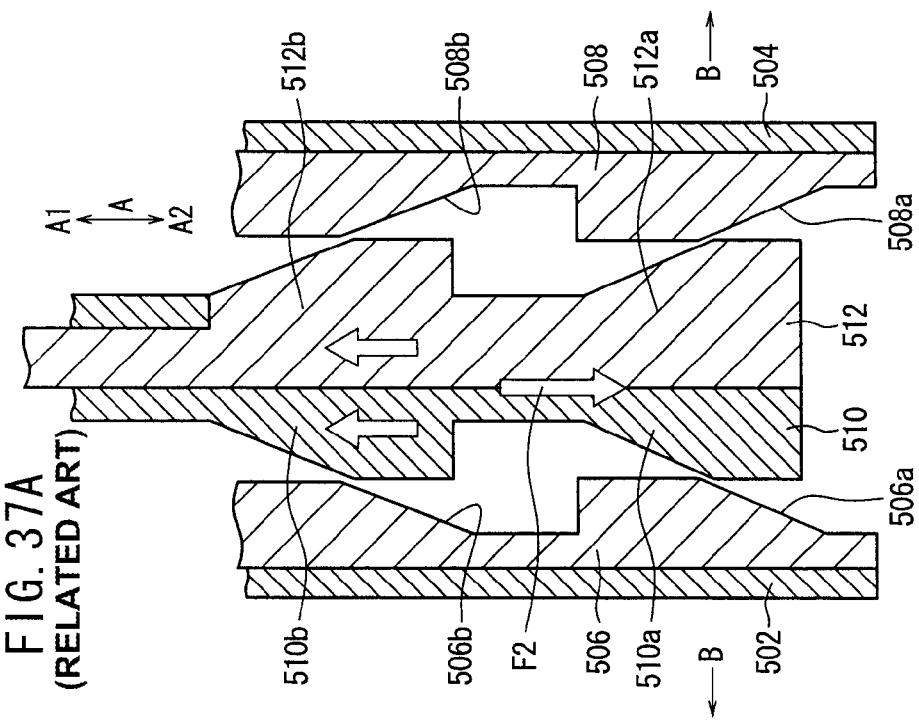
FIG. 37B is a fragmentary cross-sectional view taken along line XXXVII-XXXVII of FIG. 34, showing the manner in which the fine grinding stones are expanded in the conventional tool head.
Figure 38:
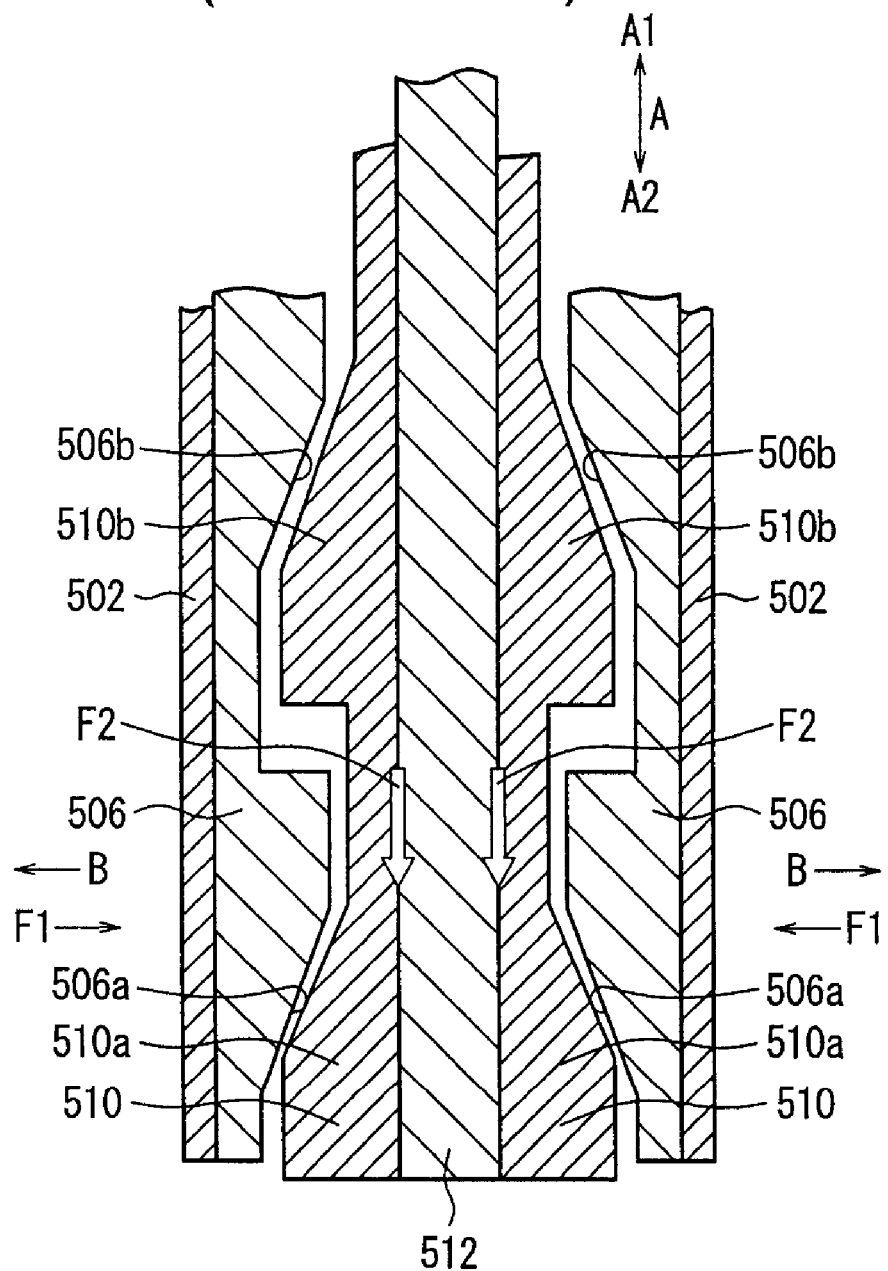
FIG. 38 is a fragmentary cross-sectional view taken along line XXXVIII-XXXVIII of FIG. 34.
Figure 39:
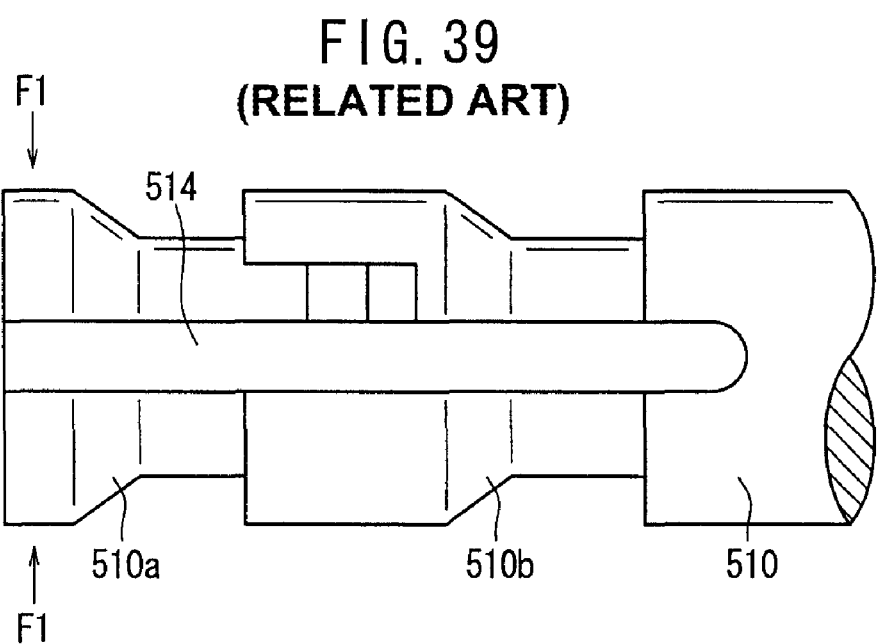
FIG. 39 is a plan view of the rough grinding tapered cone of the conventional tool head.

Using the conventional tool head, when the inner circumferential wall surface 414a is machined by the rough grinding stones 426 and the fine grinding stones 428, while controlling the expanding or contracting forces imposed on the rough grinding stones 426 and the fine grinding stones 428, as shown in FIGS. 37A and 37B, the conventional tool head has suffered from a problem in that a difference is developed between the lifting or lowering forces imposed on the rough grinding tapered cone 510 and the fine grinding tapered cone 512, and the expanding or contracting forces imposed on the rough grinding stones 502 and the fine grinding stones 504, because of frictional forces F2 produced between the rough grinding tapered cone 510 and the fine grinding tapered cone 512, owing to flexing of the rough grinding tapered cone 510.

With the tool head 410 according to the third embodiment, however, openings of the gaps 440 between the three arms of the distal end portion of the rough grinding tapered cone 436 are closed by the ring 444, and further, the rough grinding tapered cone 436 has oblong holes 446 (see FIG. 29) formed therein. The tapers 438a, 438b of the fine grinding tapered cone 438 project through the oblong holes 446 in facing relation to the fine grinding stone shoes 434 (see FIG. 25).

Figure 29:
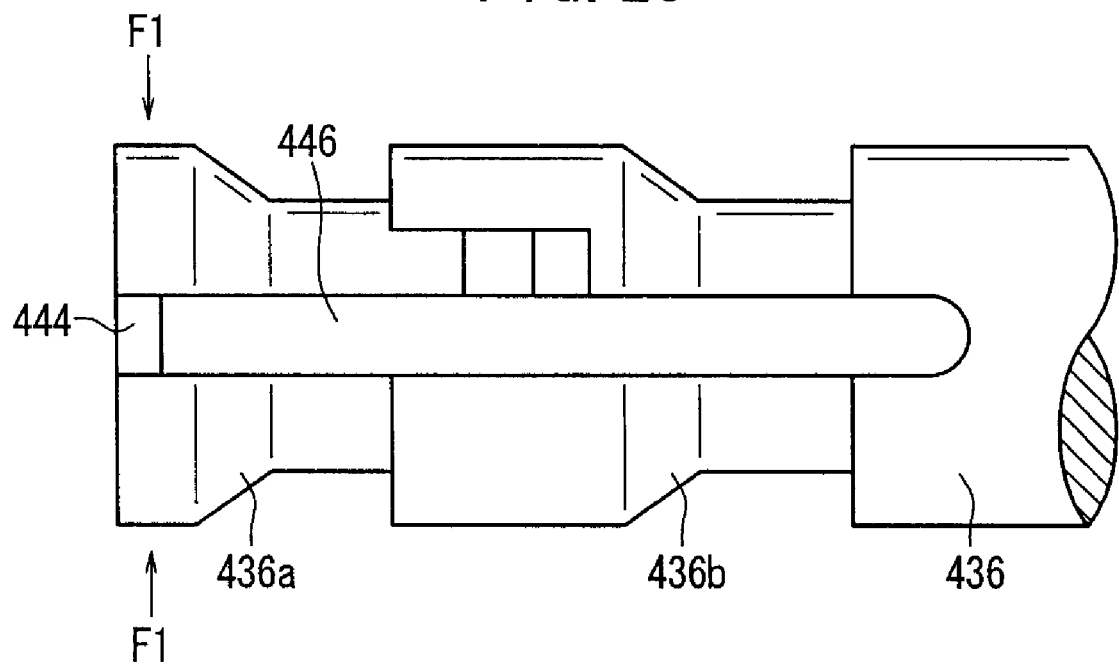
FIG. 29 is a plan view of the rough grinding tapered cone shown in FIG. 26.

Consequently, as shown in FIGS. 29 and 30, even if reactive forces F1 act on the rough grinding tapered cone 436 when the workpiece W2 is ground by the rough grinding stones 426, as shown in FIGS. 29 and 30, since the openings of the rough grinding tapered cone 436 are closed by the ring 444, the rough grinding tapered cone 436 is prevented from flexing excessively upon pressing the fine grinding tapered cone 438.

In other words, the tool head 410 is capable of greatly reducing the frictional forces F2 produced by the reactive forces F1. Even when the workpiece W3 is ground by the rough grinding stones 426 and the fine grinding stones 428 while controlling the expanding or contracting forces imposed on the rough grinding stones 426 and the fine grinding stones 428, pulling forces of the drawbars 448, 450 can act linearly as expanding or contracting forces on the rough grinding stones 426 and the fine grinding stones 428.

The machine tool 412 according to the third embodiment is thus capable of performing the honing process efficiently and highly accurately with the tool head 410 incorporated in the machine tool 412.

Figure 31:
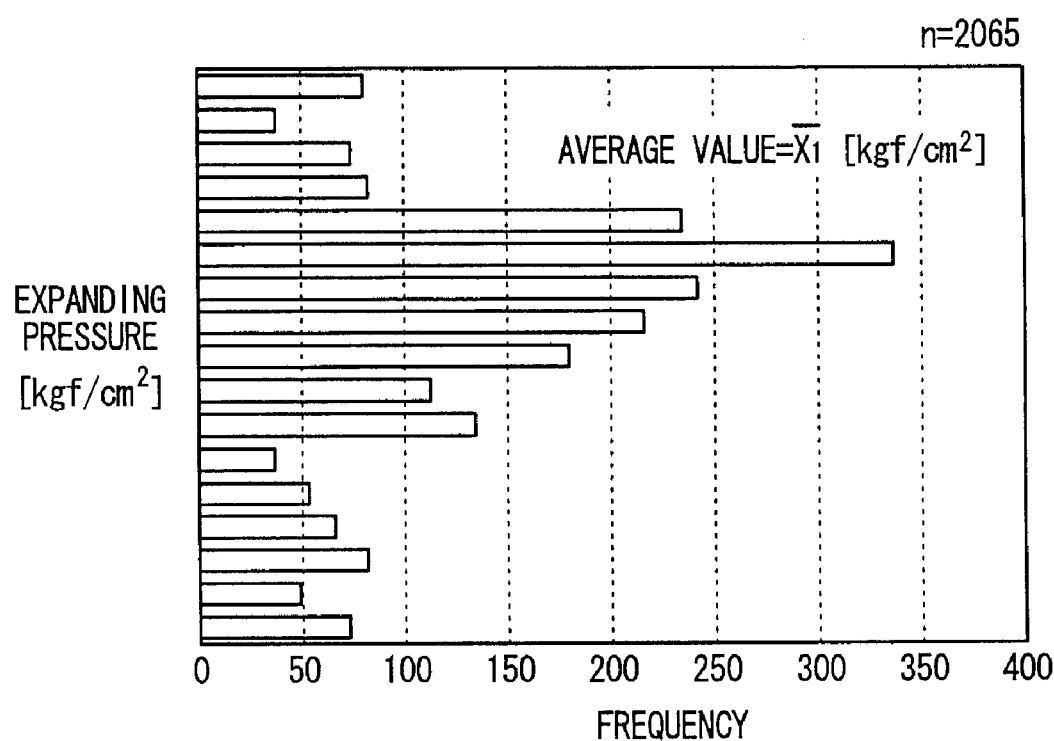
FIG. 31 is a graph showing various expanding pressures applied to rough grinding stones when a workpiece is honed by a conventional tool head.
Figure 32:
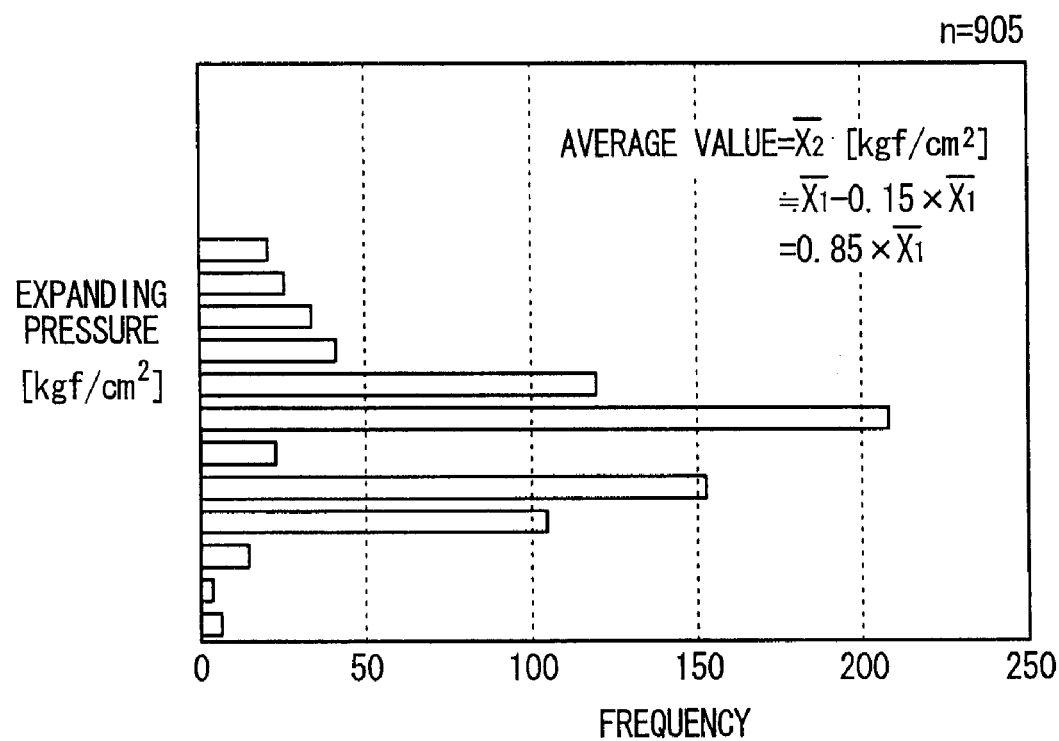
FIG. 32 is a graph showing various expanding pressures applied to rough grinding stones when a workpiece is honed by a tool head according to the third embodiment of the present invention.
Figure 33:
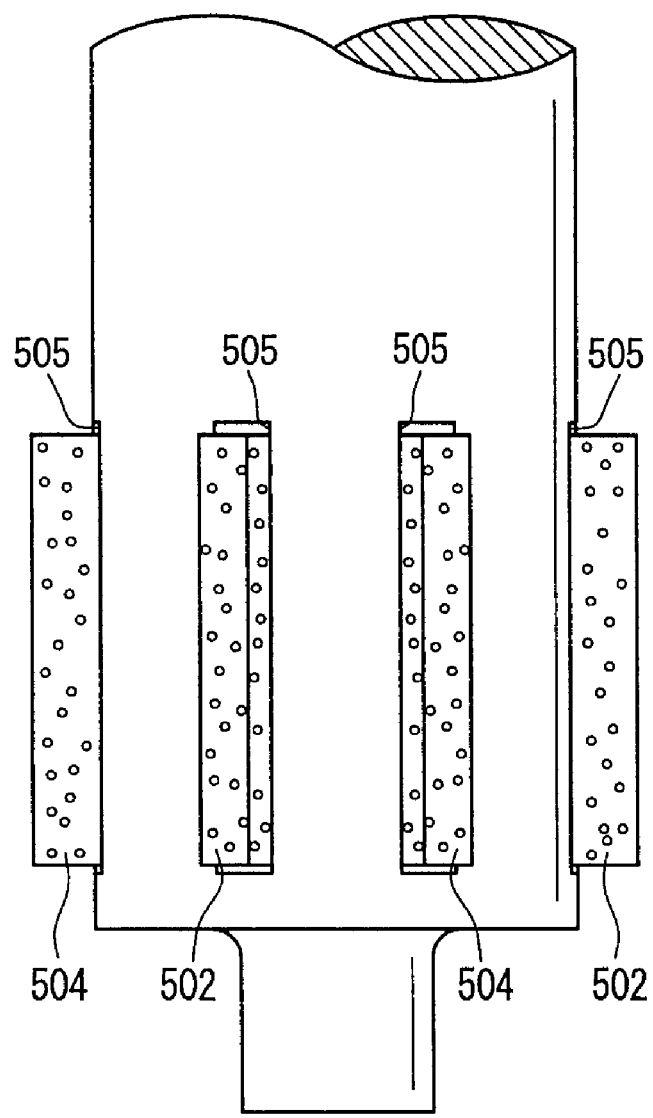
FIG. 33 is a side view of a conventional tool head.
Figure 34:
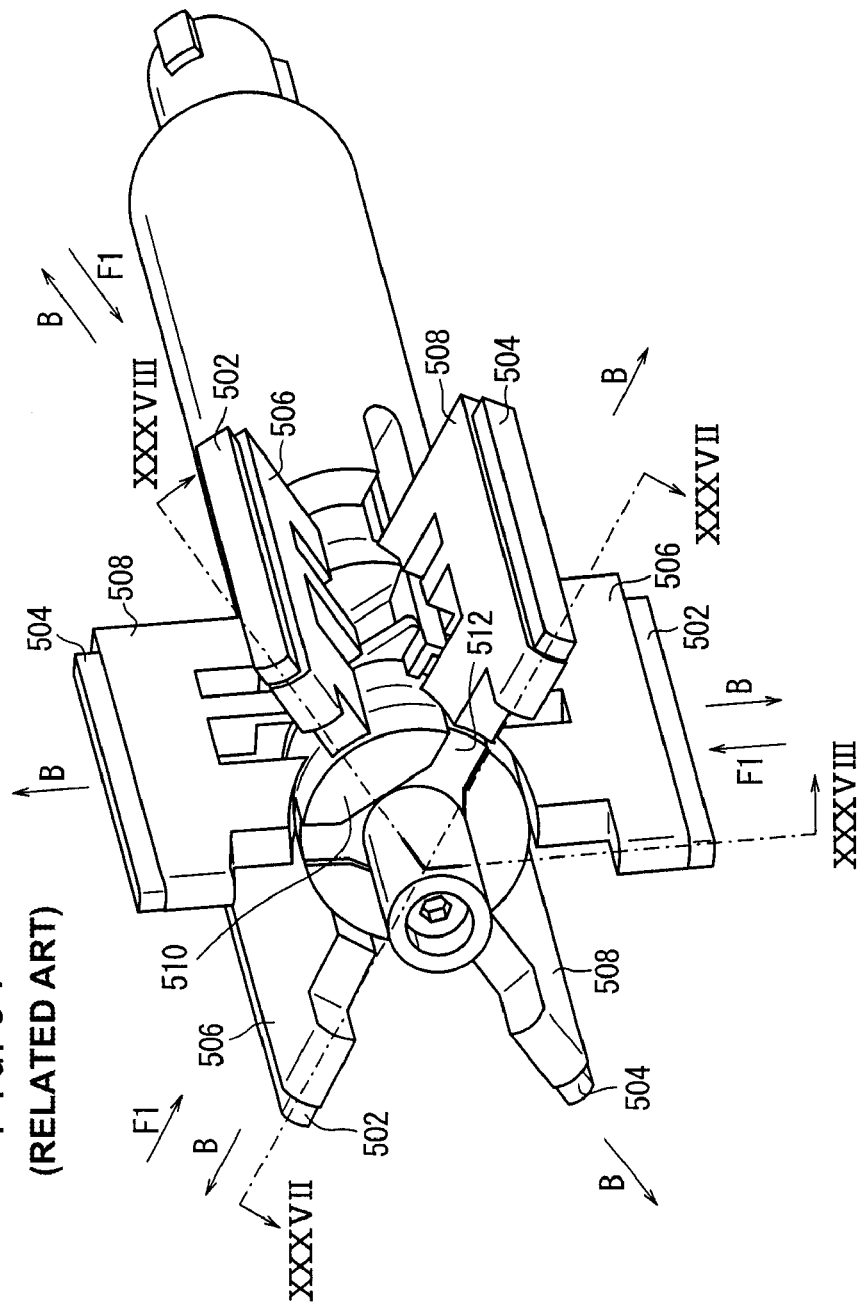
FIG. 34 is a perspective view of an expanding/contracting means incorporated in the conventional tool head.
Figure 35:
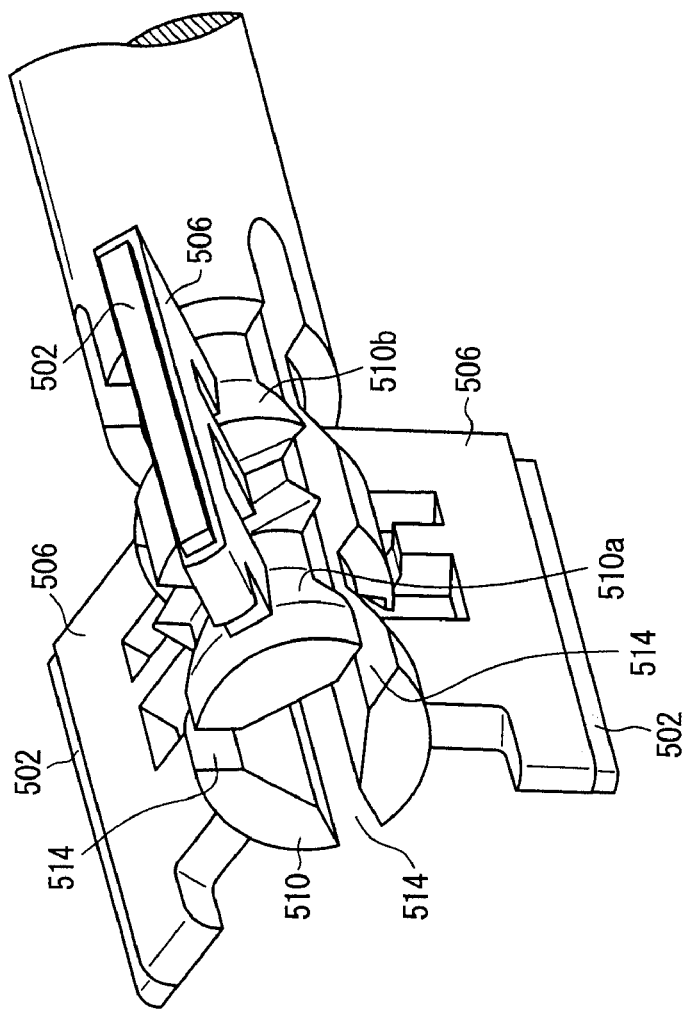
FIG. 35 is a perspective view of the conventional tool head with rough grinding stones disposed on a rough grinding tapered cone.

FIG. 31 is a graph showing various expanding pressures applied to the rough grinding stones 502 when a workpiece is honed using the conventional tool head 500. FIG. 32 is a graph showing various expanding pressures applied to the rough grinding stones 426 when a workpiece is honed using the tool head 410 according to the third embodiment.

A comparison between FIGS. 31 and 32 clearly indicates that the various expanding pressures on the rough grinding stones 426 of the tool head 410 according to the third embodiment are far fewer, compared to the various expanding pressures of the rough grinding stones in the conventional tool head. In addition, the average expanding pressure of the rough grinding stones 426 of the tool head 410 also is lower, compared with the average expanding pressure of the rough grinding stones in the conventional tool head. (Note that the width of the numeric values in the respective frequency graphs is the same for both graphs.) Specifically, the tool head 410 allows the rough grinding stones 426 to operate smoothly because the expanding pressure required to expand the rough grinding stones 426 is lower, and moreover, the various expanding pressures on the rough grinding stones 426 are made fewer, thus enabling the rough grinding stones 426 to be expanded and contracted with greater accuracy.

With the tool head 410 according to the third embodiment as well as the machine tool 412 incorporating the tool head 410, as described above, a ring 444 serving as a lid member is mounted in the distal end of the rough grinding tapered cone 436, so as to provide oblong holes 446 for preventing the rough grinding tapered cone 436 from flexing under reactive forces F1 when the rough grinding tapered cone 436 is lifted to expand the rough grinding stones 426. Therefore, losses in the expanding forces, which are transmitted to the rough grinding stones 426 when the rough grinding tapered cone 436 is lifted, can be greatly reduced. Furthermore, the rough grinding tapered cone 436 is prevented from flexing radially inwardly under the reactive forces F1, to thereby reduce the frictional forces F2 between the sliding surfaces of the rough grinding tapered cone 436 and the fine grinding tapered cone 438. Similarly, the expanding forces on the fine grinding stones 428 can also be controlled appropriately.

The tapers 438a, 438b of the fine grinding tapered cone 438 are placed into the oblong holes 446 that are defined in the rough grinding tapered cone 436. The tapers 438a, 438b can thus be assembled and disassembled with ease.

The hole 443 in the ring 444 serving as the lid member is not necessarily required. If the hole 443 is dispensed with, then the tip end portion of the fine grinding tapered cone 438 may be slid within the rough grinding tapered cone 436.

The distal end portion of the rough grinding tapered cone 436 is not limited to being divided into three arms. The distal end portion may also be divided into two arms or four or more arms, so as to allow a different number of rough grinding stones 426 and a different number of fine grinding stones 428 to be employed thereon.

The machine tool 412 incorporating the tool head 410 is not strictly limited to the above embodiment, and the machine tool may be modified in various ways. For example, electric actuator mechanisms may be used instead of the first hydraulic cylinder 416, the second hydraulic cylinder 418, and the lifting/lowering hydraulic cylinder 423. If electric actuator mechanisms are employed, then a torque-controllable motor, a ball screw mechanism for converting rotary motion of the motor into linear motion and transmitting such linear motion to a drawbar, and a torque control means for controlling the torque of the motor may be employed as the expansion/contraction control means instead of each of the hydraulic pressure regulators 460, 468, 474.

The tool head 410 can be installed on the machine tools 10, 210. Specifically, as shown in FIG. 1, a machine tool 10a may incorporate the tool head 410. Further, as shown in FIG. 8, a machine tool 210a may incorporate a tool head 232a, having the ring 444 of the tool head 410.

The rough grinding stones and the fine grinding stones may comprise metal-bonded diamond grinding stones, vitrified bonded grinding stones, or the like. Typically, the rough grinding stones are coarser than the fine grinding stones. However, the rough grinding stones and the fine grinding stones may be of the same type, or may even be identical to each other.

Although certain preferred embodiments of the present invention have been shown and described in detail, it should be understood that various changes and modifications may be made to the embodiment without departing from the scope of the invention as set forth in the appended claims.

The invention claimed is:

1. A machine tool comprising:
a tool head having a boring cutter and a grinding tool;
rotating means for rotating said tool head;
a hollow main shaft connecting said rotating means to said tool head and transmitting rotational power from said rotating means to said tool head;
a support, wherein said main shaft extends axially through said support and is rotatably supported in said support;
moving means for moving said support in an axial direction of said main shaft,
a shaft housed in the main shaft and axially movably splined to the main shaft; and
wherein said tool head comprises expanding means for radially expanding said boring cutter and said grinding tool under predetermined expanding forces and at a predetermined position in response to axial movement of said shaft, said expanding means including a driving source fixedly mounted on said support,
wherein said main shaft remains unchanged in diameter while being rotated by said rotating means during both a boring process, in which said tool head is rotated and moved towards a workpiece while said boring cutter bores said workpiece, and a grinding process, in which said tool head is rotated and reciprocally moved while said grinding tool grinds said workpiece,
wherein the machine tool performs boring process and grinding process by radially expanding said boring cutter and said grinding tool, and
wherein said support comprises a first support and a second support, and said moving means comprises a first moving means as a linear motor for moving the first support in the axial direction of the main shaft and a second moving means for moving the second support in the axial direction of the main shaft.

2. A machine tool according to claim 1, wherein said first moving means moves said first support during said grinding process; and
said second moving means moves said second support during said boring process.

3. A machine tool according to claim 1, wherein said boring cutter and said grinding tool are expandable and contractible radially of said tool head,
and said expanding means comprising:
power converting means for converting rotational power into linear power so as to allow said shaft to move axially in response to said rotational power, said power converting means further having a vibration blocking mechanism.

4. A method of boring a cylinder block with a machine tool according to claim 3, comprising the steps of:
a first step of placing a dummy head, which is similar to a product cylinder head to be used as an actual product, on a cylinder block blank, said dummy head having an opening defined therein allowing said tool head to be inserted therethrough, boring said cylinder block blank with said boring cutter to produce a cylinder block with a bore defined therein, measuring a diameter of said bore, and acquiring first diameter data representing the measured diameter;
a second step of, after the first step, removing said dummy head from said cylinder block, measuring a diameter of said bore at each axial position therein, and acquiring second diameter data representing the measured diameter;
a third step of, after the second step, using said first diameter data as corrective data for said second diameter data to generate NC data to make said bore perfectly circular in cross-sectional shape when said dummy head is mounted on the cylinder block, after the cylinder block blank has been bored without said dummy head being mounted thereon;
a fourth step, after the third step, entering said NC data into said machine tool, boring a cylinder block blank based on said NC data to produce a cylinder block with a bore defined therein, placing the product cylinder head on the cylinder block, measuring a diameter of said bore at each axial position therein, and acquiring third diameter data representing the measured diameter; and
a fifth step of, after the fourth step, using said third diameter data as corrective data to correct said NC data and produce corrected NC data to make said bore perfectly circular in cross-sectional shape when the product cylinder head is placed on the cylinder block, after the cylinder block blank has been bored without said dummy head being mounted thereon.

5. A method according to claim 4, wherein in the fourth step, a measuring device for measuring the diameter of the bore is inserted through an ignition plug insertion hole defined in said product cylinder head.

6. A machine tool comprises:
a tool head having a boring cutter and a grinding tool;
rotating means for rotating said tool head;
a hollow main shaft rotatable about its axis by a rotating means to said tool head and transmitting rotational power from said rotating means to said tool head;
a support, said main shaft being rotatably supported in said support and is roatatably supported in said support;
moving means for moving said support in an axial direction of said main shaft; and
a shaft housed in the main shaft and axially movably splined to the main shaft,
wherein said tool head comprises expanding means for radially expanding said boring cutter and said grinding tool under predetermined expanding forces and at a predetermined position in response to axial movement of said shaft, said expanding means including a driving source fixedly mounted on said support,
wherein said main shaft remains unchanged in diameter while being rotated by said rotating means during both a boring process, in which said tool head is rotated and moved towards a workpiece while said boring cutter bores said workpiece, and a grinding process, in which said tool head is rotated and reciprocally moved while said grinding tool grinds said workpiece,
wherein the machine tool performs boring process and grinding process by radially expanding said boring cutter and said grinding tool, and
wherein said expanding means comprises:
a pinion gear rotatable or securable in phase by said driving source;
a tubular ring gear having outer circumferential gear teeth meshed with said pinion gear and an internally threaded inner surface, said ring gear being rotatably supported on said support;
a tubular ball screw having outer circumferential gear teeth meshed with said internally threaded inner surface of said ring gear, said ball screw being movable in an axial direction of said shaft in response to rotation thereof; and
a bearing having an inner race fitted over said shaft and an outer race fitted in said ball screw, thereby allowing said shaft to move axially in unison with said ball screw.

7. A machine tool comprising:
a hollow main shaft rotatable about its axis by a rotating means;
a support, being rotatably supported in said support;
a shaft housed in said main shaft and axially movably splined to said main shaft; and
a tool head coupled to a distal end of said main shaft and accommodating a boring cutter and a grinding tool therein, said boring cutter and said grinding tool being radially expandable and contractible;
said tool head having expanding means for radially expanding said boring cutter and said grinding tool under predetermined expanding forces and at a predetermined position, in response to axial movement of said shaft, for boring and grinding a workpiece;
said expanding means comprising:
 a servomotor fixedly mounted on said support;
 a pinion gear rotatable or securable in phase by said servomotor;
 a tubular ring gear having outer circumferential gear teeth meshed with said pinion gear, and an internally threaded inner surface, said ring gear being rotatably supported on said support;
 a tubular ball screw having outer circumferential gear teeth meshed with said internally threaded inner surface of said ring gear, said ball screw being movable in an axial direction of said shaft in response to rotation thereof; and
 a bearing having an inner race fitted over said shaft and an outer race fitted in said ball screw, thereby allowing said shaft to move axially in unison with said ball screw.

8. A machine tool according to claim 7, wherein said expanding means comprises a plurality of expanding means, and said shaft comprises a plurality of shafts associated with each of said expanding means, respectively;
 at least one of the shafts being hollow, with the other shaft extending through the hollow shaft;
 said ring gear, said ball screw, and said bearing being disposed coaxially with each other in each of said expanding means.

9. A method of boring a cylinder block with a machine tool according to claim 7, comprising the steps of:
 a first step of placing a dummy head, which is similar to a product cylinder head to be used as an actual product, on a cylinder block blank, said dummy head having an opening defined therein allowing said tool head to be inserted therethrough, boring said cylinder block blank with said boring cutter to produce a cylinder block with a bore defined therein, measuring a diameter of said bore, and acquiring first diameter data representing the measured diameter;
 a second step of, after the first step, removing said dummy head from said cylinder block, measuring a diameter of said bore at each axial position therein, and acquiring second diameter data representing the measured diameter;
 a third step of, after the second step, using said first diameter data as corrective data for said second diameter data to generate NC data to make said bore perfectly circular in cross-sectional shape when said dummy head is mounted on the cylinder block, after the cylinder block blank has been bored without said dummy head being mounted thereon;
 a fourth step of, after the third step, entering said NC data into said machine tool, boring a cylinder block blank based on said NC data to produce a cylinder block with a bore defined therein, placing the product cylinder head on the cylinder block, measuring a diameter of said bore at each axial position therein, and acquiring third diameter data representing the measured diameter; and
 a fifth step of, after the fourth step, using said third diameter data as corrective data to correct said NC data and produce corrected NC data to make said bore perfectly circular in cross-sectional shape when the product cylinder head is mounted on the cylinder block, after the cylinder block blank has been bored without said dummy head being mounted thereon.

10. A method according to claim 9, wherein in the fourth step, a measuring device for measuring the diameter of the bore is inserted through an ignition plug insertion hole defined in said product cylinder head.

11. A machine tool comprising a tool head comprising:
a plurality of said grinding tools;
a main body supporting said grinding tools; and
expanding and contracting means disposed in said main body, for expanding or contracting said first and second grinding tools radially in directions across an axis of said main body,
said expanding and contracting means comprising:

a first tool base, said first grinding tool being mounted on an outer surface of said first tool base;

a first cone shaft held against an inner side surface of said first tool base for pressing said first tool base;

a second tool base radially expandable or contractible simultaneously with or independently of said first tool base, said second grinding tool being mounted on an outer surface of said second tool base;

a second cone shaft held against an inner side surface of said second tool base for pressing said second tool base, said second cone shaft being inserted in said first cone shaft and slidable against said first cone shaft; and a moving member for simultaneously or individually axially moving said first cone shaft and said second cone shaft;

said first cone shaft defining therein an oblong hole having a bottomed end;

said second cone shaft having a portion held against the inner side surface of said second tool base through said oblong hole.

12. A machine tool according to claim 11, wherein said oblong hole is defined in said first cone shaft by a lid member mounted on said first cone shaft.

13. A machine tool according to claim 11, further comprising control means for controlling movement of said moving member.

* * * * *